(12) United States Patent
LaFave et al.

(10) Patent No.: US 7,144,612 B2
(45) Date of Patent: Dec. 5, 2006

(54) DECORATIVE SYSTEM COMPOSITE AND METHOD

(75) Inventors: Robert LaFave, Birch Run, MI (US); Robert Bowling, Deckerville, MI (US)

(73) Assignee: Laminate Products, Inc., Kingston, MI (US)

( * ) Notice: Subject to any disclaimer, the term of this patent is extended or adjusted under 35 U.S.C. 154(b) by 125 days.

(21) Appl. No.: 10/765,427

(22) Filed: Jan. 27, 2004

(65) Prior Publication Data

US 2004/0247876 A1 Dec. 9, 2004

Related U.S. Application Data

(60) Provisional application No. 60/534,486, filed on Jan. 6, 2004, provisional application No. 60/442,944, filed on Jan. 27, 2003.

(51) Int. Cl.
- *B32B 7/06* (2006.01)
- *B32B 27/30* (2006.01)
- *B32B 27/32* (2006.01)
- *B32B 37/14* (2006.01)

(52) U.S. Cl. ............... 428/31; 428/202; 428/411.1; 428/421; 428/521; 428/523; 264/139

(58) Field of Classification Search ............ 428/411.1, 428/421, 31, 202, 521, 523; 264/139
See application file for complete search history.

(56) References Cited

U.S. PATENT DOCUMENTS

| | | | |
|---|---|---|---|
| 3,640,791 A | 2/1972 | Rosenheim | |
| 3,829,343 A | 8/1974 | Remmert | |
| 3,919,379 A | 11/1975 | Smarook | |
| 3,928,710 A | 12/1975 | Arnold et al. | |
| 4,059,471 A * | 11/1977 | Haigh | .......... 156/244.27 |
| 4,072,779 A | 2/1978 | Knox et al. | |
| 4,101,698 A | 7/1978 | Dunning et al. | |
| 4,263,077 A | 4/1981 | Rampelberg | |
| 4,291,085 A | 9/1981 | Ito et al. | |
| 4,326,005 A | 4/1982 | Reed et al. | |
| 4,329,196 A | 5/1982 | Rawlinson | |
| 4,330,352 A | 5/1982 | Grimes et al. | |
| 4,333,786 A | 6/1982 | Civardi et al. | |
| 4,392,905 A | 7/1983 | Boyd et al. | |
| 4,421,816 A | 12/1983 | Arnold | |
| 4,421,839 A | 12/1983 | Takiguchi et al. | |

(Continued)

FOREIGN PATENT DOCUMENTS

EP 0159942 A2 10/1985

(Continued)

OTHER PUBLICATIONS

Soliant; "Fluorex Exterior film laminates Processing Guide;" Aug. 20, 2002; pp. 1-27; United States.

(Continued)

*Primary Examiner*—Ramsey Zacharia
(74) *Attorney, Agent, or Firm*—Howard & Howard Attorneys, P.C.

(57) ABSTRACT

Decorative system composites and methods for forming the same are described. The composites employ new and improved support film systems that have enhanced tensile strength under typical thermoforming conditions, including elevated temperatures. An optional release film can be used in conjunction with the support film. The support film is particularly suitable for use with decorative films used to impart a surface effect, such as paint or color-containing film systems, to a thermoformed plastic component. The support film systems also possess enhanced bag/sag/drape control characteristics.

41 Claims, 31 Drawing Sheets

U.S. PATENT DOCUMENTS

| | | |
|---|---|---|
| 4,451,522 A | 5/1984 | de Vroom |
| 4,490,427 A | 12/1984 | Grant et al. |
| 4,497,851 A | 2/1985 | de Vroom |
| 4,515,649 A | 5/1985 | Nussbaum |
| 4,536,546 A | 8/1985 | Briggs |
| 4,637,904 A | 1/1987 | Rounds |
| 4,773,957 A | 9/1988 | Briggs |
| 4,810,540 A | 3/1989 | Ellison et al. |
| 4,818,589 A | 4/1989 | Johnson et al. |
| 4,824,506 A | 4/1989 | Hoerner et al. |
| 4,832,991 A | 5/1989 | Hayward et al. |
| 4,900,611 A | 2/1990 | Carroll, Jr. |
| 4,902,557 A | 2/1990 | Rohrbacher |
| 4,906,507 A | 3/1990 | Grynaeus et al. |
| 4,913,760 A | 4/1990 | Benson et al. |
| 4,913,970 A | 4/1990 | Hayward et al. |
| 4,918,800 A | 4/1990 | Reafler |
| 4,921,556 A | 5/1990 | Hakiel et al. |
| 4,921,755 A | 5/1990 | Carroll, Jr. et al. |
| 4,931,324 A | 6/1990 | Ellison et al. |
| 4,933,237 A | 6/1990 | Krenceski et al. |
| 4,943,680 A | 7/1990 | Ellison et al. |
| 4,976,896 A | 12/1990 | Short et al. |
| 5,026,448 A | 6/1991 | Reafler et al. |
| 5,034,077 A | 7/1991 | Pata |
| 5,034,269 A | 7/1991 | Wheeler |
| 5,034,275 A | 7/1991 | Pearson et al. |
| 5,100,728 A | 3/1992 | Plamthottam et al. |
| 5,114,514 A | 5/1992 | Landis |
| 5,114,789 A | 5/1992 | Reafler |
| 5,118,372 A | 6/1992 | Spahn |
| 5,125,994 A | 6/1992 | Harasta et al. |
| 5,132,148 A | 7/1992 | Reafler |
| 5,165,976 A | 11/1992 | Newing et al. |
| 5,192,609 A | 3/1993 | Carroll, Jr. |
| 5,203,941 A | 4/1993 | Spain et al. |
| 5,215,811 A | 6/1993 | Reafler et al. |
| 5,215,826 A | 6/1993 | Shimanski et al. |
| 5,268,215 A | 12/1993 | Krenceski et al. |
| 5,286,528 A | 2/1994 | Reafler |
| 5,318,815 A | 6/1994 | Newing et al. |
| 5,456,976 A | 10/1995 | LaMarca, II et al. |
| 5,518,786 A | 5/1996 | Johnson et al. |
| 5,593,759 A | 1/1997 | Vargas et al. |
| 5,599,608 A | 2/1997 | Yamamoto et al. |
| 5,707,697 A | 1/1998 | Spain et al. |
| 5,725,712 A * | 3/1998 | Spain et al. ............... 156/230 |
| 5,747,177 A | 5/1998 | Torimoto et al. |
| 5,750,234 A | 5/1998 | Johnson et al. |
| 5,759,477 A | 6/1998 | Yamamoto |
| 5,783,287 A | 7/1998 | Yamamoto et al. |
| 5,817,402 A | 10/1998 | Miyake et al. |
| 5,840,783 A | 11/1998 | Momchilovich et al. |
| 5,895,624 A | 4/1999 | Reece et al. |
| 5,916,643 A | 6/1999 | Spain et al. |
| 5,919,537 A | 7/1999 | Niazy |
| 5,968,657 A | 10/1999 | Scullin et al. |
| 6,045,744 A * | 4/2000 | Kobayashi et al. ........... 264/51 |
| 6,083,335 A | 7/2000 | Scullin et al. |
| 6,103,328 A | 8/2000 | Niazy |
| 6,113,838 A | 9/2000 | Flynn et al. |
| 6,187,233 B1 | 2/2001 | Smith |
| 6,206,998 B1 | 3/2001 | Niazy |
| 6,284,183 B1 | 9/2001 | Roys et al. |
| 6,319,438 B1 | 11/2001 | Smith et al. |
| 6,551,432 B1 | 4/2003 | Spain et al. |
| 6,696,117 B1 | 2/2004 | Dey et al. |
| 6,805,927 B1 | 10/2004 | Dey et al. |
| 6,805,959 B1 | 10/2004 | Dey et al. |
| 6,849,339 B1 | 2/2005 | Dey et al. |
| 2002/0009598 A1 | 1/2002 | LaFave et al. |
| 2002/0050665 A1 | 5/2002 | Roys et al. |
| 2003/0099789 A1 | 5/2003 | Dey et al. |
| 2003/0099790 A1 | 5/2003 | Dey et al. |
| 2003/0099840 A1 | 5/2003 | Dey et al. |
| 2003/0170460 A1 | 9/2003 | Sienkiewicz et al. |
| 2004/0033365 A1 | 2/2004 | Dey et al. |

FOREIGN PATENT DOCUMENTS

| | | |
|---|---|---|
| EP | 0230364 A2 | 7/1987 |
| EP | 0230364 B1 | 7/1987 |
| EP | 0230364 B2 | 7/1987 |
| EP | 0266107 A2 | 5/1988 |
| EP | 0266107 B2 | 5/1988 |
| EP | 0348310 A2 | 12/1989 |
| EP | 0348310 A3 | 12/1989 |
| EP | 0348310 B1 | 12/1989 |
| WO | WO 84/03473 | 9/1984 |
| WO | WO 86/01771 | 3/1986 |

OTHER PUBLICATIONS

Dupont; "DuPont Teflon and Tefzel Films;" 2003; pp. 1-8.
Dupont; "Tedlar SP polyvinyl fluoride film;" Product and Properties Guide; 1996; United States.
Dupont; "DuPont Teflon and Tefzel Films;" Types LZ, CLZ, and CLZ-20; 2003.
John Peter; "Farewell to Paint Shops?" Automotive industries; Nov. 2002; pp. 20-21.
Matthew H. Naitove; "Trend-Setting Technologies Garner SPE Awards;" Automotive Innovation; Dec. 2002; pp. 50-54.
Patrick A. Toensmeier; "Automotive is Fertile Ground for Growth;" Modern Plastics; Nov. 2002; p. 41.
"Back to the Future Thirty-Second Annual Innovation Awards Program;" Nov. 18, 2002.
William Ng; "SPE Honors Pacesetting Plastics Developments;" Modern Plastics; Jan. 2003; pp. 58-59.
Rexam, Fluorex Paint Film Introduces a Full Spectrum of Solutions, Feb. 22, 1999.
Rexam, Fluorex Paint Film can be easily Incorporated into Existing Systems, Feb. 22, 1999.
Thomas M. Ellison, No-emission dry paint films, Chemtech, pp. 36-39, May 25, 1995.
Lilli Manolis Sherman, Decorating With Formable Films, In Mold Decorating, pp. 44-49, Jan. 2004.
Robert Leaversuch, Thermoformer is Reinvented Through Process Innovation, Jan. 2004.
Fluorex Exterior Film Laminates Processing Guide, REXAM, Nov. 2, 1999.
Thermoformable Bright Film for Automotive Trim, REXAM weatherable films, Jul. 2001.
Technical Information Data Sheet, Feb. 10, 1986.
Joseph R. Flwsher, Jr., Polyether block amide: high-performance TPE, Modern Plastics, Sep. 1987.
Cost Model Analysis Vacpres Process, Android Industries Guardian Industries, Containing summary, previous cost model, revised cost model, sensitivity analysis and dry paint film quotes, Oct. 27, 1998.
Thermoforming Project Timing for Corvette Front License Plate Cover, Jan. 15, 1998.
Documents regarding Paint Performance on Exterior Plastic Parts, Oct. 27, 1989.

* cited by examiner

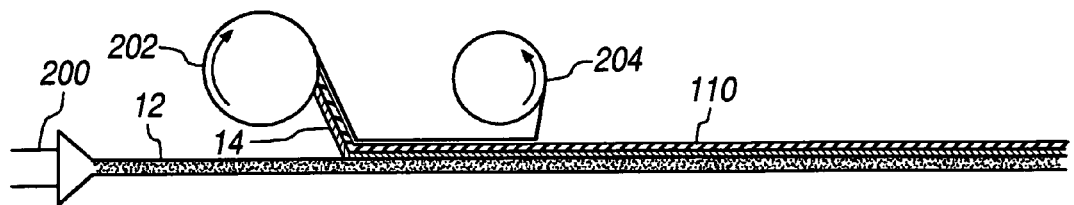
FIGURE 57
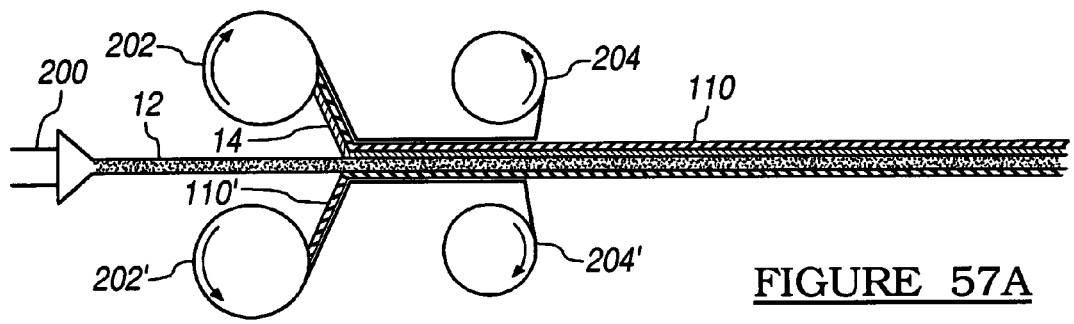
FIGURE 57A
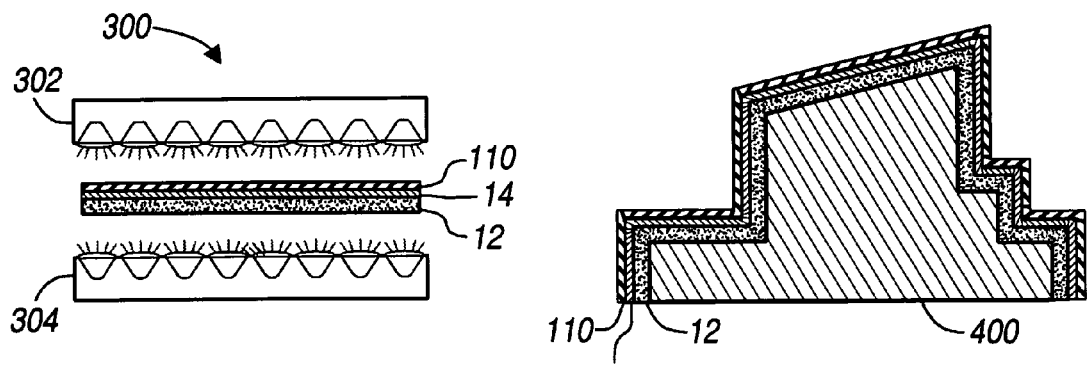
FIGURE 58
FIGURE 59
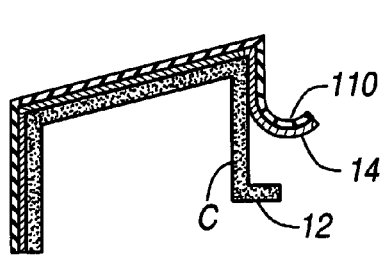
FIGURE 61
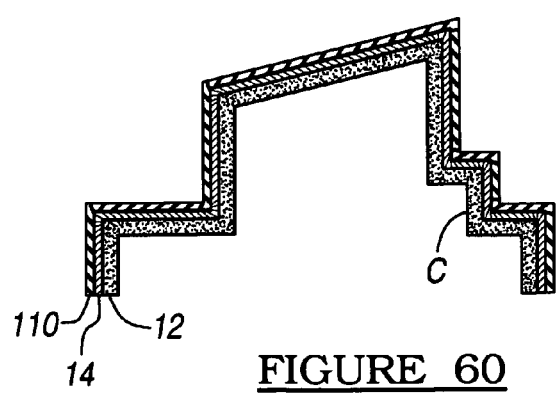
FIGURE 60

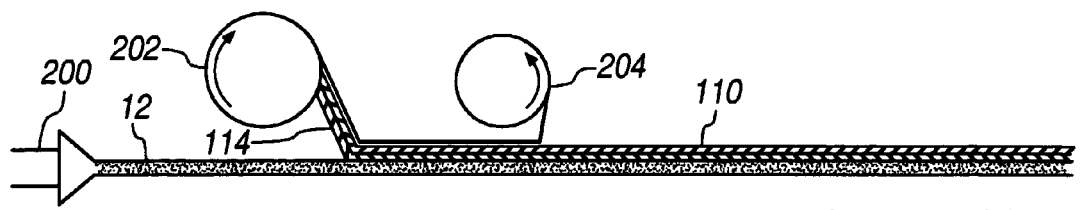
FIGURE 62
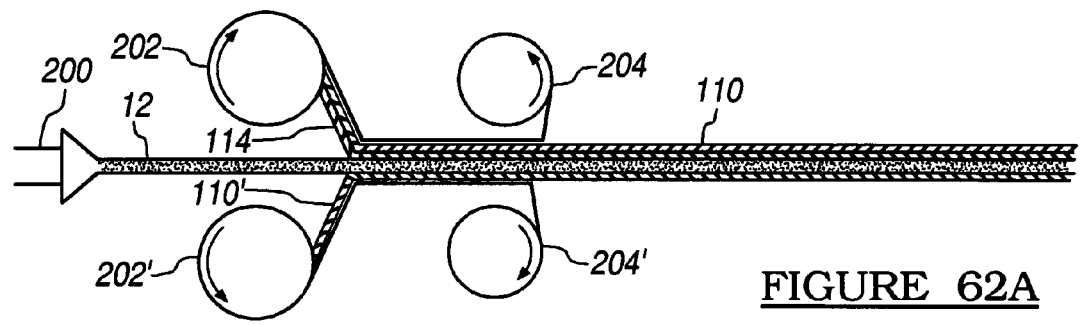
FIGURE 62A
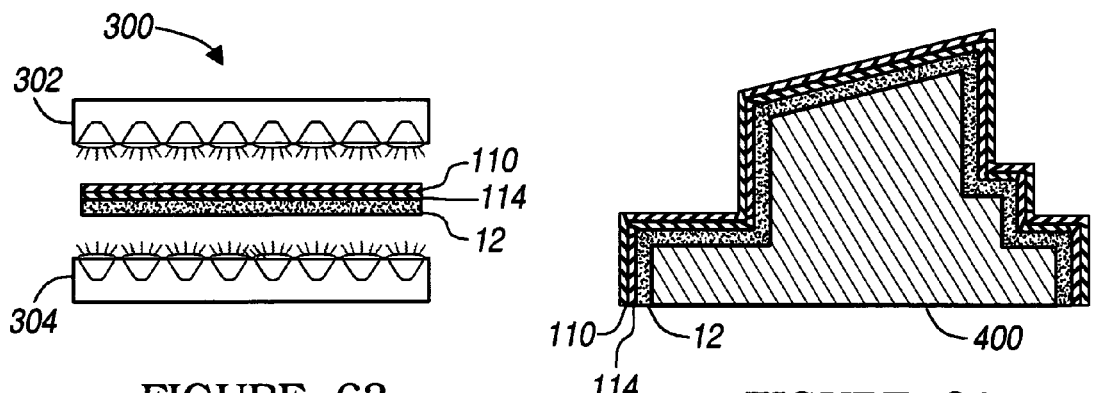
FIGURE 63
FIGURE 64
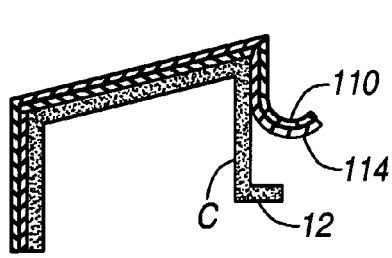
FIGURE 66
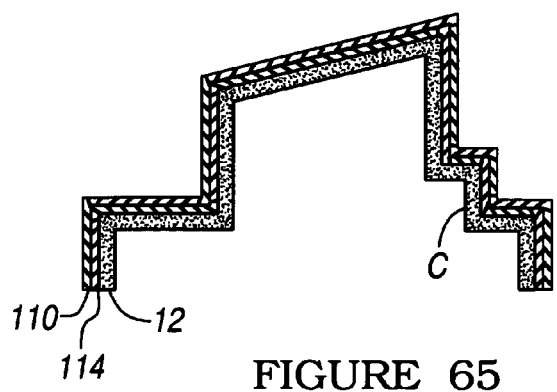
FIGURE 65

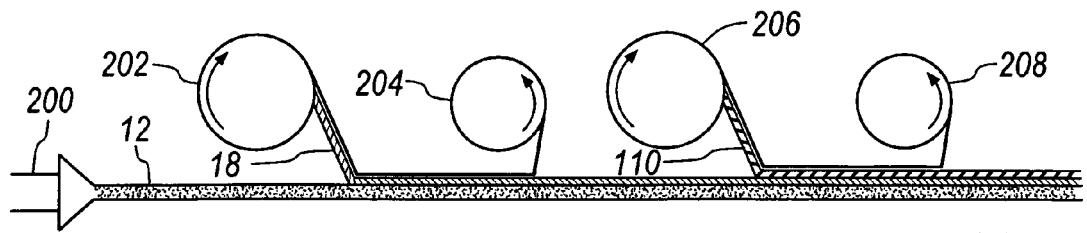
FIGURE 77
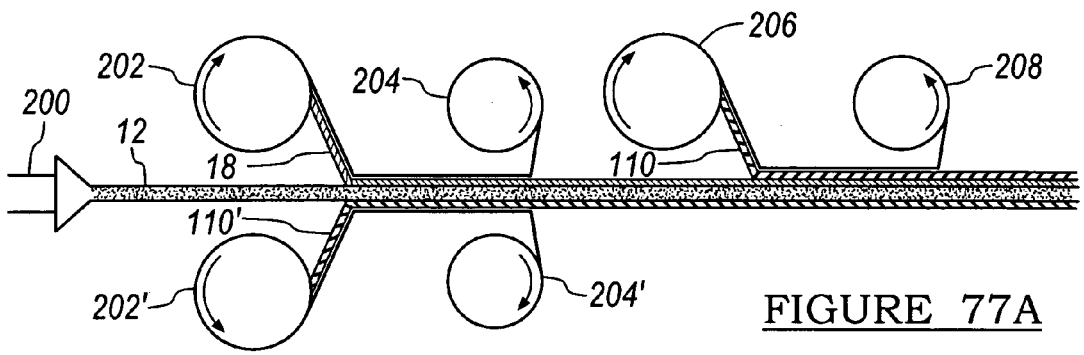
FIGURE 77A
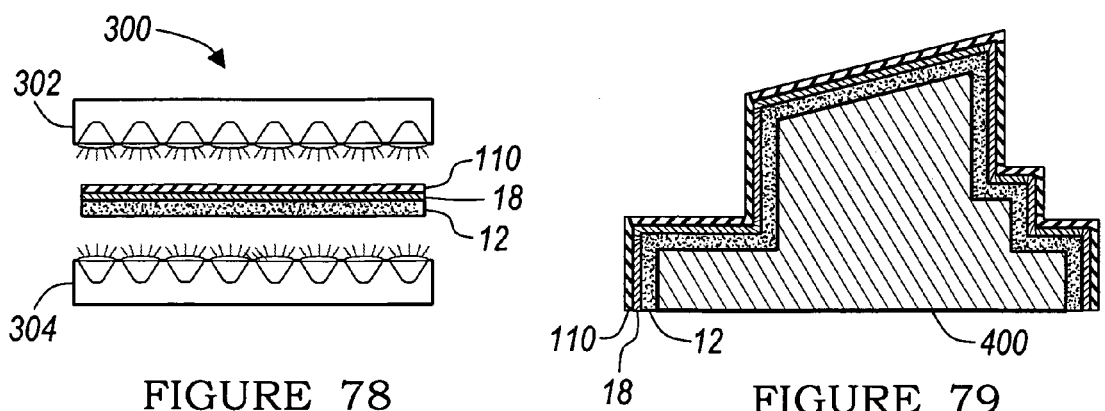
FIGURE 78
FIGURE 79
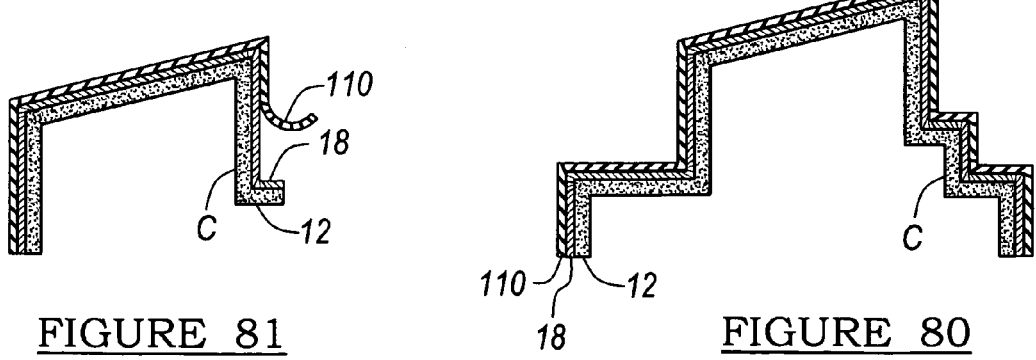
FIGURE 81
FIGURE 80

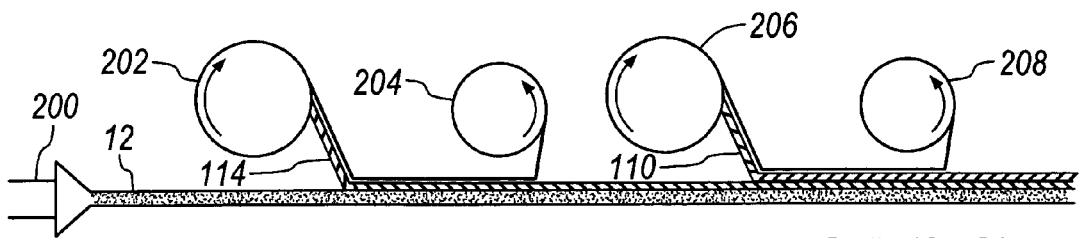
FIGURE 97
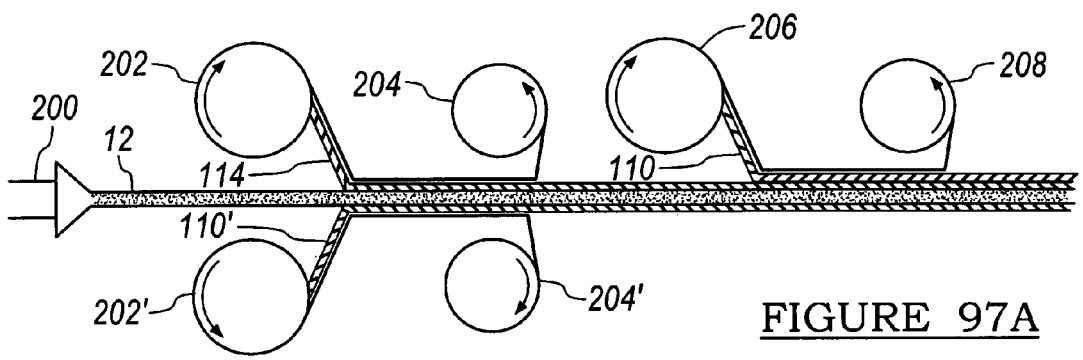
FIGURE 97A
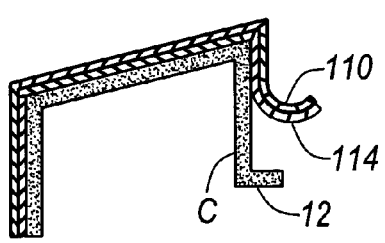
FIGURE 98
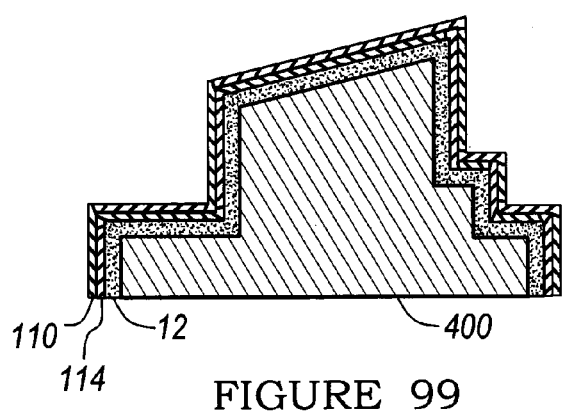
FIGURE 99
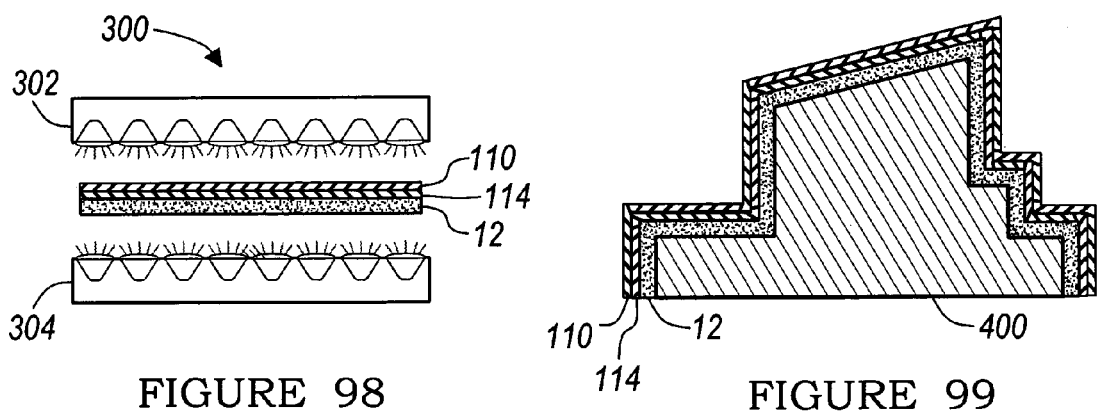
FIGURE 101
FIGURE 100

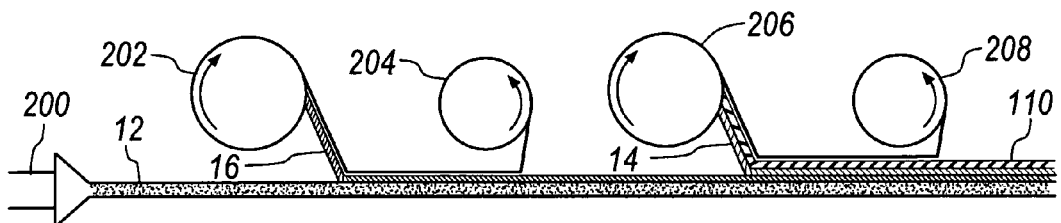
FIGURE 122
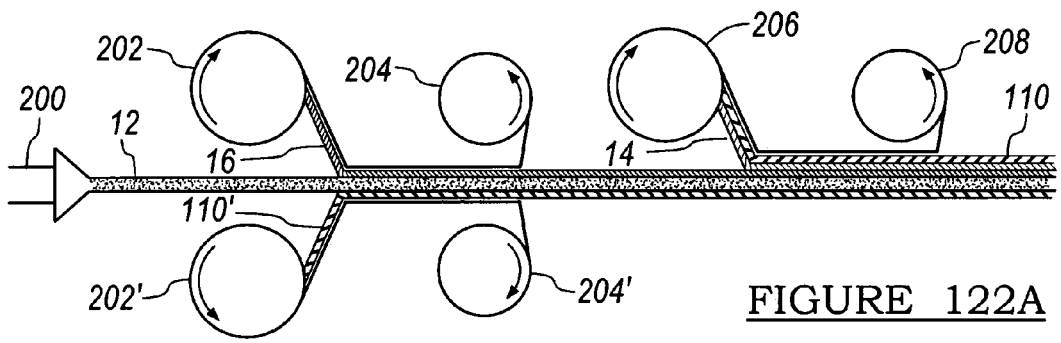
FIGURE 122A
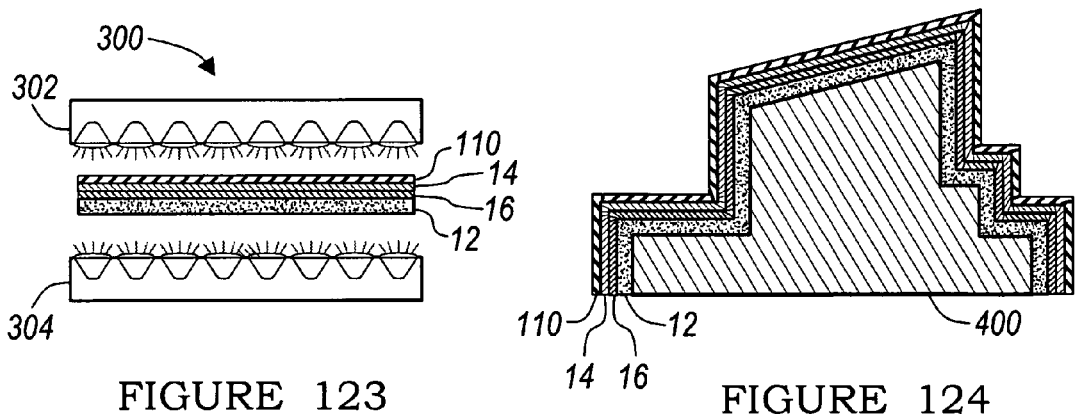
FIGURE 123
FIGURE 124
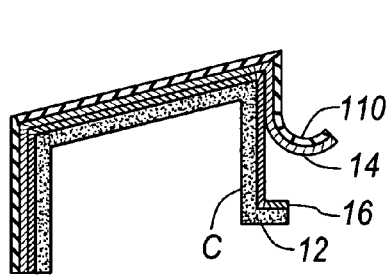
FIGURE 126
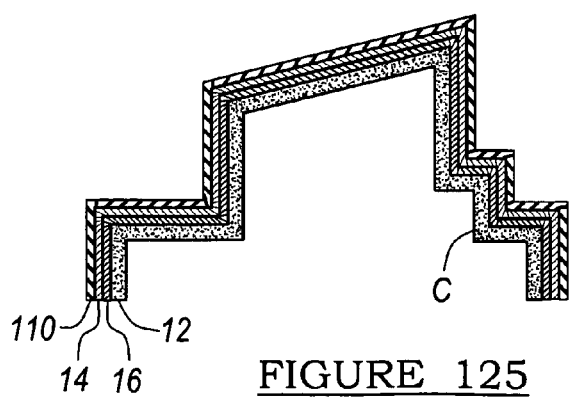
FIGURE 125

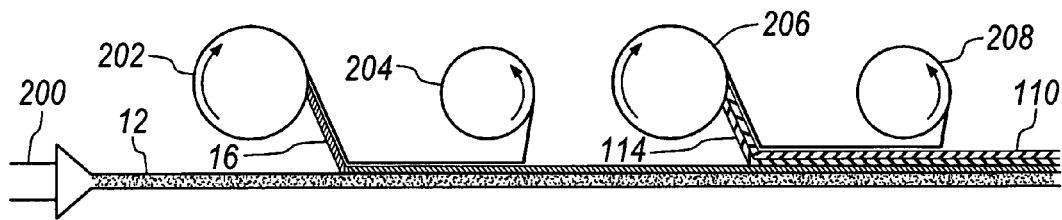
FIGURE 127
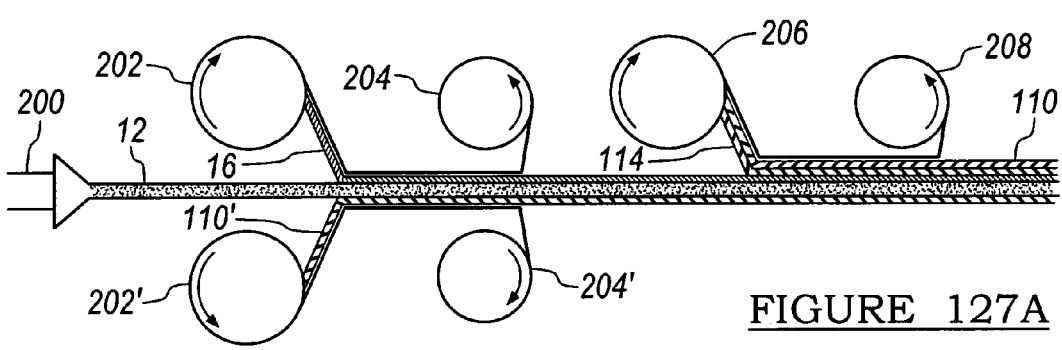
FIGURE 127A
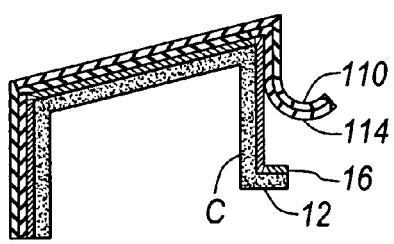
FIGURE 128
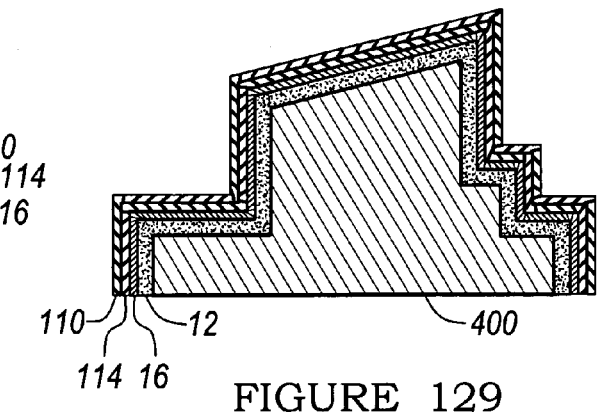
FIGURE 129
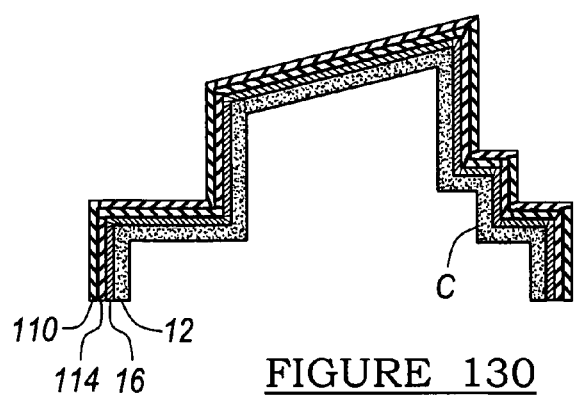
FIGURE 130
FIGURE 131

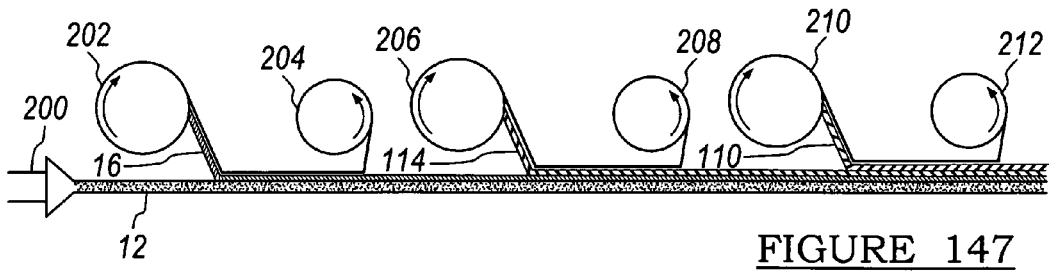
FIGURE 147
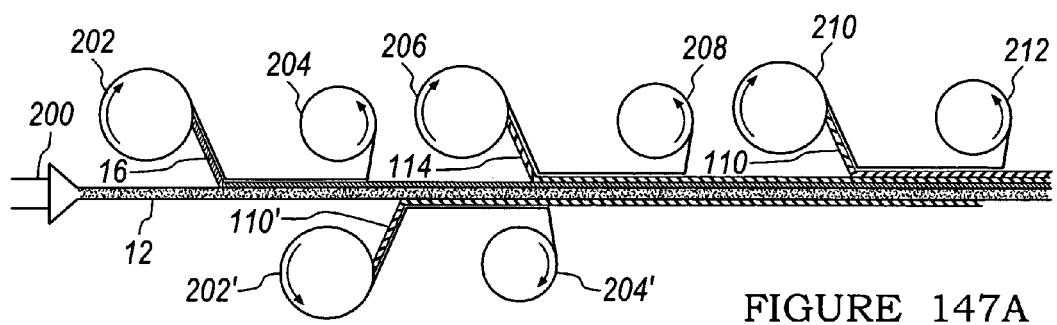
FIGURE 147A
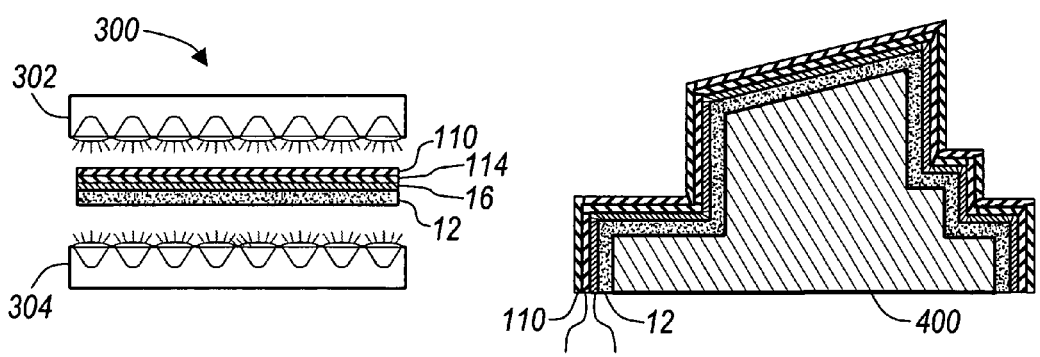
FIGURE 148
FIGURE 149
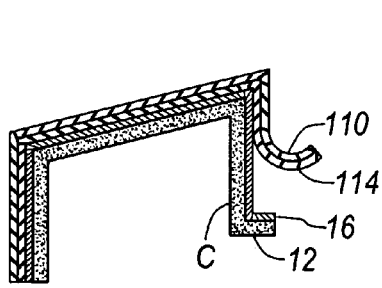
FIGURE 151
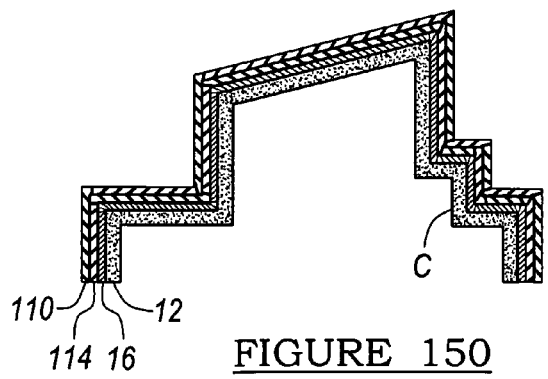
FIGURE 150

DECORATIVE SYSTEM COMPOSITE AND METHOD

CROSS-REFERENCE TO RELATED APPLICATIONS

The instant application claims priority to U.S. Provisional Patent Application Ser. No. 60/442,944, filed Jan. 27, 2003, and U.S. Provisional Patent Application Ser. No. 60/534,486, filed Jan. 6, 2004, the entire specifications of both of which are expressly incorporated herein by reference.

FIELD OF THE INVENTION

The present invention generally relates to thermoforming of plastic articles, and more particularly to new and improved decorative laminate composites and methods for making the same.

BACKGROUND OF THE INVENTION

In an effort to decrease automobile weight and increase energy efficiency, many automobile manufacturers are employing automobile parts that are fabricated from lightweight materials, such as plastic materials (e.g., thermoplastics and thermosets). One such class of plastic materials is generally known as thermoplastic polyolefins (TPO's), such as various grades of polyethylene or polypropylene. Another such class would consist of ABS or ABS/polycarbonate blends.

Some of these parts are produced by thermoforming, e.g., vacuum forming, which is generally defined as a process wherein a heated, and thus softened, amount of plastic material (typically in the form of a sheet) is molded into the desired shape through vacuum suction of the warmed plastic onto a pre-formed mold.

Thermoforming can be used for many thicknesses of plastic sheets and can provide great strength in its finished moldings. Fairly complex moldings can be achieved with thermoforming. However, these plastic materials do not typically have a desirable finish (or prematurely lose that finish when exposed to the elements) for use with automotive applications. Furthermore, these plastic materials do not possess sufficient wall thickness. For example, certain conventional automotive components are thermoformed, trimmed and then injection molded.

Various approaches have been taken to providing a high quality automotive paint-like finish to lightweight parts, such as molded plastic parts. One approach that has received considerable attention uses a surfacing film system having a decorative layer (e.g., a preformed colorant or paint-like film) that can be used to impart a surface effect (e.g., color or other visual pattern) to a thermoformed part. These surfacing film systems are generally referred to as paint or color-containing films. An example of this process can be found in U.S. Pat. No. 5,215,826 to Shimanski et al., the entire specification of which is expressly incorporated herein by reference.

By way of a non-limiting example, paint or color-containing films, especially those used in producing colored automotive components, can be comprised of a decorative layer (e.g., paint, ink, or other colorant), an optional adhesive layer (e.g., a heat-activated adhesive), a preferably scratch resistant optional top clear coat layer, and an optional removable casting base (e.g., a polyester-based sheet). These types of paint or color-containing films are readily commercially available from Avery Dennison Corp. (Pasadena, Calif.), Soliant L.L.C. (Lancaster, S.C.) and Dorrie International (Farmington Hills, Mich.). These paint or color-containing films are generally available in a wide range of colors, including solid metallic colors, and are primarily used in a number of automotive applications.

Additionally, automotive component manufacturers have also used other types of color-containing films, such as mold-in-color (MIC) films. One particular MIC film currently being used is a MIC ionomer film readily commercially available from Mayco Plastics, Inc. (Sterling Heights, Mich.) under the trade name FORMION. The MIC ionomer film typically consists of four discrete layers with a back molded (e.g., injection molded) thermoplastic polyolefin substrate. The layers typically consist of a clear ionomer layer, a colored ionomer layer, an adhesive layer, and a backing layer.

Regardless of the type of paint or color-containing film used, it is sometimes necessary to employ a removable release or masking layer to protect the surface of the component to be thermoformed, due in part to the particular processing parameters encountered during the thermoforming process. This is especially true of thick sheet polyolefin thermoforming. Thick sheet thermoforming typically employs sheets having a thickness in the range of about 0.06 to about 0.5 inches.

Typically, when the thermoforming process is completed, the component is removed from the mold surface and the release layer is then removed. Alternatively, the release layer can be left in place, for example, until the component reaches its final destination, whereupon the release layer can then be removed, thus protecting the outer surface of the component.

Unfortunately, many conventional release layer materials have several significant disadvantages, such as relatively low tensile strength, especially at the elevated temperatures typically associated with conventional thermoforming techniques, as well as undesirable bag/sag/drape control characteristics. Accordingly, when the TPO substrate is heated, regardless of whether a paint or color-containing film is present or not, the release layer exhibits significant bag/sag/drape control problems which are manifested in the TPO substrate billowing out from the frame bracket. When the TPO substrate is removed from the oven and placed over the mold face, the draping TPO material tends to gather and clump when the suction force is applied to the mold. Thus, the finished thermoformed part has significant surface irregularities and cannot be used, thus raising production costs and causing production delays.

Accordingly, there exists a need for new and improved support film systems, especially for use with paint or color-containing films, wherein the support film systems exhibit relatively high tensile strength, especially at the elevated temperatures typically associated with conventional thermoforming techniques, as well as relatively good bag/sag/drape control characteristics. Additionally, these new and improved support film systems should preserve, or at least prevent the loss of gloss characteristics of the paints films, if used, or aid in the thermoformability of the underlying plastic substrates, if paint or color-containing films are not used.

SUMMARY OF THE INVENTION

In accordance with the general teachings of the present invention, new and improved decorative laminate composites and methods for forming the same are provided. New and improved support film systems are employed to form the decorative laminate composites. These support film systems of the present invention possess enhanced tensile strength, especially at elevated temperatures typically encountered during thermoforming processes. Additionally, these support film systems preserve, or at least prevent the loss of gloss characteristics of the paint or color-containing films, if used, or aid in the thermoformability of the underlying plastic substrates, if paint or color-containing films are not used.

By way of a non-limiting example, the support films preferably possess a tensile strength greater than 0.5 pounds per linear inch (pli) at about 300° F. These support films can be used in conjunction with various optional release films. The support films of the present invention are particularly suitable for use with surfacing film systems, such as but not limited to various paint or color-containing films. The support films of the present invention are also especially suitable for use in thermoforming operations to produce contoured automotive components for interior and/or exterior applications. Because of the enhanced properties of the support film of the present invention, the support films preferably exhibit enhanced bag/sag/drape control characteristics. Additionally, the support films of the present invention preferably produce components that have enhanced gloss characteristics, as compared to conventional production methods.

In accordance with a first embodiment of the present invention, a thermoformable support film is provided, wherein the support film is comprised of a material having a tensile strength greater than 0.5 pli at 300° F., wherein the support film is operable to releasably adhere to and support a polymeric substrate during a thermoforming process.

In accordance with a second embodiment of the present invention, a laminate system is provided, comprising: (1) a thermoformable support film comprised of a material having a tensile strength greater than 0.5 pli at 300° F.; and (2) a polymeric substrate in abutting relationship with the support film; wherein the support film is operable to releasably adhere to and support the polymeric substrate during a thermoforming process.

In accordance with a third embodiment of the present invention, a support film system is provided, comprising: (1) a thermoformable support film comprised of a material having a tensile strength greater than 0.5 pli at 300° F.; and (2) a release layer in abutting relationship with the support film; wherein the release layer is operable to releasably adhere to a polymeric substrate during a thermoforming process; wherein the support film is operable to support the polymeric substrate during the thermoforming process.

In accordance with a fourth embodiment of the present invention, a thermoformable support film system is provided, wherein the support film is comprised of: (1) a support film comprised of a material having a tensile strength greater than 0.5 pli at 300° F., wherein the support film is operable to releasably adhere to and support a polymeric substrate during a thermoforming process; and (2) a paint or color-containing film system in abutting relationship with the support film; wherein the support film is operable to releasably adhere to the paint or color-containing film system.

In accordance with a fifth embodiment of the present invention, a thermoformable support film system is provided, wherein the support film is comprised of: (1) a support film comprised of a material having a tensile strength greater than 0.5 pli at 300° F., wherein the support film is operable to releasably adhere to and support a polymeric substrate during a thermoforming process; (2) a paint or color-containing film system in abutting relationship with the support film; and (3) an adhesive film system in abutting relationship with the paint or color-containing film system; wherein the support film is operable to adhere to the paint or color-containing film system.

In accordance with a sixth embodiment of the present invention, a method for forming a support film system is provided, comprising: (1) providing a thermoformable support film comprised of a material having a tensile strength greater than 0.5 pli at 300° F.; and (2) providing a release layer in abutting relationship with the support film; wherein the release layer is operable to releasably adhere to a polymeric substrate during a thermoforming process; wherein the support film is operable to support the polymeric substrate during the thermoforming process.

In accordance with a seventh embodiment of the present invention, a method for forming a laminate system is provided, comprising: (1) providing a thermoformable support film comprised of a material having a tensile strength greater than 0.5 pli at 300° F.; and (2) providing a polymeric substrate in abutting relationship with the support film; wherein the support film is operable to releasably adhere to and support the polymeric substrate during a thermoforming process.

In accordance with an eighth embodiment of the present invention, a method for forming a laminate system is provided, comprising: (1) providing a thermoformable support film comprised of a material having a tensile strength greater than 0.5 pli at 300° F.; (2) providing a release layer in abutting relationship with the support film; (3) providing a surfacing film system in abutting relationship with the release layer; and (4) providing a polymeric substrate in abutting relationship with the surfacing film system; wherein the release layer is operable to releasably adhere to the surfacing film system during the thermoforming process; wherein the support film is operable to support the polymeric substrate during the thermoforming process.

In accordance with a ninth embodiment of the present invention, a method for forming a support film system is provided, comprising: (1) providing a thermoformable support film comprised of a material having a tensile strength greater than 0.5 pli at 300° F.; and (2) providing a paint or color-containing film system in abutting relationship with the support film; wherein the support film is operable to releasably adhere to and support the paint or color-containing film system during a thermoforming process.

In accordance with a tenth embodiment of the present invention, a method for forming a support film system is provided, comprising: (1) providing a thermoformable support film comprised of a material having a tensile strength greater than 0.5 pli at 300° F.; (2) providing a paint or color-containing film system in abutting relationship with the support film; and (3) providing an adhesive film system in abutting relationship with the paint or color-containing film system; wherein the support film is operable to releasably adhere to and support the paint or color-containing film system during a thermoforming process.

A further understanding of the present invention will be had in view of the description of the drawings and detailed description of the invention, when viewed in conjunction with the subjoined claims.

BRIEF DESCRIPTION OF THE DRAWINGS

FIG. 57 is a partial schematic view of a lamination process wherein an alternative support film/release film system is applied to an extruded substrate, in accordance with an eighteenth alternative embodiment of the present invention;

FIG. 57A is a partial schematic view of a lamination process wherein an optional second alternative support film is applied to an extruded substrate, in accordance with an eighteenth alternative embodiment of the present invention;

FIG. 58 is a partial schematic view of a thermoforming process wherein the laminated alternative support film/release film system/substrate portion shown in FIG. 57 is heated prior to shaping into the form of a component, in accordance with an eighteenth alternative embodiment of the present invention;

FIG. 59 is a partial sectional view of a mold surface being used to shape the laminated alternative support film/release film system/substrate portion shown in FIG. 58 to the form of the component, in accordance with an eighteenth alternative embodiment of the present invention;

FIG. 60 is a partial sectional view of the formed component comprised of the shaped laminated alternative support film/release film system/substrate portion shown in FIGS. 58–59 once it has been removed from the mold surface, in accordance with an eighteenth alternative embodiment of the present invention;

FIG. 61 is a partial sectional view of the alternative support film/release film system shown in FIGS. 58–60 being removed from the formed component which has been trimmed to the requisite dimensions, in accordance with an eighteenth alternative embodiment of the present invention;

FIG. 62 is a partial schematic view of a lamination process wherein an alternative support film/alternative release film system is applied to an extruded substrate, in accordance with a nineteenth alternative embodiment of the present invention;

FIG. 62A is a partial schematic view of a lamination process wherein an optional alternative second support film is applied to an extruded substrate, in accordance with a nineteenth alternative embodiment of the present invention;

FIG. 63 is a partial schematic view of a thermoforming process wherein the laminated alternative support film/alternative release film system/substrate portion shown in FIG. 62 is heated prior to shaping into the form of a component, in accordance with a nineteenth alternative embodiment of the present invention;

FIG. 64 is a partial sectional view of a mold surface being used to shape the laminated alternative support film/alternative release film system/substrate portion shown in FIG. 63 to the form of the component, in accordance with a nineteenth alternative embodiment of the present invention;

FIG. 65 is a partial sectional view of the formed component comprised of the shaped laminated alternative support film/alternative release film system/substrate portion shown in FIGS. 63–64 once it has been removed from the mold surface, in accordance with a nineteenth alternative embodiment of the present invention;

FIG. 66 is a partial sectional view of the alternative support film/alternative release film system shown in FIGS. 63–65 being removed from the formed component which has been trimmed to the requisite dimensions, in accordance with a nineteenth alternative embodiment of the present invention;

Figure 73:
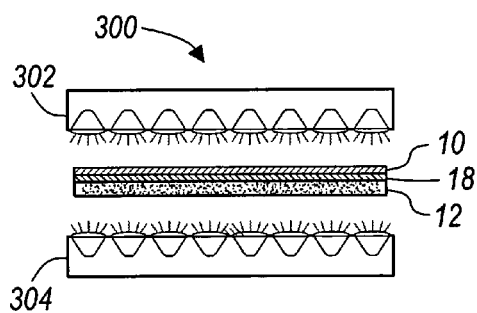
FIG. 73 is a partial schematic view of a thermoforming process wherein the laminated support film/primer film/ substrate portion shown in FIG. 72 is heated prior to shaping into the form of a component, in accordance with a twentieth alternative embodiment of the present invention.
Figure 74:
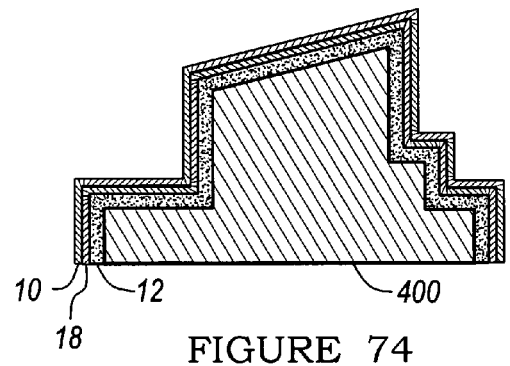
Figure 76:
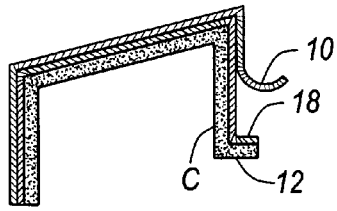
Figure 75:
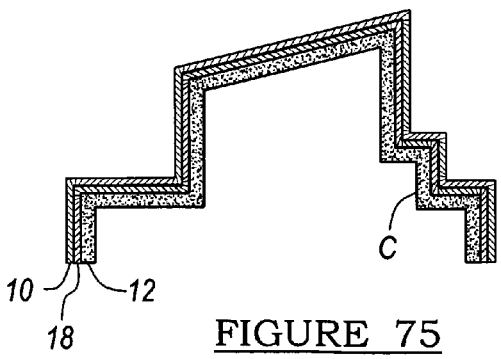
Figure 82:
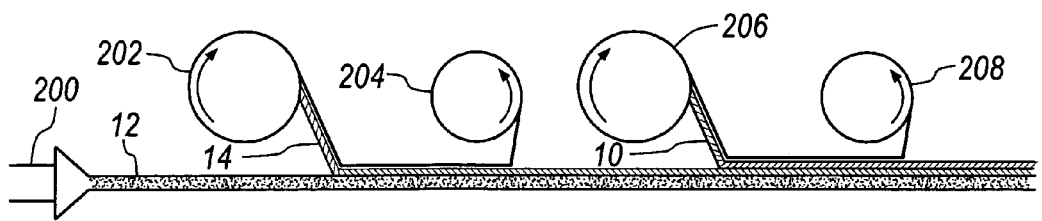
Figure 82A:
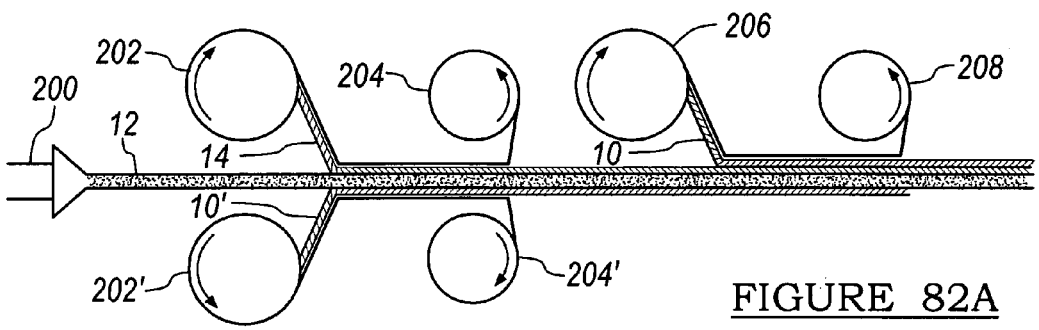
Figure 83:
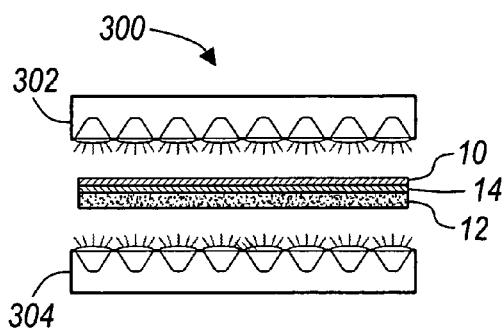
Figure 84:
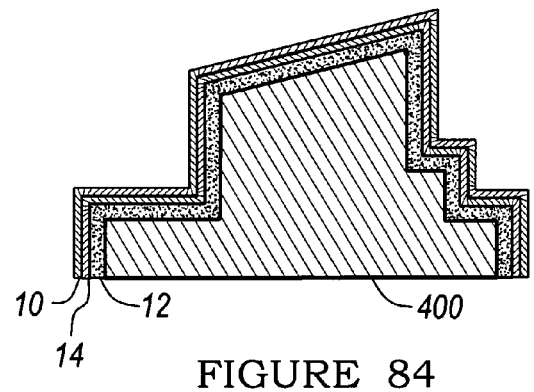
Figure 86:
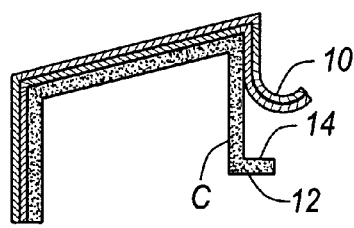
Figure 85:
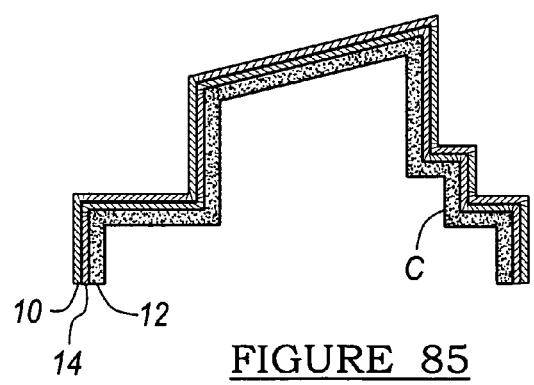
Figure 87:
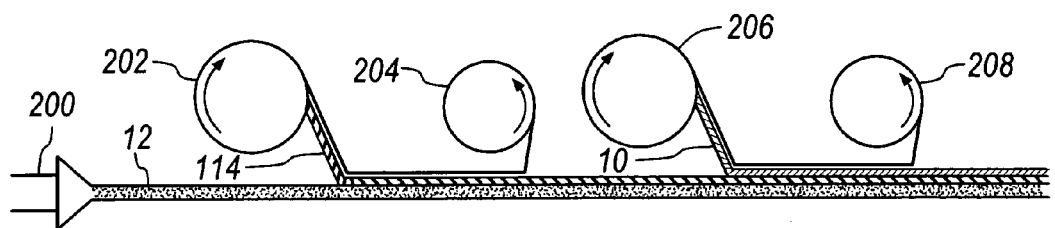
Figure 87A:
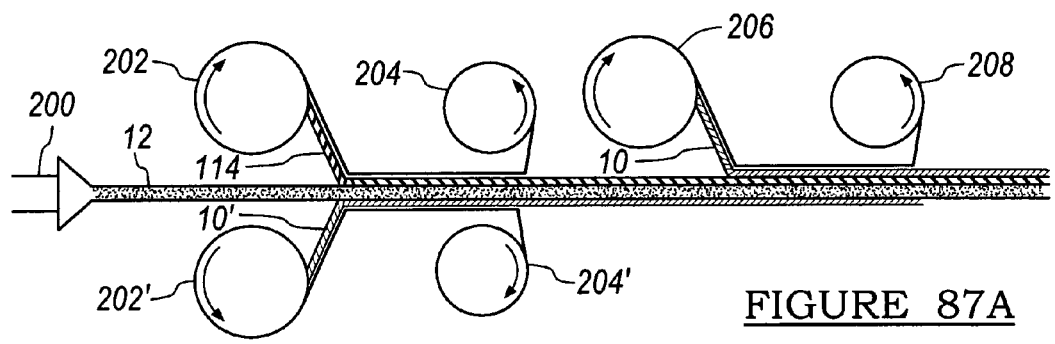
Figure 88:
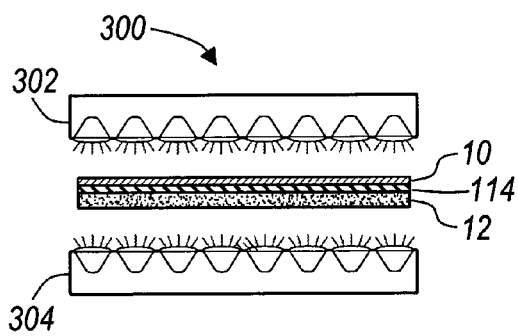
Figure 89:
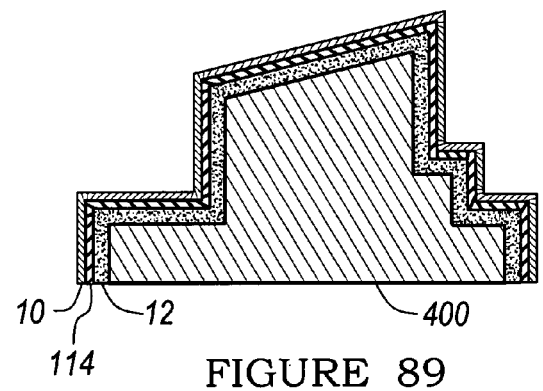
Figure 91:
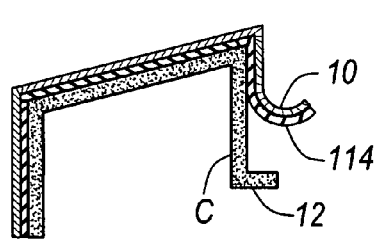
Figure 90:
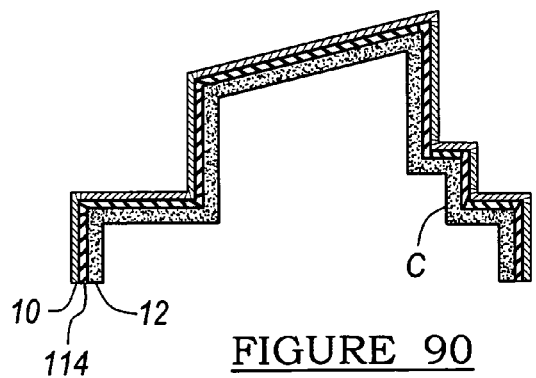
Figure 92:
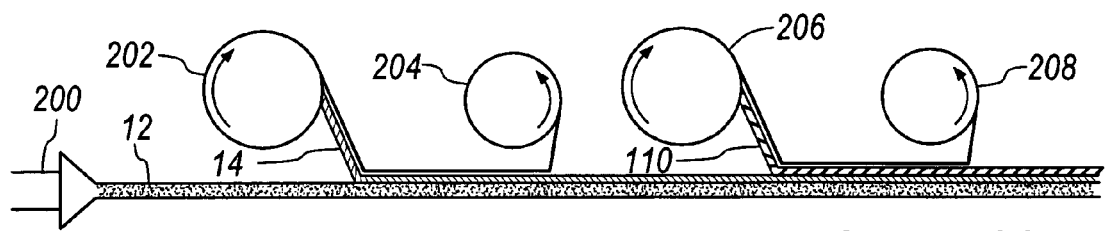
Figure 92A:
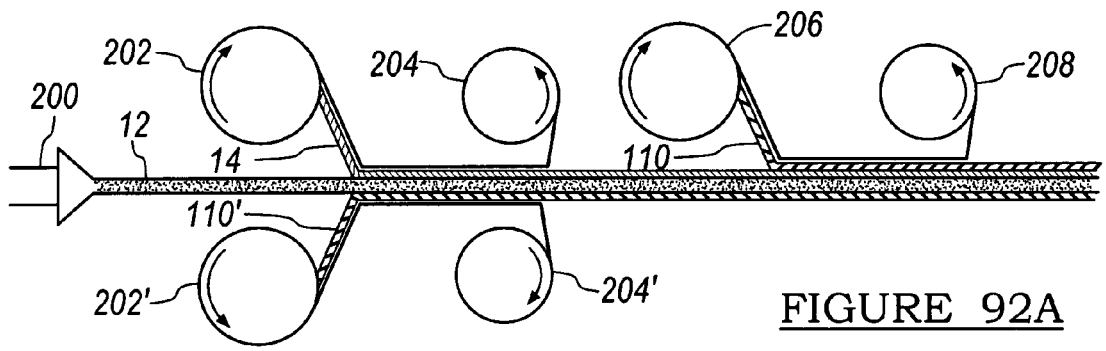
Figure 93:
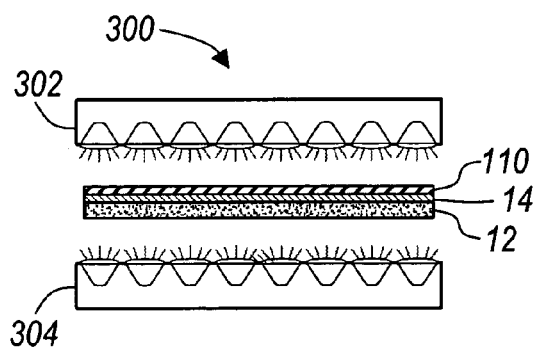
Figure 94:
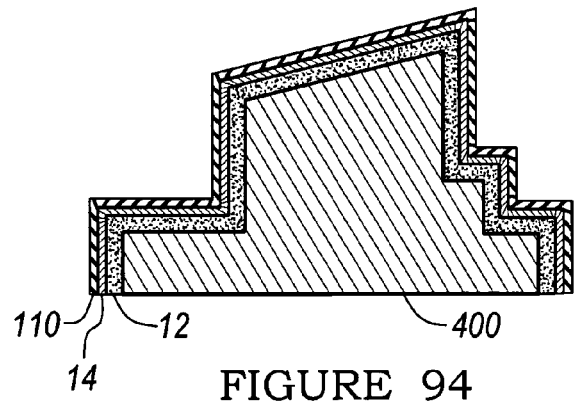
Figure 96:
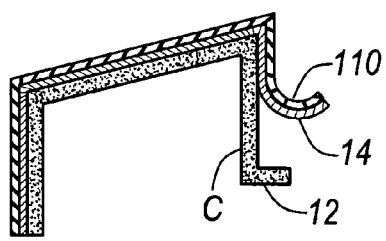
Figure 95:
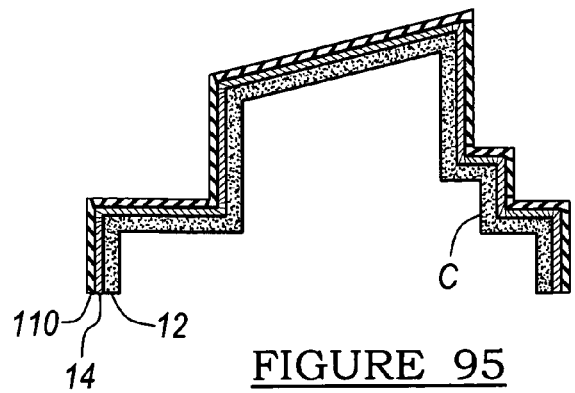
Figure 102:
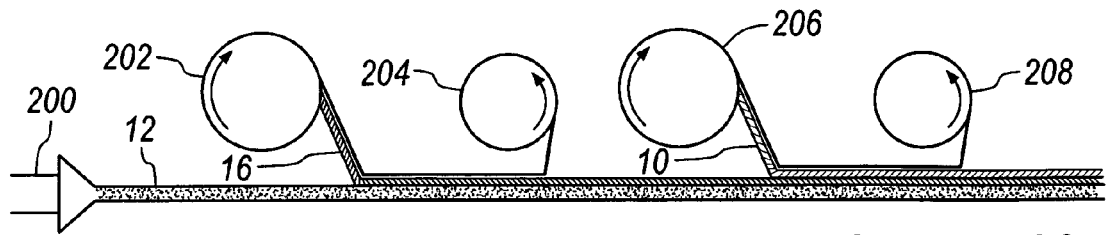
Figure 102A:
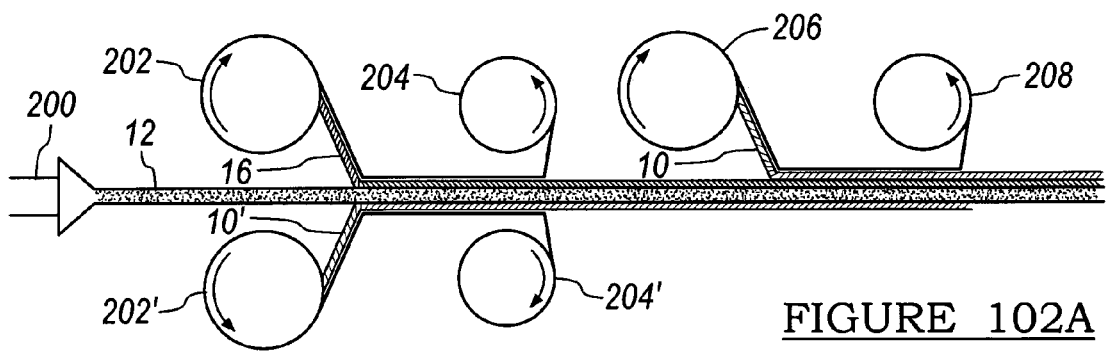
Figure 103:
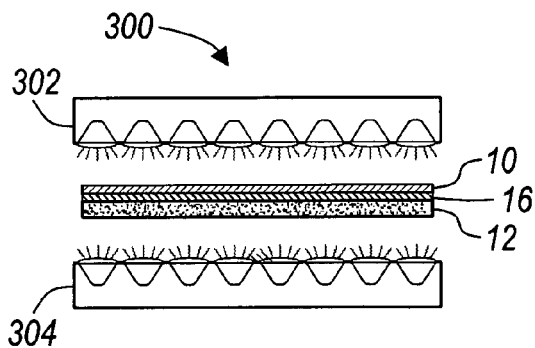
Figure 104:
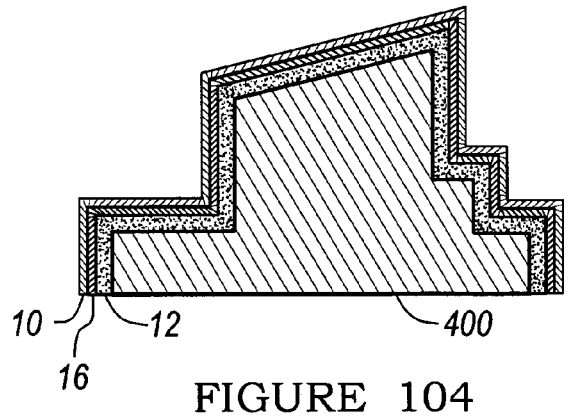
Figure 106:
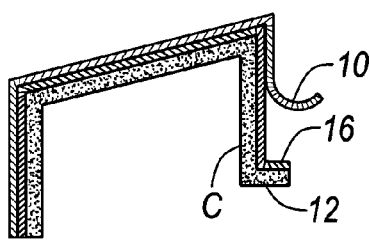
Figure 105:
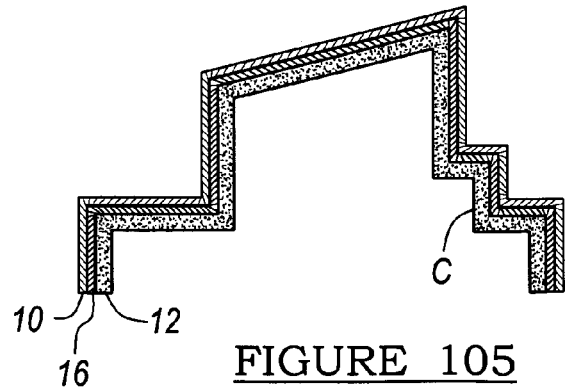
Figure 107:
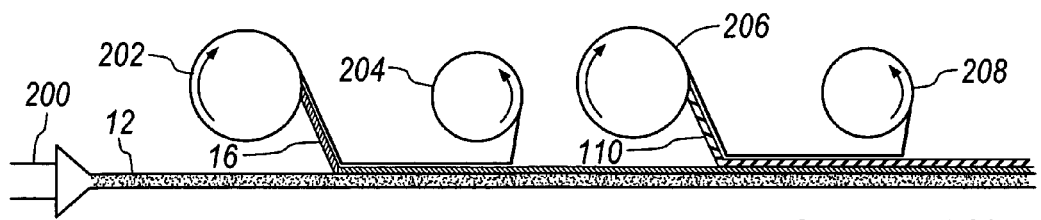
Figure 107A:
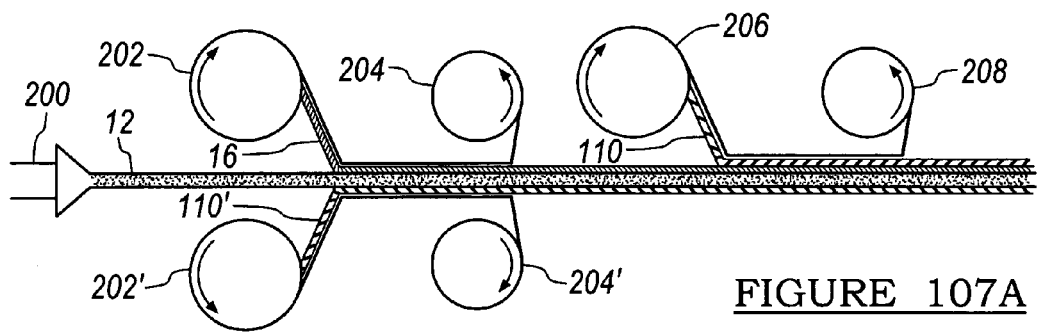
Figure 108:
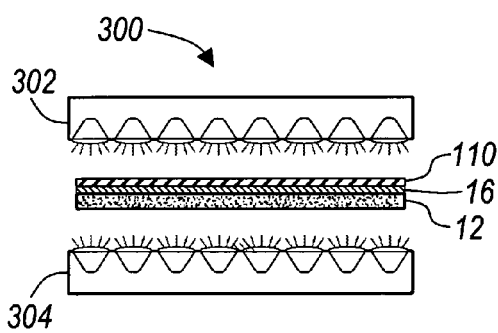
Figure 109:
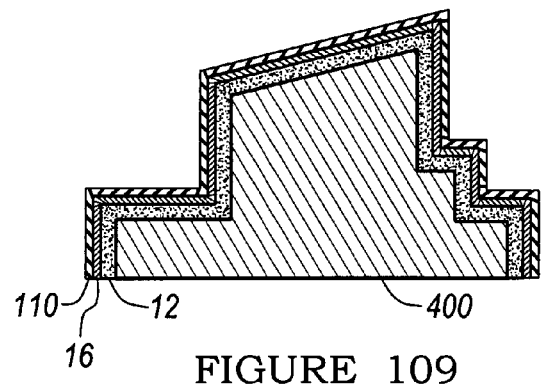
Figure 111:
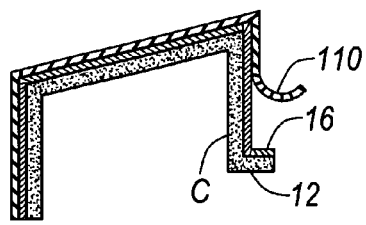
Figure 110:
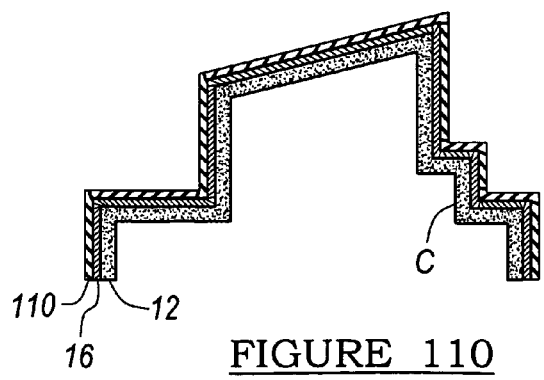
Figure 112:
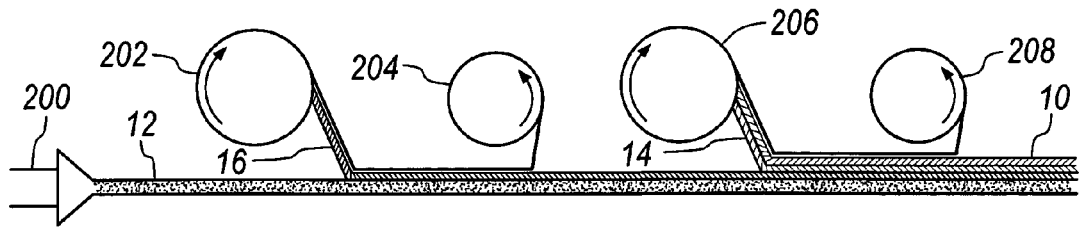
Figure 112A:
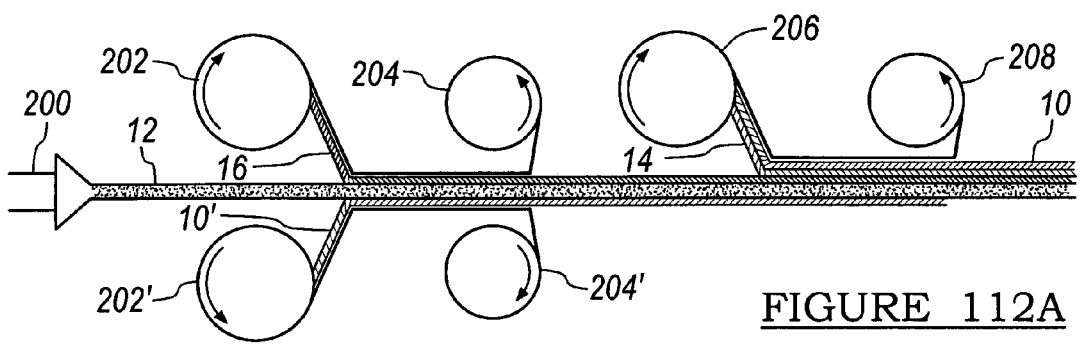
Figure 113:
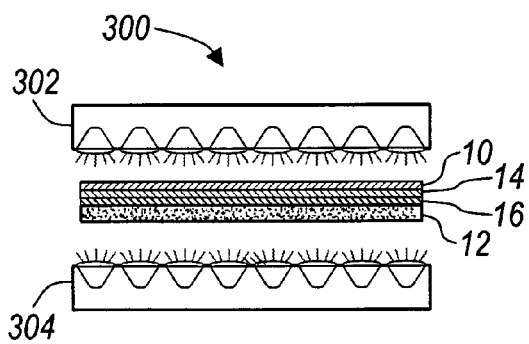
Figure 114:
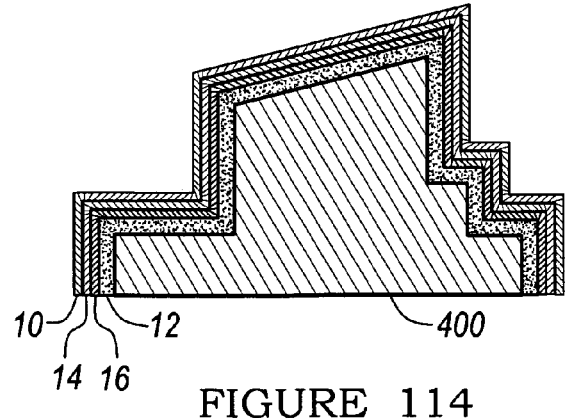
Figure 116:
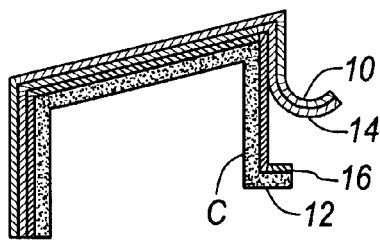
Figure 115:
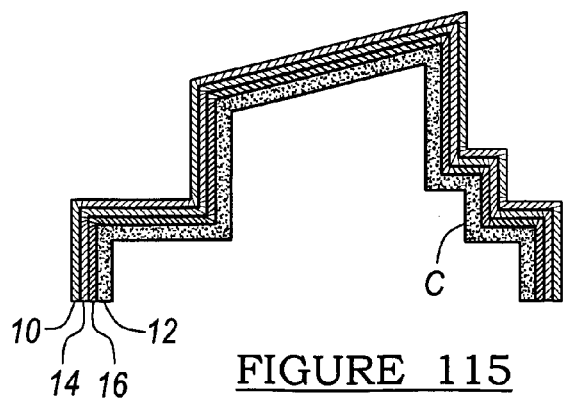
Figure 117:
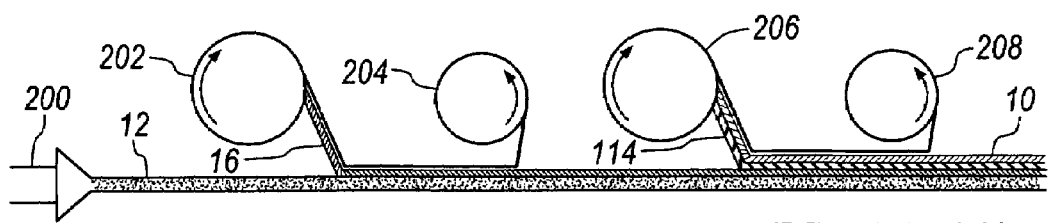
Figure 117A:
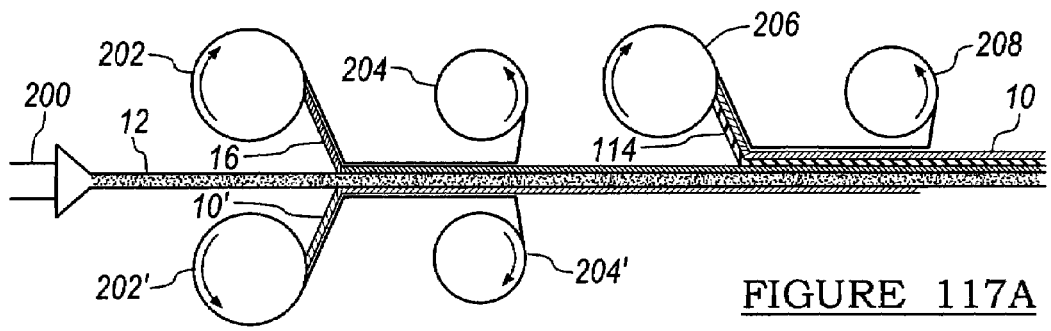
Figure 118:
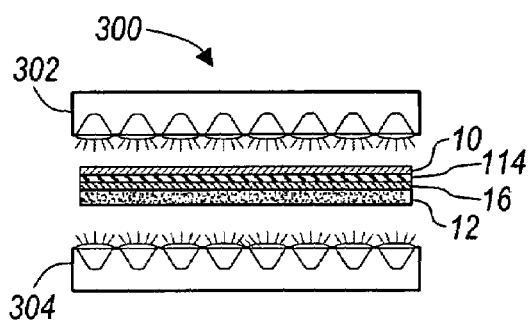
Figure 119:
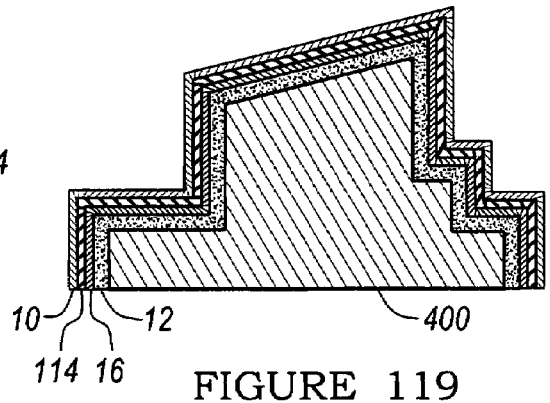
Figure 121:
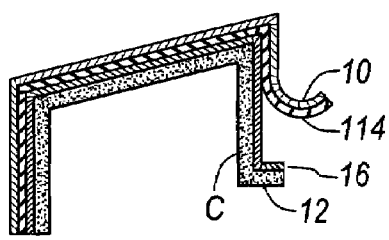
Figure 120:
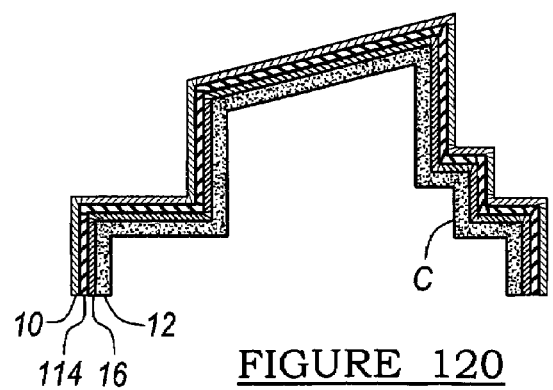
Figure 132:
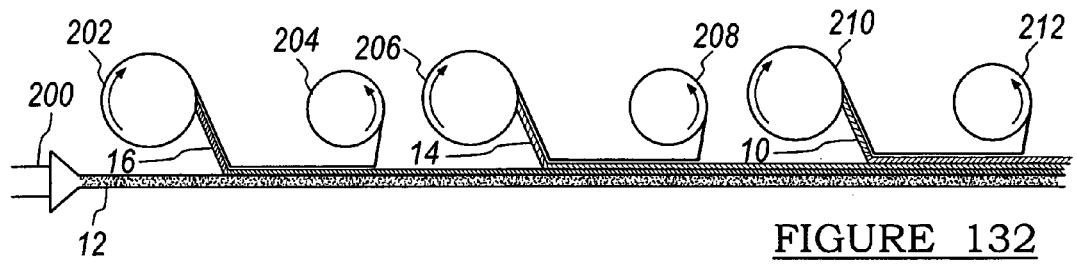
Figure 132A:
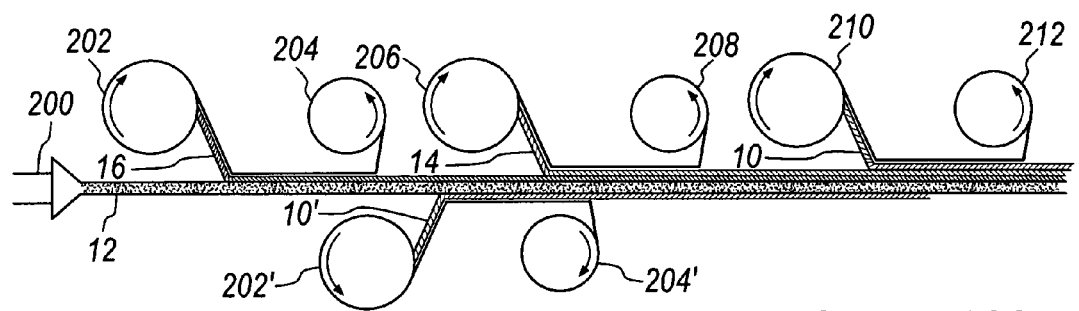
Figure 133:
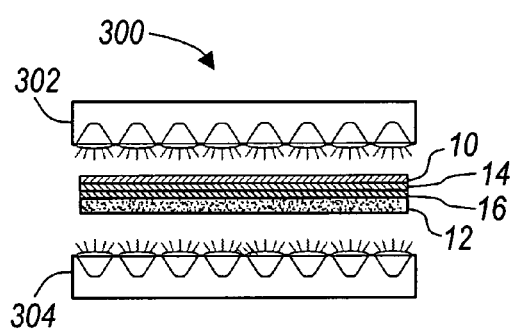
Figure 134:
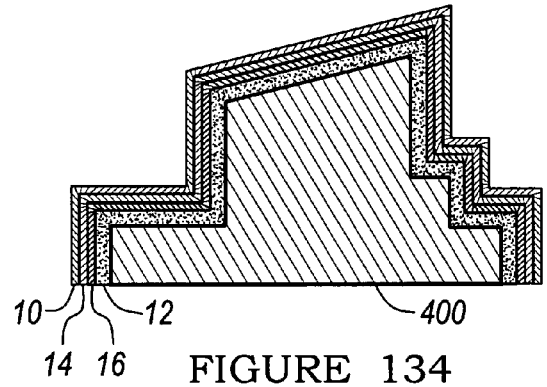
Figure 136:
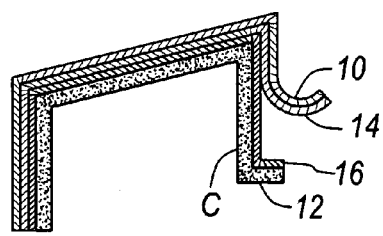
Figure 135:
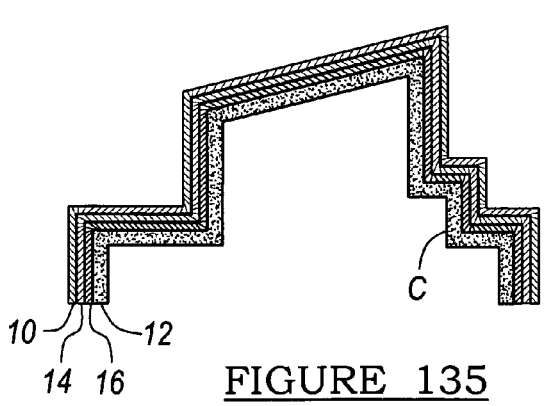
Figure 137:
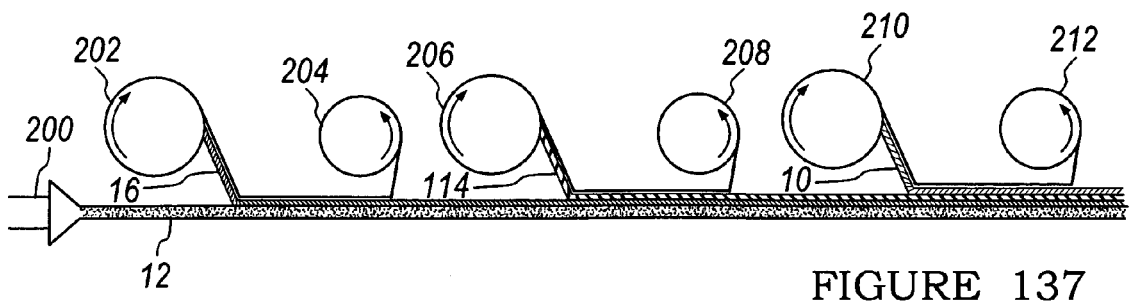
Figure 137A:
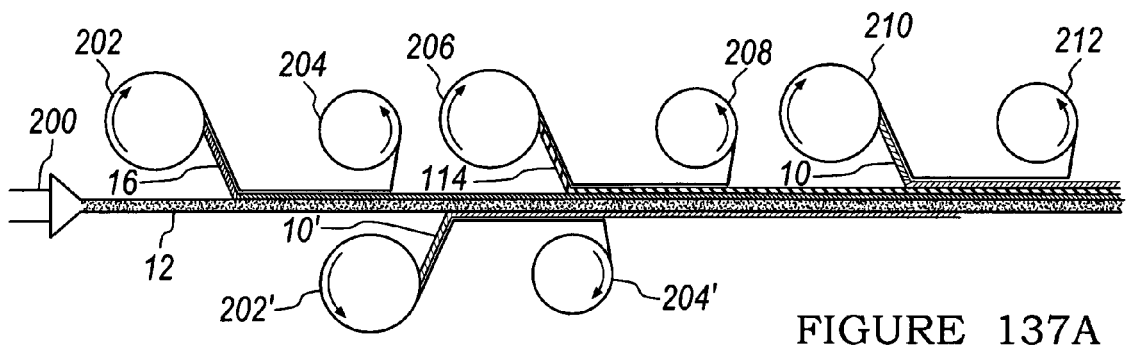
Figure 138:
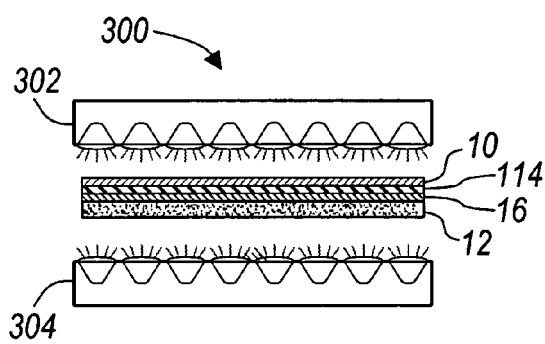
Figure 139:
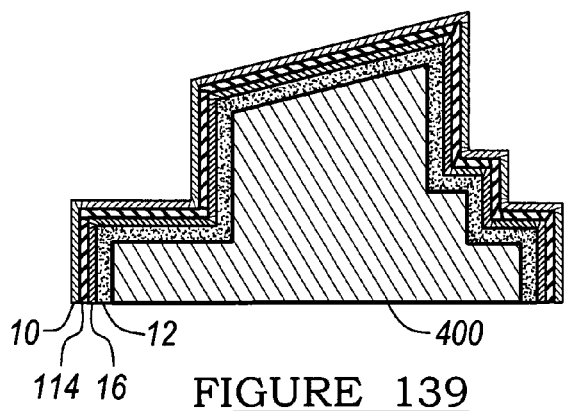
Figure 141:
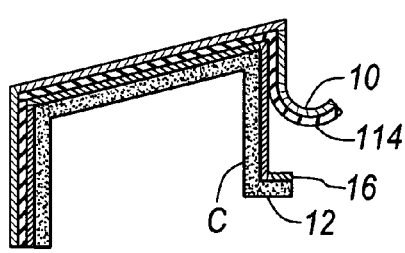
Figure 140:
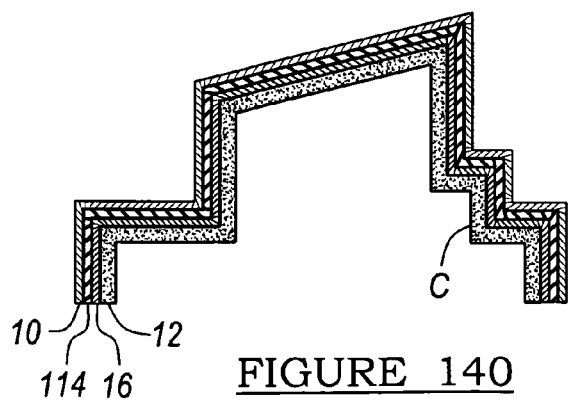
Figure 142:
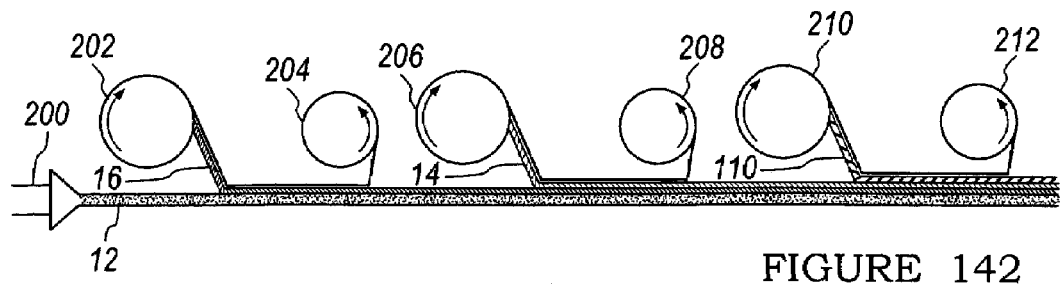
Figure 142A:
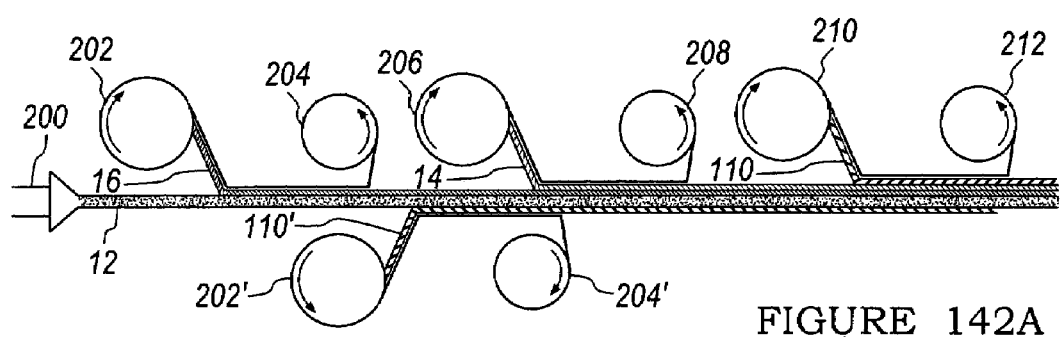
Figure 143:
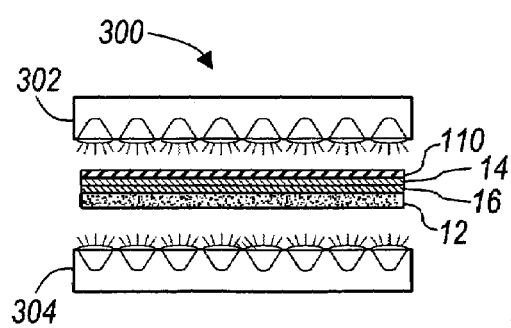
Figure 144:
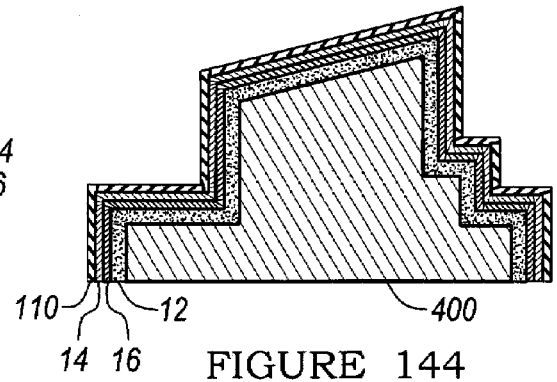
Figure 146:
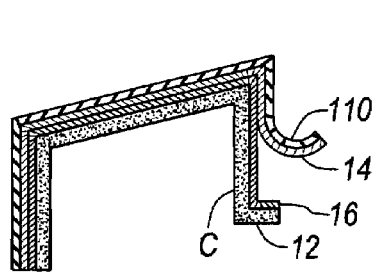
Figure 145:
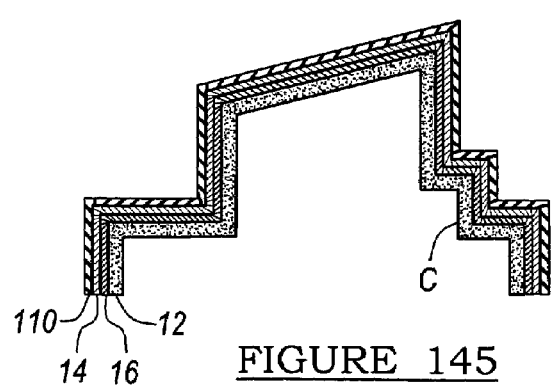
Figure 152:
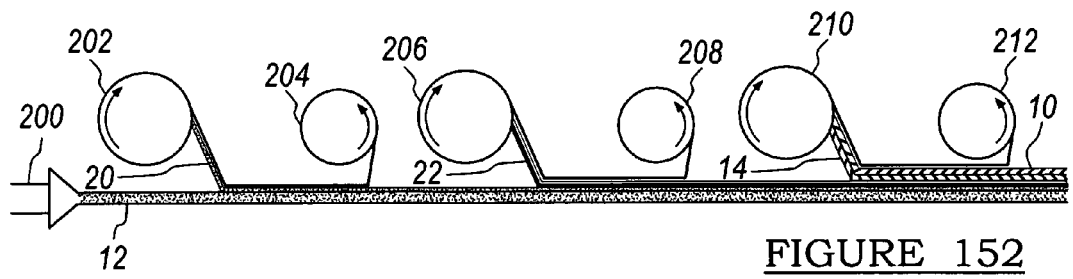
Figure 152A:
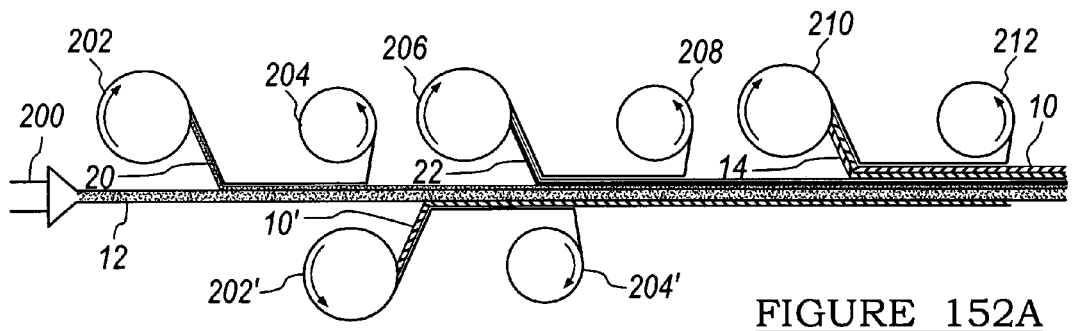
Figure 153:
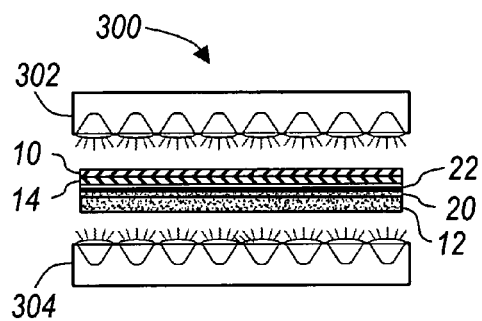
Figure 154:
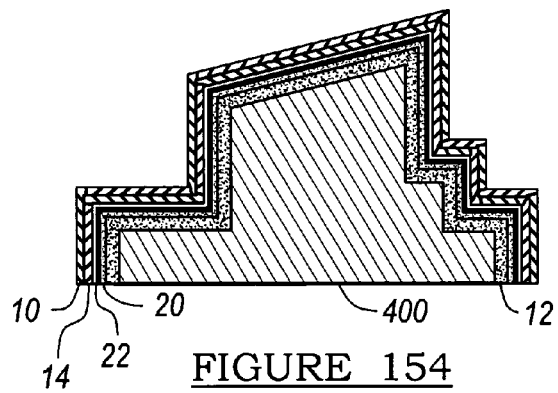
Figure 156:
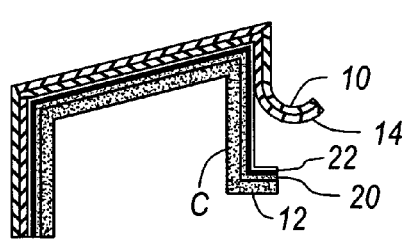
Figure 155:
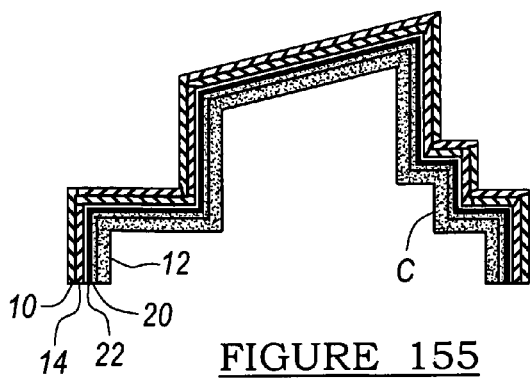
Figure 157:
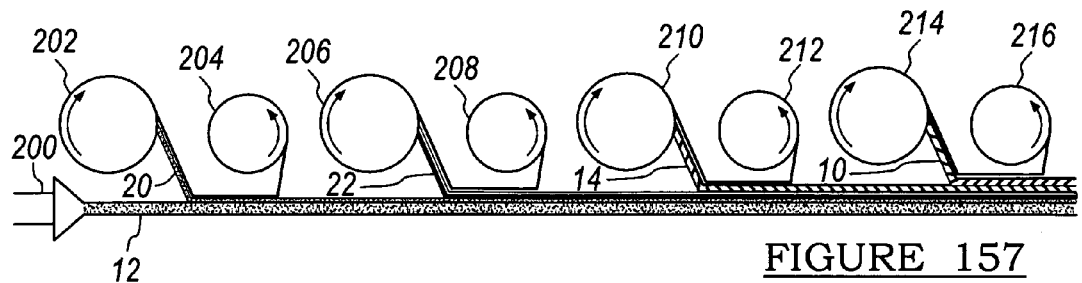
Figure 157A:
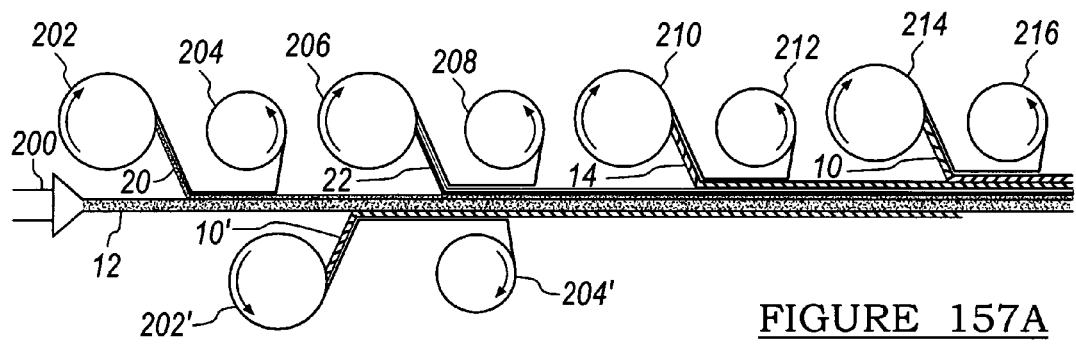
Figure 158:
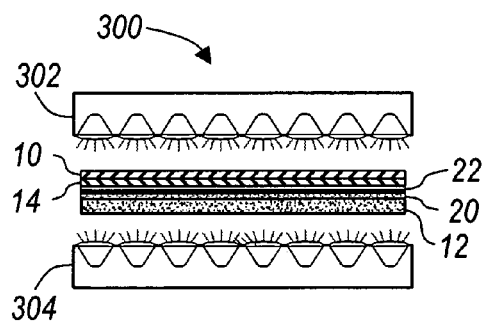
Figure 159:
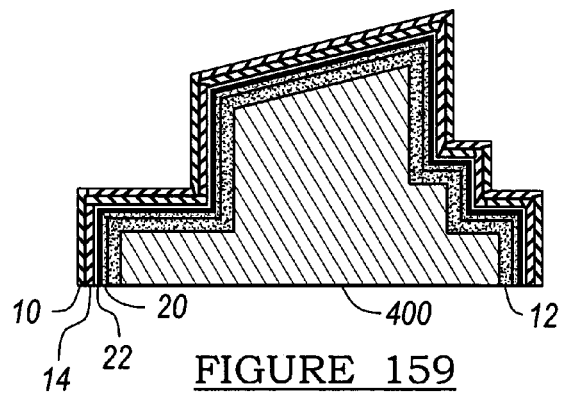
Figure 161:
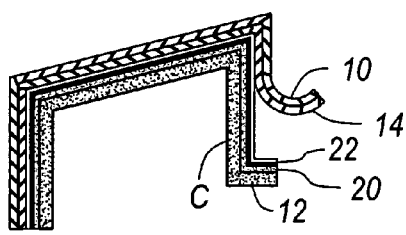
Figure 160:
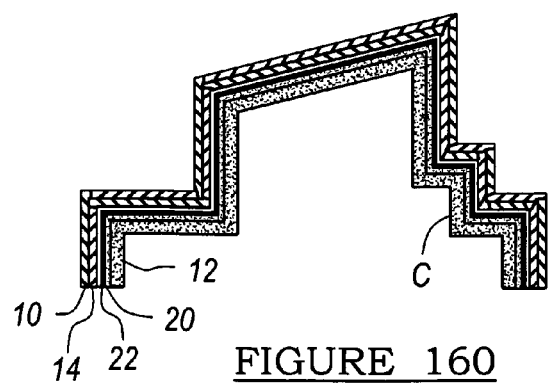
Figure 166:
Figure 162:
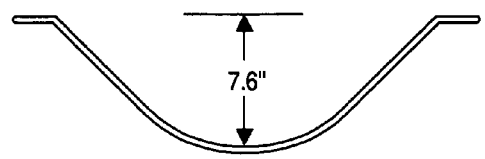
Figure 167:
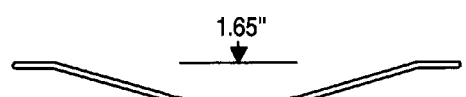
Figure 163:
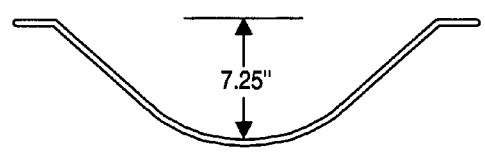
Figure 168:
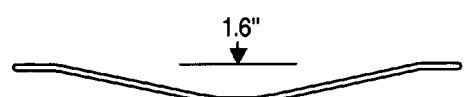
Figure 164:
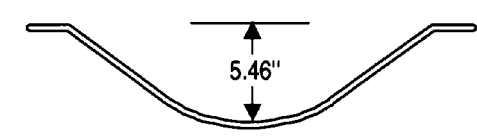
Figure 169:
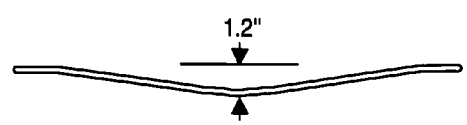
Figure 165:
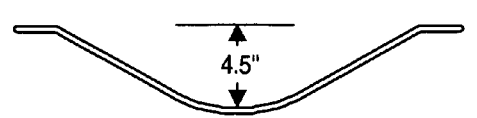

FIG. 74 is a partial sectional view of a mold surface being used to shape the laminated support film/primer film/substrate portion shown in FIG. 73 to the form of the component, in accordance with a twentieth alternative embodiment of the present invention;

FIG. 75 is a partial sectional view of the formed component comprised of the shaped laminated support film/primer film/substrate portion shown in FIGS. 73–74 once it has been removed from the mold surface, in accordance with a twentieth alternative embodiment of the present invention;

FIG. 76 is a partial sectional view of the support film shown in FIGS. 73–75 being removed from the formed component which has been trimmed to the requisite dimensions, in accordance with a twentieth alternative embodiment of the present invention;

FIG. 77 is a partial schematic view of a lamination process wherein a thermoplastic polyolefin primer film and an alternative support film are applied to an extruded substrate, in accordance with a twenty-first alternative embodiment of the present invention;

FIG. 77A is a partial schematic view of a lamination process wherein an optional second alternative support film is applied to an extruded substrate, in accordance with a twenty-first alternative embodiment of the present invention;

FIG. 78 is a partial schematic view of a thermoforming process wherein the laminated alternative support film/primer film/substrate portion shown in FIG. 77 is heated prior to shaping into the form of a component, in accordance with a twenty-first alternative embodiment of the present invention;

FIG. 79 is a partial sectional view of a mold surface being used to shape the laminated alternative support film/primer film/substrate portion shown in FIG. 78 to the form of the component, in accordance with a twenty-first alternative embodiment of the present invention;

FIG. 80 is a partial sectional view of the formed component comprised of the shaped laminated alternative support film/primer film/substrate portion shown in FIGS. 78–79 once it has been removed from the mold surface, in accordance with a twenty-first alternative embodiment of the present invention;

FIG. 81 is a partial sectional view of the alternative support film shown in FIGS. 78–80 being removed from the formed component which has been trimmed to the requisite dimensions, in accordance with a twenty-first alternative embodiment of the present invention;

FIG. 82 is a partial schematic view of a lamination process wherein a support film and a release film are applied to an extruded substrate, in accordance with a twenty-second alternative embodiment of the present invention;

FIG. 82A is a partial schematic view of a lamination process wherein an optional second support film is applied to an extruded substrate, in accordance with a twenty-second alternative embodiment of the present invention;

FIG. 83 is a partial schematic view of a thermoforming process wherein the laminated support film/release film/substrate portion shown in FIG. 82 is heated prior to shaping into the form of a component, in accordance with a twenty-second alternative embodiment of the present invention;

FIG. 84 is a partial sectional view of a mold surface being used to shape the laminated support film/release film/substrate portion shown in FIG. 83 to the form of the component, in accordance with a twenty-second alternative embodiment of the present invention;

FIG. 85 is a partial sectional view of the formed component comprised of the shaped laminated support film/release film/substrate portion shown in FIGS. 83–84 once it has been removed from the mold surface, in accordance with a twenty-second alternative embodiment of the present invention;

FIG. 86 is a partial sectional view of the support film/release layer system shown in FIGS. 83–85 being removed from the formed component which has been trimmed to the requisite dimensions, in accordance with a twenty-second alternative embodiment of the present invention;

FIG. 87 is a partial schematic view of a lamination process wherein a support film and an alternative release film are applied to an extruded substrate, in accordance with a twenty-third alternative embodiment of the present invention;

FIG. 87A is a partial schematic view of a lamination process wherein an optional second support film is applied to an extruded substrate, in accordance with a twenty-third alternative embodiment of the present invention;

FIG. 88 is a partial schematic view of a thermoforming process wherein the laminated support film/alternative release film/substrate portion shown in FIG. 87 is heated prior to shaping into the form of a component, in accordance with a twenty-third alternative embodiment of the present invention;

FIG. 89 is a partial sectional view of a mold surface being used to shape the laminated support film/alternative release film/substrate portion shown in FIG. 88 to the form of the component, in accordance with a twenty-third alternative embodiment of the present invention;

FIG. 90 is a partial sectional view of the formed component comprised of the laminated system support film/alternative release film/substrate portion shown in FIGS. 88–89 once it has been removed from the mold surface, in accordance with a twenty-third alternative embodiment of the present invention;

FIG. 91 is a partial sectional view of the support film/alternative release layer system shown in FIGS. 88–90 being removed from the formed component which has been trimmed to the requisite dimensions, in accordance with a twenty-third alternative embodiment of the present invention;

FIG. 92 is a partial schematic view of a lamination process wherein an alternative support film and a release film are applied to an extruded substrate, in accordance with a twenty-fourth alternative embodiment of the present invention;

FIG. 92A is a partial schematic view of a lamination process wherein an optional second alternative support film is applied to an extruded substrate, in accordance with a twenty-fourth alternative embodiment of the present invention;

FIG. 93 is a partial schematic view of a thermoforming process wherein the laminated alternative support film/release film/substrate portion shown in FIG. 92 is heated prior to shaping into the form of a component, in accordance with a twenty-fourth alternative embodiment of the present invention;

FIG. 94 is a partial sectional view of a mold surface being used to shape the laminated alternative support film/release film/substrate portion shown in FIG. 93 to the form of the component, in accordance with a twenty-fourth alternative embodiment of the present invention;

FIG. 95 is a partial sectional view of the formed component comprised of the shaped laminated alternative support film/release film/substrate portion shown in FIGS. 93–94 once it has been removed from the mold surface, in accordance with a twenty-fourth alternative embodiment of the present invention;

FIG. 96 is a partial sectional view of the alternative support film/release layer system shown in FIGS. 92–95 being removed from the formed component which has been trimmed to the requisite dimensions, in accordance with a twenty-fourth alternative embodiment of the present invention;

FIG. 97 is a partial schematic view of a lamination process wherein an alternative support film and an alternative release film are applied to an extruded substrate, in accordance with a twenty-fifth alternative embodiment of the present invention;

FIG. 97A is a partial schematic view of a lamination process wherein an optional second alternative support film is applied to an extruded substrate, in accordance with a twenty-fifth alternative embodiment of the present invention;

FIG. 98 is a partial schematic view of a thermoforming process wherein the laminated alternative support film/alternative release film/substrate portion shown in FIG. 97 is heated prior to shaping into the form of a component, in accordance with a twenty-fifth alternative embodiment of the present invention;

FIG. 99 is a partial sectional view of a mold surface being used to shape the laminated alternative support film/alternative release film/substrate portion shown in FIG. 98 to the form of the component, in accordance with a twenty-fifth alternative embodiment of the present invention;

FIG. 100 is a partial sectional view of the formed component comprised of the shaped laminated alternative support film/alternative release film/substrate portion shown in FIGS. 98–99 once it has been removed from the mold surface, in accordance with a twenty-fifth alternative embodiment of the present invention;

FIG. 101 is a partial sectional view of the alternative support film/alternative release layer system shown in FIGS. 98–100 being removed from the formed component which has been trimmed to the requisite dimensions, in accordance with a twenty-fifth embodiment of the present invention;

FIG. 102 is a partial schematic view of a lamination process wherein a support film and a surfacing film are applied to an extruded substrate, in accordance with a twenty-sixth alternative embodiment of the present invention;

FIG. 102A is a partial schematic view of a lamination process wherein an optional second support film is applied to an extruded substrate, in accordance with a twenty-sixth alternative embodiment of the present invention;

FIG. 103 is a partial schematic view of a thermoforming process wherein the laminated support film/surfacing film/substrate portion shown in FIG. 102 is heated prior to shaping into the form of a component, in accordance with a twenty-sixth alternative embodiment of the present invention;

FIG. 104 is a partial sectional view of a mold surface being used to shape the laminated support film/surfacing film/substrate portion shown in FIG. 103 to the form of the component, in accordance with a twenty-sixth alternative embodiment of the present invention;

FIG. 105 is a partial sectional view of the formed component comprised of the shaped laminated support film/surfacing film/substrate portion shown in FIGS. 103–104 once it has been removed from the mold surface, in accordance with a twenty-sixth alternative embodiment of the present invention;

FIG. 106 is a partial sectional view of the support film shown in FIGS. 103–105 being removed from the formed component which has been trimmed to the requisite dimensions, in accordance with a twenty-sixth alternative embodiment of the present invention;

FIG. 107 is a partial schematic view of a lamination process wherein an alternative support film and a surfacing film are applied to an extruded substrate, in accordance with a twenty-seventh alternative embodiment of the present invention;

FIG. 107A is a partial schematic view of a lamination process wherein an optional second alternative support film is applied to an extruded substrate, in accordance with a twenty-seventh alternative embodiment of the present invention;

FIG. 108 is a partial schematic view of a thermoforming process wherein the laminated alternative support film/surfacing film/substrate portion shown in FIG. 107 is heated prior to shaping into the form of a component, in accordance with a twenty-seventh alternative embodiment of the present invention;

FIG. 109 is a partial sectional view of a mold surface being used to shape the laminated alternative support film/surfacing film/substrate portion shown in FIG. 108 to the form of the component, in accordance with a twenty-seventh alternative embodiment of the present invention;

FIG. 110 is a partial sectional view of the formed component comprised of the shaped laminated alternative support film/surfacing film/substrate portion shown in FIGS. 108–109 once it has been removed from the mold surface, in accordance with a twenty-seventh alternative embodiment of the present invention;

FIG. 111 is a partial sectional view of the alternative support film shown in FIGS. 108–110 being removed from the formed component which has been trimmed to the requisite dimensions, in accordance with a twenty-seventh alternative embodiment of the present invention;

FIG. 112 is a partial schematic view of a lamination process wherein a support film/release film system and a surfacing film are applied to an extruded substrate, in accordance with a twenty-eighth alternative embodiment of the present invention;

FIG. 112A is a partial schematic view of a lamination process wherein an optional second support film is applied to an extruded substrate, in accordance with a twenty-eighth alternative embodiment of the present invention;

FIG. 113 is a partial schematic view of a thermoforming process wherein the laminated support film/release film/surfacing film/substrate portion shown in FIG. 112 is heated prior to shaping into the form of a component, in accordance with a twenty-eighth alternative embodiment of the present invention;

FIG. 114 is a partial sectional view of a mold surface being used to shape the laminated support film/release film/surfacing film/substrate portion shown in FIG. 113 to the form of the component, in accordance with a twenty-eighth alternative embodiment of the present invention;

FIG. 115 is a partial sectional view of the formed component comprised of the shaped laminated support film/release film/surfacing film/substrate portion shown in FIGS. 113–114 once it has been removed from the mold surface, in accordance with a twenty-eighth alternative embodiment of the present invention;

FIG. 116 is a partial sectional view of the support film/ release film system shown in FIGS. 113–115 being removed from the formed component which has been trimmed to the requisite dimensions, in accordance with a twenty-eighth alternative embodiment of the present invention;

FIG. 117 is a partial schematic view of a lamination process wherein a support film/alternative release film system and a surfacing film are applied to an extruded substrate, in accordance with a twenty-ninth alternative embodiment of the present invention;

FIG. 117A is a partial schematic view of a lamination process wherein an optional second support film is applied to an extruded substrate, in accordance with a twenty-ninth alternative embodiment of the present invention;

FIG. 118 is a partial schematic view of a thermoforming process wherein the laminated support film/alternative release film/surfacing film/substrate portion shown in FIG. 117 is heated prior to shaping into the form of a component, in accordance with a twenty-ninth alternative embodiment of the present invention;

FIG. 119 is a partial sectional view of a mold surface being used to shape the laminated support film/alternative release film/surfacing film/substrate portion shown in FIG. 118 to the form of the component, in accordance with a twenty-ninth alternative embodiment of the present invention;

FIG. 120 is a partial sectional view of the formed component comprised of the shaped laminated support film/ alternative release film/surfacing film/substrate portion shown in FIGS. 118–119 once it has been removed from the mold surface, in accordance with a twenty-ninth alternative embodiment of the present invention;

FIG. 121 is a partial sectional view of the support film/ alternative release film system shown in FIGS. 118–120 being removed from the formed component which has been trimmed to the requisite dimensions, in accordance with a twenty-ninth alternative embodiment of the present invention;

FIG. 122 is a partial schematic view of a lamination process wherein an alternative support film/release film system and a surfacing film are applied to an extruded substrate, in accordance with a thirtieth alternative embodiment of the present invention;

FIG. 122A is a partial schematic view of a lamination process wherein an optional second alternative support film is applied to an extruded substrate, in accordance with a thirtieth alternative embodiment of the present invention;

FIG. 123 is a partial schematic view of a thermoforming process wherein the laminated alternative support film/ release film/surfacing film/substrate portion shown in FIG. 122 is heated prior to shaping into the form of a component, in accordance with a thirtieth alternative embodiment of the present invention;

FIG. 124 is a partial sectional view of a mold surface being used to shape the laminated alternative support film/ release film/surfacing film/substrate portion shown in FIG. 123 to the form of the component, in accordance with a thirtieth alternative embodiment of the present invention;

FIG. 125 is a partial sectional view of the formed component comprised of the shaped laminated alternative support film/release film/surfacing film/substrate portion shown in FIGS. 123–124 once it has been removed from the mold surface, in accordance with a thirtieth alternative embodiment of the present invention;

FIG. 126 is a partial sectional view of the alternative support film/release film system shown in FIGS. 123–125 being removed from the formed component which has been trimmed to the requisite dimensions, in accordance with a twenty-eighth alternative embodiment of the present invention;

FIG. 127 is a partial schematic view of a lamination process wherein an alternative support film/alternative release film system and a surfacing film are applied to an extruded substrate, in accordance with a thirty-first alternative embodiment of the present invention;

FIG. 127A is a partial schematic view of a lamination process wherein an optional second alternative support film is applied to an extruded substrate, in accordance with a thirty-first alternative embodiment of the present invention;

FIG. 128 is a partial schematic view of a thermoforming process wherein the laminated alternative support film/ alternative release film/surfacing film/substrate portion shown in FIG. 127 is heated prior to shaping into the form of a component, in accordance with a thirty-first alternative embodiment of the present invention;

FIG. 129 is a partial sectional view of a mold surface being used to shape the laminated alternative support film/ alternative release film/surfacing film/substrate portion shown in FIG. 128 to the form of the component, in accordance with a thirty-first alternative embodiment of the present invention;

FIG. 130 is a partial sectional view of the formed component comprised of the shaped laminated alternative support film/alternative release film/surfacing film/substrate portion shown in FIGS. 128–129 once it has been removed from the mold surface, in accordance with a thirty-first alternative embodiment of the present invention;

FIG. 131 is a partial sectional view of the alternative support film/alternative release film system shown in FIGS. 128–130 being removed from the formed component which has been trimmed to the requisite dimensions, in accordance with a thirty-first alternative embodiment of the present invention;

FIG. 132 is a partial schematic view of a lamination process wherein a support film, a release film, and a surfacing film are applied to an extruded substrate, in accordance with a thirty-second alternative embodiment of the present invention;

FIG. 132A is a partial schematic view of a lamination process wherein an optional second support film is applied to an extruded substrate, in accordance with a thirty-second alternative embodiment of the present invention;

FIG. 133 is a partial schematic view of a thermoforming process wherein the laminated support film/release film/ surfacing film/substrate portion shown in FIG. 132 is heated prior to shaping into the form of a component, in accordance with a thirty-second alternative embodiment of the present invention;

FIG. 134 is a partial sectional view of a mold surface being used to shape the laminated support film/release film/surfacing film/substrate portion shown in FIG. 133 to the form of the component, in accordance with a thirty-second alternative embodiment of the present invention;

FIG. 135 is a partial sectional view of the formed component comprised of the shaped laminated support film/ release film/surfacing film/substrate portion shown in FIGS. 133–134 once it has been removed from the mold surface, in accordance with a thirty-second alternative embodiment of the present invention;

FIG. 136 is a partial sectional view of the support film/ release film system shown in FIGS. 133–135 being removed from the formed component which has been trimmed to the requisite dimensions, in accordance with a thirty-second alternative embodiment of the present invention;

FIG. 137 is a partial schematic view of a lamination process wherein a support film, an alternative release film, and a surfacing film are applied to an extruded substrate, in accordance with a thirty-third alternative embodiment of the present invention;

FIG. 137A is a partial schematic view of a lamination process wherein an optional second support film is applied to an extruded substrate, in accordance with a thirty-third alternative embodiment of the present invention;

FIG. 138 is a partial schematic view of a thermoforming process wherein the laminated support film/alternative release film/surfacing film/substrate portion shown in FIG. 137 is heated prior to shaping into the form of a component, in accordance with a thirty-third alternative embodiment of the present invention;

FIG. 139 is a partial sectional view of a mold surface being used to shape the laminated support film/alternative release film/surfacing film/substrate portion shown in FIG. 138 to the form of the component, in accordance with a thirty-third alternative embodiment of the present invention;

FIG. 140 is a partial sectional view of the formed component comprised of the shaped laminated support film/alternative release film/surfacing film/substrate portion shown in FIGS. 138–139 once it has been removed from the mold surface, in accordance with a thirty-third alternative embodiment of the present invention;

FIG. 141 is a partial sectional view of the support film/alternative release film system shown in FIGS. 138–140 being removed from the formed component which has been trimmed to the requisite dimensions, in accordance with a thirty-third alternative embodiment of the present invention;

FIG. 142 is a partial schematic view of a lamination process wherein an alternative support film, a release film, and a surfacing film are applied to an extruded substrate, in accordance with a thirty-fourth alternative embodiment of the present invention;

FIG. 142A is a partial schematic view of a lamination process wherein an optional second alternative support film is applied to an extruded substrate, in accordance with a thirty-fourth alternative embodiment of the present invention;

FIG. 143 is a partial schematic view of a thermoforming process wherein the laminated alternative support film/release film/surfacing film/substrate portion shown in FIG. 142 is heated prior to shaping into the form of a component, in accordance with a thirty-fourth alternative embodiment of the present invention;

FIG. 144 is a partial sectional view of a mold surface being used to shape the laminated alternative support film/release film/surfacing film/substrate portion shown in FIG. 143 to the form of the component, in accordance with a thirty-fourth alternative embodiment of the present invention;

FIG. 145 is a partial sectional view of the formed component comprised of the shaped laminated alternative support film/release film/surfacing film/substrate portion shown in FIGS. 143–144 once it has been removed from the mold surface, in accordance with a thirty-fourth alternative embodiment of the present invention;

FIG. 146 is a partial sectional view of the alternative support film/release film system shown in FIGS. 143–145 being removed from the formed component which has been trimmed to the requisite dimensions, in accordance with a thirty-fourth alternative embodiment of the present invention;

FIG. 147 is a partial schematic view of a lamination process wherein an alternative support film, an alternative release film, and a surfacing film are applied to an extruded substrate, in accordance with a thirty-fifth alternative embodiment of the present invention;

FIG. 147A is a partial schematic view of a lamination process wherein an optional second alternative support film is applied to an extruded substrate, in accordance with a thirty-fifth alternative embodiment of the present invention;

FIG. 148 is a partial schematic view of a thermoforming process wherein the laminated alternative support film/alternative release film/surfacing film/substrate portion shown in FIG. 147 is heated prior to shaping into the form of a component, in accordance with a thirty-fifth alternative embodiment of the present invention;

FIG. 149 is a partial sectional view of a mold surface being used to shape the laminated alternative support film/alternative release film/surfacing film/substrate portion shown in FIG. 148 to the form of the component, in accordance with a thirty-fifth alternative embodiment of the present invention;

FIG. 150 is a partial sectional view of the formed component comprised of the shaped laminated alternative support film/alternative release film/surfacing film/substrate portion shown in FIGS. 148–149 once it has been removed from the mold surface, in accordance with a thirty-fifth alternative embodiment of the present invention;

FIG. 151 is a partial sectional view of the alternative support film/alternative release film system shown in FIGS. 148–150 being removed from the formed component which has been trimmed to the requisite dimensions, in accordance with a thirty-fifth alternative embodiment of the present invention;

FIG. 152 is a partial schematic view of a lamination process wherein an adhesive film, a clear coat/base coat film, and a combined release film/support film are applied to an extruded substrate, in accordance with a thirty-sixth alternative embodiment of the present invention;

FIG. 152A is a partial schematic view of a lamination process wherein an optional second support film is applied to an extruded substrate, in accordance with a thirty-sixth alternative embodiment of the present invention;

FIG. 153 is a partial schematic view of a thermoforming process wherein the laminated adhesive film/clear coat/base coat film/combined release film/support film system/substrate portion shown in FIG. 152 is heated prior to shaping into the form of a component, in accordance with a thirty-sixth alternative embodiment of the present invention;

FIG. 154 is a partial sectional view of a mold surface being used to shape the laminated adhesive film/clear coat/base coat film/combined release film/support film system/substrate portion shown in FIG. 153 to the form of the component, in accordance with a thirty-sixth alternative embodiment of the present invention;

FIG. 155 is a partial sectional view of the formed component comprised of the shaped laminated adhesive film/clear coat/base coat film/combined release film/support film system/substrate portion shown in FIGS. 153–154 once it has been removed from the mold surface, in accordance with a thirty-sixth alternative embodiment of the present invention;

FIG. 156 is a partial sectional view of the combined release film/support film system shown in FIGS. 153–155 being removed from the formed component which has been trimmed to the requisite dimensions, in accordance with a thirty-sixth alternative embodiment of the present invention;

FIG. 157 is a partial schematic view of a lamination process wherein an adhesive film, a clear coat/base coat film, a release film, and a support film are applied to an extruded substrate, in accordance with a thirty-seventh alternative embodiment of the present invention;

FIG. 157A is a partial schematic view of a lamination process wherein an optional second support film is applied to an extruded substrate, in accordance with a thirty-seventh alternative embodiment of the present invention;

FIG. 158 is a partial schematic view of a thermoforming process wherein the laminated adhesive film/clear coat/base coat film/release film/support film/substrate portion shown in FIG. 157 is heated prior to shaping into the form of a component, in accordance with a thirty-seventh alternative embodiment of the present invention;

FIG. 159 is a partial sectional view of a mold surface being used to shape the laminated adhesive film/clear coat/base coat film/release film/support film/substrate portion shown in FIG. 158 to the form of the component, in accordance with a thirty-seventh alternative embodiment of the present invention;

FIG. 160 is a partial sectional view of the formed component comprised of the shaped laminated adhesive film/clear coat/base coat film/release film/support film/substrate portion shown in FIGS. 158–159 once it has been removed from the mold surface, in accordance with a thirty-seventh alternative embodiment of the present invention;

FIG. 161 is a partial sectional view of the release film/support film system shown in FIGS. 158–160 being removed from the formed component which has been trimmed to the requisite dimensions, in accordance with a thirty-seventh alternative embodiment of the present invention;

FIG. 162 is a partial sectional view illustrating the drape characteristic of a surfacing film/substrate system heated at 360° F., in accordance with the prior art;

FIG. 163 is a partial sectional view illustrating the drape characteristic of a release film/surfacing film/substrate system heated at 360° F., in accordance with the prior art;

FIG. 164 is a partial sectional view illustrating the drape characteristic of a surfacing film/substrate system heated at 340° F., in accordance with the prior art;

FIG. 165 is a partial sectional view illustrating the drape characteristic of a release film/surfacing film/substrate system heated at 340° F., in accordance with the prior art;

FIG. 166 is a partial sectional view illustrating the drape characteristic of a support film/release film system/surfacing film/substrate system heated at 360° F., in accordance with a thirty-eighth alternative embodiment of the present invention;

FIG. 167 is a partial sectional view illustrating the drape characteristic of a support film/release film/surfacing film/substrate system heated at 360° F., in accordance with a thirty-ninth alternative embodiment of the present invention;

FIG. 168 is a partial sectional view illustrating the drape characteristic of a support film/release film system/surfacing film/substrate system heated at 340° F., in accordance with a fortieth alternative embodiment of the present invention; and FIG. 169 is a partial sectional view illustrating the drape characteristic of a support film/release film/surfacing film/substrate system heated at 360° F., in accordance with a forty-first alternative embodiment of the present invention.

The same reference numerals refer to the same parts throughout the various Figures.

DETAILED DESCRIPTION OF THE PREFERRED EMBODIMENTS

Figure 1:
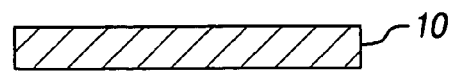
FIG. 1 is a partial sectional view of a support film, in accordance with the general teachings of the present invention.

In accordance with one embodiment of the present invention, a support film 10 is provided, as generally shown in FIG. 1. Support film 10 is preferably thermoformable, in that it is suitable for use with conventional thermoforming techniques. In accordance with a preferred embodiment of the present invention, support film 10 is preferably comprised of a polymeric material having a tensile strength greater than 0.5 pli at 300° F., more preferably in the range of greater than 0.5 pli to about 1.6 pli or greater at 300° F., and still more preferably in the range of about 0.75 pli to about 1.0 pli or greater.

By way of a non-limiting example, support film 10 of the present invention will be especially useful for the production of thermoformed articles, for example, interior/exterior automobile components, such as body panels. By way of another non-limiting example, support film 10 of the present invention will be especially useful for the production of contoured articles, for example, interior/exterior automobile components, such as body panels.

By way of a non-limiting example, support film 10 should preferably possess suitable chemical and physical properties, including enhanced sag/bag/drape control characteristics, over the entire spectrum of process parameters encountered with conventional thermoforming techniques, e.g., the temperatures typically used in thermoforming techniques.

In accordance with a preferred embodiment of the present invention, support film 10 preferably has a thickness in the range of about 0.00025 inches to about 0.005 inches, more preferably a thickness in the range of about 0.00075 inches to about 0.00125 inches, ad still more preferably a thickness of about 0.001 inches. However, it should be appreciated that support films having a thickness outside of these ranges can be used in the practice of the present invention.

By way of a non-limiting example, support film 10 is preferably comprised of fluoropolymer materials, such as but not limited to polyvinyl fluoride (PVF). In accordance with a preferred embodiment of the present invention, the PVF material is comprised of TEDLAR SP, a PVF material readily commercially available from DuPont (Wilmington, Del.).

By way of a non-limiting example, the typical properties of various types of TEDLAR SP materials are set forth in Table I, below:

TABLE I

|  | Test Method | 0.5 mil Transparent Medium Gloss TTR5JAM9 | 1.0 mil Transparent High Gloss TTR10AH9 | 1.0 mil UV Screening High Gloss TUA10AH9 | 1.0 mil Colored High Gloss TXX10AH9 |
|---|---|---|---|---|---|
| Tensile Strength | ASTM D882-80 | 34 Mpa (5 kpsi) | 41 Mpa (6 kpsi) | 41 Mpa (6 kpsi) | 34 Mpa (5 kpsi) |

TABLE I-continued

|  | Test Method | 0.5 mil Transparent Medium Gloss TTR5JAM9 | 1.0 mil Transparent High Gloss TTR10AH9 | 1.0 mil UV Screening High Gloss TUA10AH9 | 1.0 mil Colored High Gloss TXX10AH9 |
|---|---|---|---|---|---|
| Elongation (Ultimate) | Method A-100% ASTM D882-80 | 175% | 200% | 200% | 100% |
| Tear Strength, MD | ASTM D1004, Graves | 550 kN/m (212 g/mil) | 550 kN/m (212 g/mil) | 550 kN/m (212 g/mil) | 550 kN/m (212 g/mil) |
| Tear Strength, TD | ASTM D1004, Graves | 550 kN/m (212 g/mil) | 550 kN/m (212 g/mil) | 550 kN/m (212 g/mil) | 550 kN/m (212 g/mil) |
| Unit Weight | ASTM D-1505-68 | 17.5 g/m² | 35 g/m² | 42–46 g/m² | 34–43 g/m² |
| Coefficient of Friction Film/Metal | ASTM D1894 | — | 0.21 | — | — |
| Falling Sand Abrasion | ASTM D968 | — | 234 | — | — |
| Moisture Absorption | ASTM D570 | — | 0.5 | — | — |
| Moisture Vapor Transmission | ASTM E96E-80 | — | 30 | — | — |
| Refractive Index | ASTM D542-50 | — | 1.46 | — | — |
| Gloss 85° | Gardner | 31 | 93 | 93 | 93 |
| Gloss 60° | Gardner | 27 | 81 | 81 | 81 |
| Gloss 20° | Gardner | 6 | 57 | 57 | 57 |
| Haze, Internal | Gardner | 2 | 0.6 | 1.7 | — |
| Haze, Total | Gardner | 33 | 2.6 | 1.4 | — |

By way of a non-limiting example, the typical thermal properties of various films of TEDLAR SP material are set forth in Table II, below:

TABLE II

|  | Test Method | 0.5 mil Transparent Medium Gloss TTR5JAM9 | 1.0 mil Transparent High Gloss TTR10AH9 | 1.0 mil UV Screening High Gloss TUA10AH9 | 1.0 mil Colored High Gloss TXX10AH9 |
|---|---|---|---|---|---|
| Linear Coefficient of Expansion, MD | D696-79 | — | $9 \times 10^{-5}$ m | — | — |
| Linear Coefficient of Expansion, TD | D696-79 | — | $9 \times 10^{-5}$ m | — | — |
| Shrinkage, Max. | ASTM D1204-78 | 2% at 170° C. | 2% at 170° C. | 2% at 170° C. | 2% at 170° C. |
| Specific Heat | DuPont 990 | — | 0.24 cal/g. ° C. | — | — |
|  |  | — | 1.01 kJ/kg. ° K. | — | — |
| Temperature Range Continuous Use |  | −72 to 107° C. | −72 to 107° C. | −72 to 107° C. | −72 to 107° C. |
| Short Cycle |  | Up to 175° C. | Up to 175° C. | Up to 175° C. | Up to 175° C. |

Figure 2:
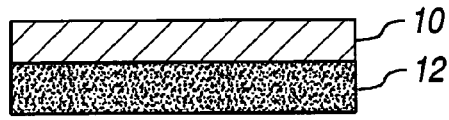
FIG. 2 is a partial sectional view of the support film shown in FIG. 1 in abutting relationship with a substrate, in accordance with the general teachings of the present invention.

Referring to FIG. 2, and without being bound to a particular theory of the operation of the present invention, it is intended that support film 10 be releaseably secured to a substrate 12, such as but not limited to plastic materials, such as thermoplastics, thermosets, and combinations thereof. It should be appreciated that multiple substrate layers may be employed in the practice of the present invention. By way of a non-limiting example, additional substrates, such as but not limited to thermoplastic olefins (TPO), may be adhered to the back surface of substrate 12, for example, by way of injection molding. By way of a non-limiting example, substrate 12 may have a thickness in the range of about 0.0015 inches to about 0.5 inches, and more preferably about 0.06 to about 0.25 inches.

Figure 2A:
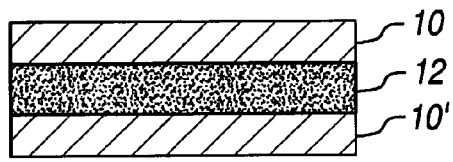
FIG. 2A is a partial sectional view of two support films in abutting relationship with a substrate, in accordance with the general teachings of the present invention.

Referring to FIG. 2A, and without being bound to a particular theory of the operation of the present invention, more than one support film, and more preferably two support films 10, 10' can be releaseably secured to substrate 12.

Figure 3:
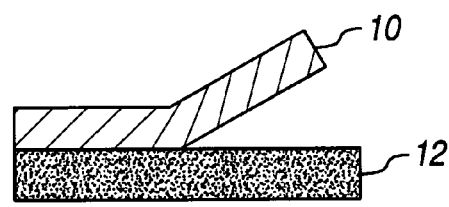
FIG. 3 is a partial sectional view of the support film shown in FIGS. 1 and 2 being removed from the substrate, in accordance with the general teachings of the present invention.

Referring to FIG. 3, support film 10 is preferably selectively operable to be removable from a surface of substrate 12, e.g., either after deposition thereon or after processing, e.g., thermoforming.

Without being bound to a particular theory of the operation of the present invention, an intended use of support film 10 is to aid in the thermoforming of substrates 12 (e.g., a polymeric material such as thermosets or thermoplastics), such as but not limited to thick film sheets of plastic materials, as generally shown in FIG. 2. The resulting system structure (i.e., support film 10 and substrate 12) can then be subjected to a thermoforming process, e.g., to form a contoured automotive component. After completion of the thermoforming process, support film 10 can then be selectively removed from the surface of the underlying substrate 12, exposing the surface of substrate 12, as shown generally in FIG. 3.

Figure 4:
FIG. 4 is a partial sectional view of an alternative support film, in accordance with a first alternative embodiment of the present invention.

In accordance with a first alternative embodiment of the present invention, an alternative support film 110 is provided, as generally shown in FIG. 4.

By way of a non-limiting example, the alternative support film 110 is preferably comprised of ethylene-tetrafluoroethylene materials (ETFE), such as but not limited to TEFZEL, an ETFE material readily commercially available from DuPont (Wilmington, Del.).

By way of a non-limiting example, the typical mechanical and thermal properties of a film of TEFZEL material are set forth in Table III, below:

TABLE IV

| Property | ASTM | Conditions | Value |
|---|---|---|---|
| Specific gravity | D-792 | — | 1.70–1.76 |
| Refractive Index | D-542 | Np | 1.40 |
| Absorption | D-570 | 24 hours | <0.1% |
| Molding shrinkage | — | — | 0.02–0.03 |
| Contact angle | — | Water | 96° |
| Coefficient of linear expansion | D-69 | 23–60° C. | (5–9) X 10E-4 1/° K. |
| Melting point | — | — | 500° F. |
| Melting viscosity | — | 300–330° C. | 10E-4 1.00E-05 Poise |
| Maximum continuous temperature | — | — | 302° F. |
| Tensile strength | D-638 | 73° F. | 5.8–7.0 Kpsi |
| Elongation | D-638 | 73° F. | 34% |
| Tensile modulus | D-638 | 73° F. | 71–110 Kpsi |
| Flexural modulus | D-790 | 73° F. | 128–199 Kpsi |
| Impact test | D-256 | 73° F. Izod | No break Ft-lb/in |
| Hardness | D-638 | Durometer | Shore D75 |

Figure 5:
FIG. 5 is a partial sectional view of the alternative support film shown in FIG. 4 in abutting relationship with a substrate, in accordance with a first alternative embodiment of the present invention.

Referring to FIG. 5, and without being bound to a particular theory of the operation of the present invention, it is intended that the alternative support film 110 be releaseably secured to a substrate 12, such as but not limited to plastic materials, such as thermoplastics, thermosets, and combinations thereof.

Figure 5A:
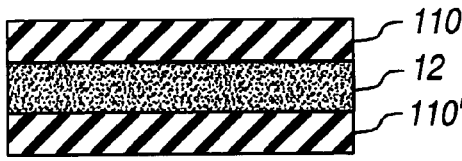
FIG. 5A is a partial sectional view of two support films in abutting relationship with a substrate, in accordance with a first alternative embodiment of the present invention.

Referring to FIG. 5A, and without being bound to a particular theory of the operation of the present invention, more than one support film, and more preferably two support films 110, 110' can be releaseably secured to substrate 12.

It should be appreciated that support films 10, 10', 110, 110' may be used in any number of combinations when two-support film systems are employed in conjunction with the present invention.

Figure 6:
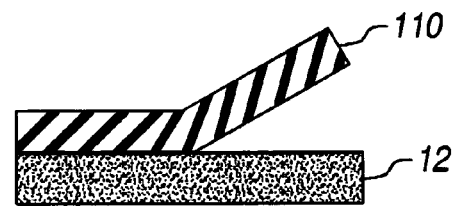
FIG. 6 is a partial sectional view of the alternative support film shown in FIGS. 4 and 5 being removed from the substrate, in accordance with a first alternative embodiment of the present invention.

Referring to FIG. 6, the alternative support film 110 is preferably selectively operable to be removable from a surface of substrate 12, e.g., either after deposition thereon or after processing, e.g., thermoforming. It should be appre-

TABLE III

| | | Typical Value | |
|---|---|---|---|
| Property | Test Method (ASTM) | SI Units (Machine Direction/Transverse Direction) | English Units (Machine Direction/Transverse Direction) |
| Tensile Strength at Break | D-882 | 234/48 Mpa | 34,000/7,000 psi |
| Elongation at Break | D-882 | 45/650% | 45/650% |
| Elastic Modulus | D-882 | 73,500/900 Mpa | 500,000/130,000 psi |
| Tensile Creep (3,000 psi/1000 hr) | — | 0.8/8.0% | 0.8/8.0% |
| Tear Strength (Propagating) | D-1922 | 10.5/2.3 N | 2.3/0.5 lb |
| Impact Resistance | D-3420B | 66 J/mm | 14.8 in-lb/mil |
| Melt Point | DTA | 270° C. | 520° F. |
| Service Temperature (Continuous) | — | 150° C. | 300° F. |
| Oxygen Index | D-2863 | 30% | 30% |
| Dimensional Stability Type M 105° C. (221° F.) 150° C. (302° F.) | DuPont | 4.0/1.2% 4.0/1.2% | 1.0/1.2% 1.0/1.2% |
| Shrinkable 200° C. (392° F.) (Heat Shrink Type) | — | 23/7% | 23/7% |

Another ETFE material is marketed under the trade name AFLEX, and is readily commercially available from Asahi Glass Company, Ltd. (Tokyo, Japan). By way of a non-limiting example, the typical properties of a film of AFLEX material are set forth in Table IV, below:

ciated that the alternative support film 110 can be used in the same general manner as support film 10, as previously described (e.g., in connection with the thermoforming of polymeric materials).

Figure 7:
FIG. 7 is a partial sectional view of a support film and a release film, in accordance with a second alternative embodiment of the present invention.

In accordance with a second alternative embodiment of the present invention, support film 10 can be used in conjunction with a release film 14, as shown generally in FIG. 7. An optional bonding material, such as an acrylic adhesive, can be employed between the two respective films to promote adhesion to one another.

Figure 8:
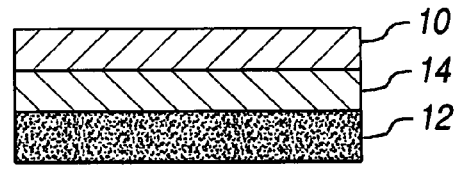
FIG. 8 is a partial sectional view of the support film and release film shown in FIG. 7 in abutting relationship with a substrate, in accordance with a second alternative embodiment of the present invention.

By way of a non-limiting example, release film 14 can be bonded, fused, or otherwise adhered to support film 10, either before or during the time when support film 10/release film 14 system is brought into contact with substrate 12 to form a support film 10/release film 14/substrate 12 system, as shown generally in FIG. 8.

Figure 8A:
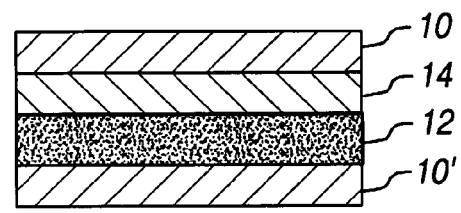
FIG. 8A is a partial sectional view of two support films in abutting relationship with a release film and a substrate, in accordance with a second alternative embodiment of the present invention.

Referring to FIG. 8A, and without being bound to a particular theory of the operation of the present invention, more than one support film, and more preferably two support films 10, 10' can be releaseably secured to release film 14 and substrate 12.

Figure 9:
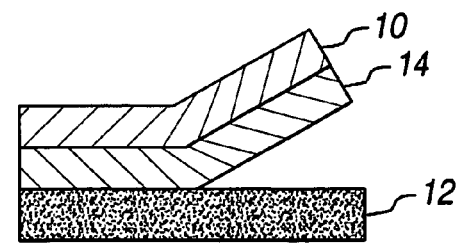
FIG. 9 is a partial sectional view of the support film and release film shown in FIGS. 7 and 8 being removed from the substrate, in accordance with a second alternative embodiment of the present invention.

Release film 14 is preferably selectively operable to be removable from a surface of substrate 12, e.g., either after deposition thereon or after processing, e.g., thermoforming, as generally shown in FIG. 9. In this manner, support film 10/release film 14 system can be more easily removed from the surface of substrate 12 after completion of the thermoforming process, as generally shown in FIG. 9.

Release film 14 is preferably thermoformable, in that it is suitable for use with conventional thermoforming techniques. In accordance with a preferred embodiment of the present invention, release film 14 is preferably comprised of a polymeric material having a tensile strength less than 0.5 pli at 300° F. By way of a non-limiting example, release film 14 can be comprised of polyurethanes and blends thereof, including water-based urethanes and blends thereof, and the like. By way of a non-limiting example, release film 14 may have a thickness in the range of about 0.00025 inches to about 0.0005 inches. However, it should be appreciated that release films having a thickness outside of these ranges can be used in the practice of the present invention.

By way of a non-limiting example, release film 14 of the present invention will be especially useful for the production of thermoformed articles, for example, interior/exterior automobile components, such as body panels. By way of another non-limiting example, release film 14 of the present invention will be especially useful for the production of contoured articles, for example, interior/exterior automobile components, such as body panels.

In accordance with a preferred embodiment of the present invention, support film 10 and release film 14 have a combined tensile strength greater than 0.5 pli at 300° F., more preferably in the range of greater than 0.5 pli to about 1.6 pli or greater at 300° F., and still more preferably in the range of about 0.75 pli to about 1.0 pli or greater.

Figure 10:
FIG. 10 is a partial sectional view of a support film in abutting relationship with an alternative release film, in accordance with a third alternative embodiment of the present invention.
Figure 11:
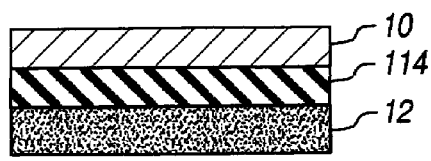
FIG. 11 is a partial sectional view of the support film and alternative release film shown in FIG. 10 in abutting relationship with a substrate, in accordance with a third alternative embodiment of the present invention.

In accordance with a third alternative embodiment of the present invention, an alternative release film 114 is provided for use in conjunction with support film 10, as generally shown in FIG. 10. As with the embodiment depicted in FIGS. 7–9, the alternative release film 114 functions in substantially the same manner. By way of a non-limiting example, alternative release film 114 can be bonded, fused, or otherwise adhered to support film 10, either before or during the time when support film 10/release film 14 system is brought into contact with substrate 12 to form a support film 10/alternative release film 114/substrate 12 system, as shown generally in FIG. 11.

Figure 11A:
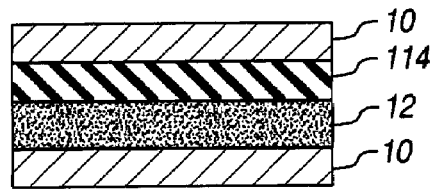
FIG. 11A is a partial sectional view of two support films in abutting relationship with an alternative release film and a substrate, in accordance with a third alternative embodiment of the present invention.

Referring to FIG. 11A, and without being bound to a particular theory of the operation of the present invention, more than one support film, and more preferably two support films 10, 10' can be releaseably secured to alternative release film 114 and substrate 12.

Figure 12:
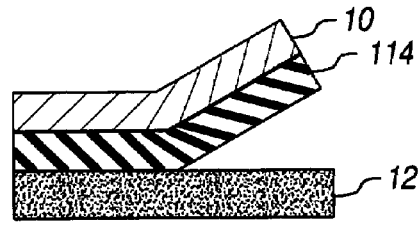
FIG. 12 is a partial sectional view of the support film and alternative release film shown in FIGS. 10 and 11 being removed from the substrate, in accordance with a third alternative embodiment of the present invention.

Further, the alternative release film 114 is preferably selectively operable to be removable from a surface of substrate 12, e.g., either after deposition thereon or after processing, e.g., thermoforming, as generally shown in FIG. 12. In this manner, support film 10/alternative release film 114 system can be more easily removed from the surface of substrate 12 after completion of the thermoforming process, as generally shown in FIG. 12. By way of a non-limiting example, polypropylenes, and blends thereof, marketed under the trade name BICOR (ExxonMobil, Houston, Tex.) can be used as an alternative release film 114.

It should be appreciated that the previously described support films and alternative forms thereof can be combined in several combinations with the previously described release films and alternative forms thereof.

Figure 13:
FIG. 13 is a partial sectional view of an alternative support film and a release film, in accordance with a fourth alternative embodiment of the present invention.
Figure 14:
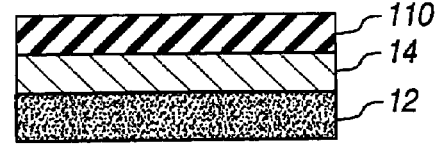
FIG. 14 is a partial sectional view of the alternative support film and release film shown in FIG. 13 in abutting relationship with a substrate, in accordance with a fourth alternative embodiment of the present invention.
Figure 15:
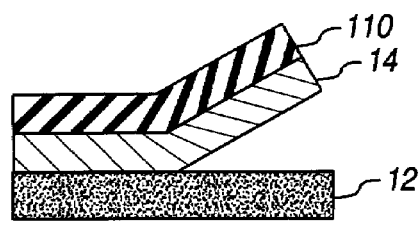
FIG. 15 is a partial sectional view of the alternative support film and release film shown in FIGS. 13 and 14 being removed from the substrate, in accordance with a fourth alternative embodiment of the present invention.

By way of a non-limiting example, alternative support film 110 can be used in conjunction with release film 14 (as generally shown in FIGS. 13–15), in accordance with a fourth alternative embodiment of the present invention. The intended function of the alternative support film 110/release film 14 system is substantially the same as the previously described system embodiments. In this manner, alternative support film 110/release film 14 system can be more easily removed from the surface of substrate 12 after completion of the thermoforming process, as generally shown in FIG. 15.

Figure 14A:
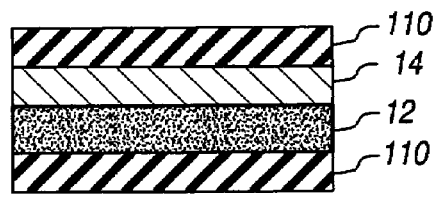
FIG. 14A is a partial sectional view of two support films in abutting relationship with a release film and a substrate, in accordance with a fourth alternative embodiment of the present invention.

Referring to FIG. 14A, and without being bound to a particular theory of the operation of the present invention, more than one support film, and more preferably two support films 110, 110' can be releaseably secured to release film 14 and substrate 12.

Figure 16:
FIG. 16 is a partial sectional view of an alternative support film and an alternative release film, in accordance with a fifth alternative embodiment of the present invention.
Figure 17:
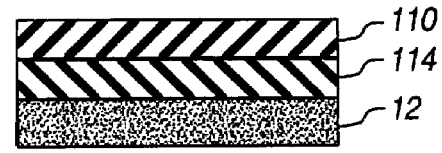
FIG. 17 is a partial sectional view of the alternative support film and alternative release film shown in FIG. 16 in abutting relationship with a substrate, in accordance with a fifth alternative embodiment of the present invention.
Figure 18:
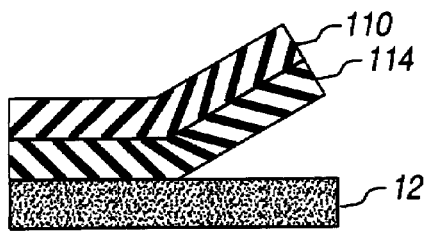
FIG. 18 is a partial sectional view of the alternative support film and alternative release film shown in FIGS. 16 and 17 being removed from the substrate, in accordance with a fifth alternative embodiment of the present invention.

By way of another non-limiting example, alternative support film 110 can be used in conjunction with alternative release film 114 (as generally shown in FIGS. 16–18), in accordance with a fifth alternative embodiment of the present invention. The intended function of the alternative support film 110/alternative release film 114 system is substantially the same as the previously described system embodiments, especially that shown in FIGS. 13–15. In this manner, alternative support film 110/alternative release film 114 system can be more easily removed from the surface of substrate 12 after completion of the thermoforming process, as generally shown in FIG. 9.

Figure 17A:
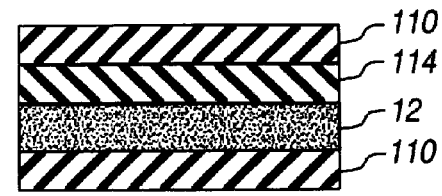
FIG. 17A is a partial sectional view of two support films in abutting relationship with an alternative release film and a substrate, in accordance with a fifth alternative embodiment of the present invention.

Referring to FIG. 17A, and without being bound to a particular theory of the operation of the present invention, more than one support film, and more preferably two support films 110, 110' can be releaseably secured to alternative release film 114 and substrate 12.

In accordance with a preferred embodiment of the present invention, support film 10, and alternatives thereof, can be applied with a surfacing film system 16, e.g., to substrate 12, especially during an extrusion process. Without being bound to a particular theory of the operation of the present invention, the intended purpose of surfacing film system 16 is to impart a surface effect (e.g., paint or color simulation) onto a surface of substrate 12, such as but not limited to an automotive component.

By way of a non-limiting example, surfacing film system 16 of the present invention can be comprised of a decorative layer (e.g., paint, ink, or other colorant), an optional adhesive layer (e.g., a heat-activated adhesive), an optional scratch resistant top clear coat layer, and an optional removable casting base (e.g., a polyester-based sheet). These types of surfacing film systems, also referred to as paint or color-containing films, are readily commercially available from Avery Dennison Corp. (Pasadena, Calif.), Soliant, L.L.C. (Lancaster, S.C.) and Dorrie International (Farmington Hills, Mich.). These films are generally available in a wide range of colors, including solid metallic colors, and are primarily used in a number of automotive applications. It should be appreciated that other types of paint or color-containing films can be used in the practice of the present invention, as well.

Additionally, surfacing film system 16 of the present invention can be comprised of a mold-in-color (MIC) film. One particular MIC film currently being used is a MIC ionomer film readily commercially available from Mayco Plastics, Inc. (Sterling Heights, Mich.) under the trade name FORMION. The MIC ionomer film typically consists of 4 discrete layers with a back molded thermoplastic polyolefin substrate. The layers typically consist of a clear ionomer layer, a colored ionomer layer, an adhesive layer, and a backing layer.

Figure 19:
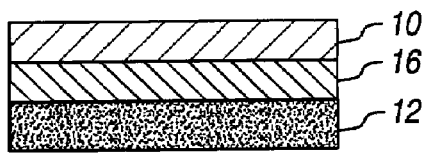
FIG. 19 is a partial sectional view of a support film and a surfacing film in abutting relationship with a substrate, in accordance with a sixth alternative embodiment of the present invention.

Referring to FIG. 19, and without being bound to a particular theory of the operation of the present invention, it is intended that surfacing film system 16 is to be applied to a surface of substrate 12, in accordance with a sixth alternative embodiment of the present invention. Preferably, surfacing film system 16 is permanently adhered to substrate 12.

Figure 19A:
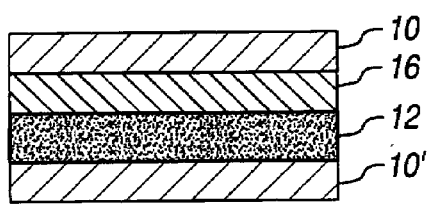
FIG. 19A is a partial sectional view of two support films in abutting relationship with a surfacing film and a substrate, in accordance with a sixth alternative embodiment of the present invention.

Referring to FIG. 19A, and without being bound to a particular theory of the operation of the present invention, more than one support film, and more preferably two support films 10, 10' can be releaseably secured to surfacing film system 16 and substrate 12.

Figure 20:
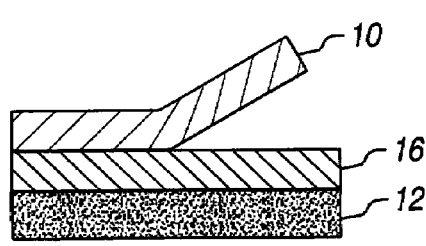
FIG. 20 is a partial sectional view of the support film shown in FIG. 19 being removed from the surfacing film, in accordance with a sixth alternative embodiment of the present invention.

Referring to FIG. 20, support film 10 is preferably selectively operable to be removable from a surface of surfacing film system 16, e.g., either after deposition thereon or after processing, e.g., thermoforming.

It should be appreciated that the previously described support films and alternative forms thereof can be combined in several combinations with the previously described surfacing film systems and alternative forms thereof.

Figure 21A:
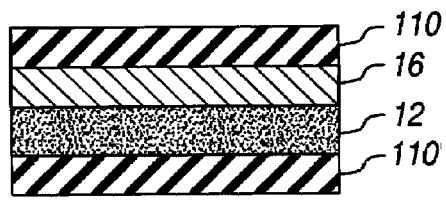
FIG. 21A is a partial sectional view of two support films in abutting relationship with a surfacing film and a substrate, in accordance with a seventh alternative embodiment of the present invention.
Figure 22:
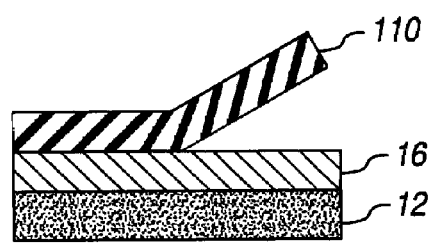
FIG. 22 is a partial sectional view of the alternative support film shown in FIG. 21 being removed from the surfacing film, in accordance with a seventh alternative embodiment of the present invention.
Figure 21:
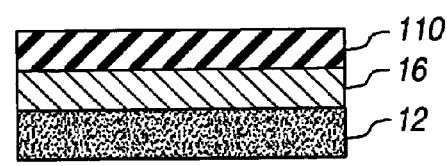
FIG. 21 is a partial sectional view of an alternative support film and a surfacing film in abutting relationship with a substrate, in accordance with a seventh alternative embodiment of the present invention.

By way of a non-limiting example, alternative support film 110 can be used in conjunction with surfacing film system 16 (as generally shown in FIGS. 21–22), in accordance with a seventh alternative embodiment of the present invention. The intended function of the alternative support film 110/surfacing film system 16 system is substantially the same as the previously described system embodiments, especially that shown in FIGS. 19–20.

Referring to FIG. 21A, and without being bound to a particular theory of the operation of the present invention, more than one support film, and more preferably two support films 110, 110' can be releaseably secured to surfacing film system 16 and substrate 12.

Figure 23:
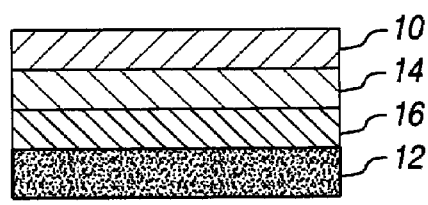
FIG. 23 is a partial sectional view of a support film, a release film, and a surfacing film in abutting relationship with a substrate, in accordance with an eighth alternative embodiment of the present invention.

In accordance with an eighth alternative embodiment of the present invention, support film 10 can be used in conjunction with release film 14 when applying surfacing film system 16, e.g., to substrate 12, as shown generally in FIG. 23. Preferably, surfacing film system 16 is permanently adhered to substrate 12.

Figure 23A:
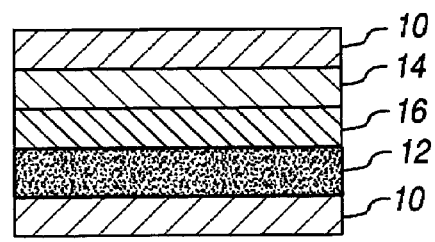
FIG. 23A is a partial sectional view of two support films in abutting relationship with a release film and a substrate, in accordance with an eighth alternative embodiment of the present invention.

Referring to FIG. 23A, and without being bound to a particular theory of the operation of the present invention, more than one support film, and more preferably two support films 10, 10' can be releaseably secured to release film 14 and substrate 12.

Figure 24:
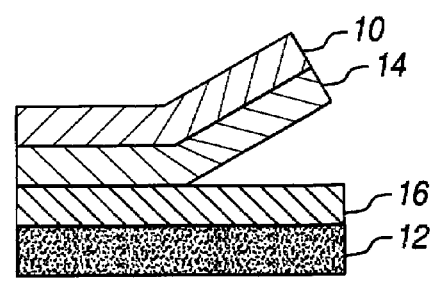
FIG. 24 is a partial sectional view of the support film and release film shown in FIG. 23 being removed from the surfacing film, in accordance with an eighth alternative embodiment of the present invention.

Referring to FIG. 24, release film 14 is preferably selectively operable to be removable from a surface of surfacing film system 16, e.g., either after deposition thereon or after processing, e.g., thermoforming. In this manner, support film 10/release film 14 system can be more easily removed from the surface of surfacing film system 16 after completion of the thermoforming process, as generally shown in FIG. 24.

It should be appreciated that the previously described support films, release films, and alternative forms thereof can be combined in several combinations with the previously described surfacing film systems and alternative forms thereof.

Figure 25:
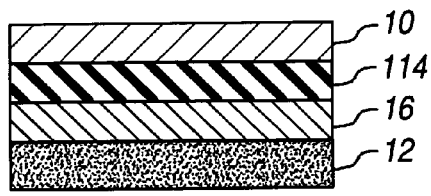
FIG. 25 is a partial sectional view of a support film, an alternative release film, and a surfacing film in abutting relationship with a substrate, in accordance with a ninth alternative embodiment of the present invention.
Figure 26:
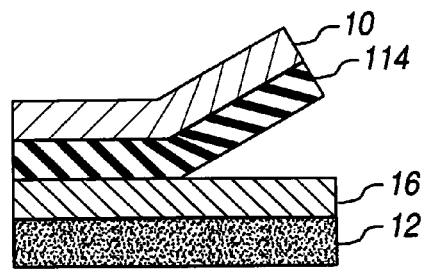
FIG. 26 is a partial sectional view of the support film and alternative release film shown in FIG. 25 being removed from the surfacing film, in accordance with a ninth alternative embodiment of the present invention.

By way of a non-limiting example, support film 10 can be used in conjunction with alternative release film 114 when applying surfacing film system 16, e.g., to substrate 12 (as generally shown in FIGS. 25–26), in accordance with a ninth alternative embodiment of the present invention. The intended function of the support film 10/alternative release film 114/surfacing film system 16 system is substantially the same as the previously described system embodiments, especially that shown in FIGS. 23–24. In this manner, support film 10/alternative release film 114 system can be more easily removed from the surface of surfacing film system 16.

Figure 25A:
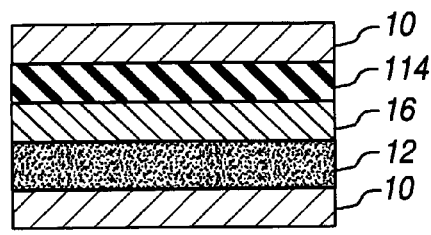
FIG. 25A is a partial sectional view of two support films in abutting relationship with an alternative release film and a substrate, in accordance with a ninth alternative embodiment of the present invention.

Referring to FIG. 25A, and without being bound to a particular theory of the operation of the present invention, more than one support film, and more preferably two support films 10, 10' can be releaseably secured to alternative release film 114 and substrate 12.

Figure 27:
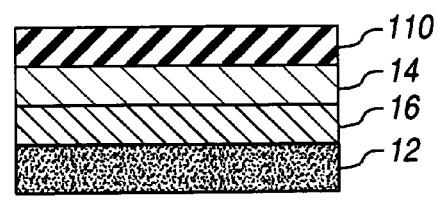
FIG. 27 is a partial sectional view of an alternative support film, a release film, and a surfacing film in abutting relationship with a substrate, in accordance with a tenth alternative embodiment of the present invention.
Figure 28:
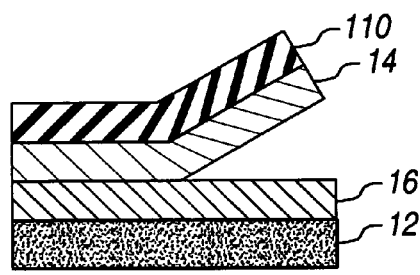
FIG. 28 is a partial sectional view of the alternative support film and release film shown in FIG. 27 being removed from the surfacing film, in accordance with a tenth alternative embodiment of the present invention.

By way of another non-limiting example, alternative support film 110 can be used in conjunction with release film 14 (as generally shown in FIGS. 27–28), in accordance with a tenth alternative embodiment of the present invention. The intended function of the alternative support film 110/release film 14/surfacing film system 16 system is substantially the same as the previously described system embodiments, especially that shown in FIGS. 25–26. In this manner, alternative support film 110/release film 14 system can be more easily removed from the surface of surfacing film system 16.

Figure 27A:
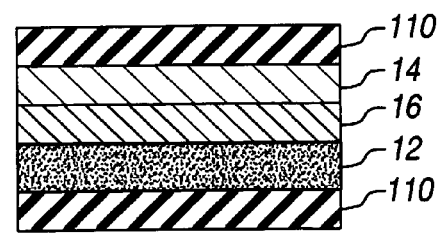
FIG. 27A is a partial sectional view of two support films in abutting relationship with a release film and a substrate, in accordance with a tenth alternative embodiment of the present invention.

Referring to FIG. 27A, and without being bound to a particular theory of the operation of the present invention, more than one support film, and more preferably two support films 110, 110' can be releaseably secured to release film 14 and substrate 12.

Figure 29:
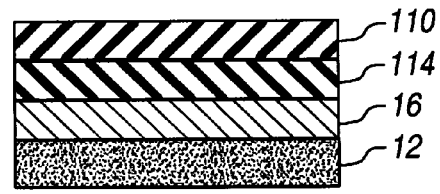
FIG. 29 is a partial sectional view of an alternative support film, an alternative release film, and a surfacing film in abutting relationship with a substrate, in accordance with an eleventh alternative embodiment of the present invention.
Figure 30:
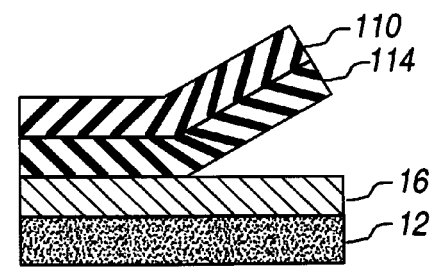
FIG. 30 is a partial sectional view of the alternative support film and alternative release film shown in FIG. 29 being removed from the surfacing film, in accordance with an eleventh alternative embodiment of the present invention.

By way of still another non-limiting example, alternative support film 110 can be used in conjunction with alternative release film 114 (as generally shown in FIGS. 29–30), in accordance with an eleventh alternative embodiment of the present invention. The intended function of the alternative support film 110/alternative release film 114/surfacing film system 16 system is substantially the same as the previously described system embodiments, especially those shown in FIGS. 25–28. In this manner, alternative support film 110/alternative release film 114 system can be more easily removed from the surface of surfacing film system 16.

Figure 29A:
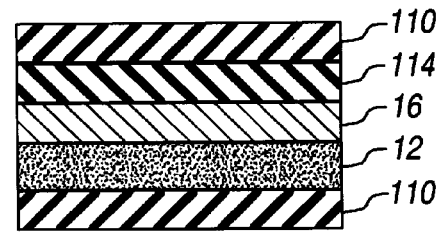
FIG. 29A is a partial sectional view of two support films in abutting relationship with an alternative release film and a substrate, in accordance with an eleventh alternative embodiment of the present invention.

Referring to FIG. 29A, and without being bound to a particular theory of the operation of the present invention, more than one support film, and more preferably two support films 110, 110' can be releaseably secured to alternative release film 114 and substrate 12.

Figure 31:
FIG. 31 is a partial sectional view of a thermoplastic polyolefin primer film, in accordance with the prior art.
Figure 32:
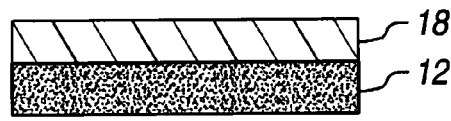
FIG. 32 is a partial sectional view of the thermoplastic polyolefin primer film shown in FIG. 31 in abutting relationship with a substrate, in accordance with the prior art.

Occasionally, it is desired to dispose a primer film 18 (as generally shown in FIG. 31), such as but not limited to thermoplastic polyolefin primer films, to substrate 12 (as generally shown in FIG. 32), in accordance with the prior art. Preferably, primer film 18 is permanently adhered to substrate 12.

These combinations are sometimes referred to as "service parts." To fill service part requirements, there is a need for a plain (e.g., no surfacing films used) thermoformed (e.g., vacuformed) TPO parts that are molded from the same tooling systems that produces the same current original equipment manufacturer (OEM) parts. The problem that occurs with these TPO service parts is that it sometime requires the use of special paint systems to get paint to properly adhere properly to these TPO parts. There are very few, if any, body shops or auto repair centers that would be able to correctly paint these types of parts.

Therefore, to eliminate the need for automotive OEMs to warehouse service parts of each color for each program or car line, a readily paintable TPO part capable of being painted using existing painting systems at most aftermarket auto body shops would be very much in demand.

The thermoformable (e.g., vacuformable) TPO/primer coat described herein has been designed to fill that void. This primer can be used as a monolayer on TPO-based materials or it can be used in conjunction with a support film if bag/sag/drape control becomes necessary due to mold configuration, sheet weight, and/or other considerations.

To achieve the production of these service parts containing a primer layer, it is preferred to use the support film 10 of the present invention, and alternatives thereof.

Figure 33:
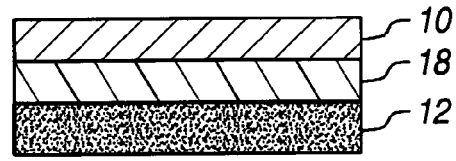
FIG. 33 is a partial sectional view of a support film and the thermoplastic polyolefin primer film shown in FIGS. 31 and 32 in abutting relationship with a substrate, in accordance with a twelfth embodiment of the present invention.

In accordance with a twelfth alternative embodiment of the present invention, support film 10 can be used in conjunction with primer film 18 when applying the primer film e.g., to substrate 12, as shown generally in FIG. 33.

Figure 33A:
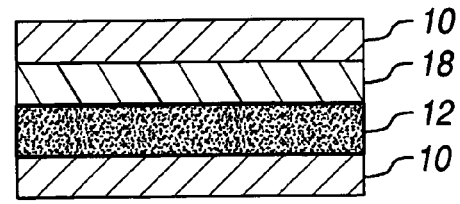
FIG. 33A is a partial sectional view of two support films in abutting relationship with a primer film and a substrate, in accordance with a twelfth alternative embodiment of the present invention.

Referring to FIG. 33A, and without being bound to a particular theory of the operation of the present invention, more than one support film, and more preferably two support films 10, 10' can be releaseably secured to primer film 18 and substrate 12.

Figure 34:
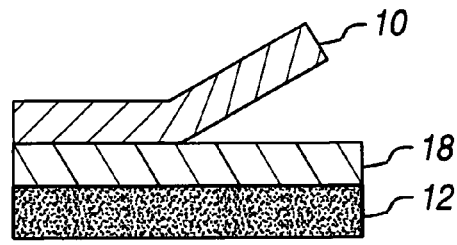
FIG. 34 is a partial sectional view of the support film being removed from the thermoplastic polyolefin primer film shown in FIGS. 31–33, in accordance with an twelfth alternative embodiment of the present invention.

Referring to FIG. 34, support film 10 is preferably selectively operable to be removable from a surface of primer film 18, e.g., either after deposition thereon or after processing, e.g., thermoforming.

It should be appreciated that the previously described support films, and alternative forms thereof can be combined in several combinations with the previously described primer films and alternative forms thereof. Furthermore, release films, as previously described, can also be used in conjunction with the previously described support films, and alternative forms thereof, to apply the primer films and alternative forms thereof.

Figure 35:
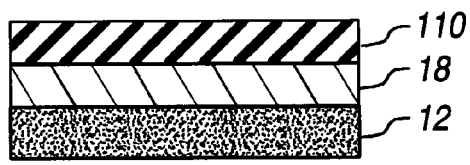
FIG. 35 is a partial sectional view of an alternative support film and the thermoplastic polyolefin primer film shown in FIGS. 31–33 in abutting relationship with a substrate, in accordance with a thirteenth alternative embodiment of the present invention.
Figure 36:
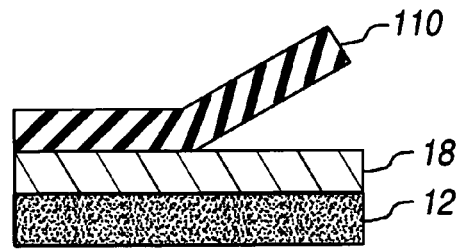
FIG. 36 is a partial sectional view of the alternative support film shown in FIG. 35 being removed from the thermoplastic polyolefin primer film shown in FIGS. 31–35, in accordance with a thirteenth alternative embodiment of the present invention.

By way of a non-limiting example, alternative support film 110 can be used in conjunction with primer film 18 (as generally shown in FIGS. 35–36), in accordance with a thirteenth alternative embodiment of the present invention. The intended function of the alternative support film 110/primer film 18/substrate 12 system is substantially the same as the previously described system embodiments, especially that shown in FIGS. 33–34.

Figure 35A:
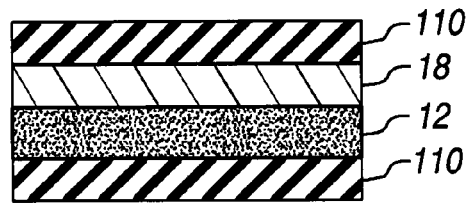
FIG. 35A is a partial sectional view of two support films in abutting relationship with a primer film and a substrate, in accordance with a second alternative embodiment of the present invention.

Referring to FIG. 35A, and without being bound to a particular theory of the operation of the present invention, more than one support film, and more preferably two support films 110, 110' can be releaseably secured to primer film 18 and substrate 12.

Regardless of which type of support film, release film, surfacing film system, primer film, or substrate is used, it is a fairly straightforward process to apply the various materials to one another in the requisite sequence and under suitable conditions and parameters to form a laminate product. The intended purpose of forming the laminate product is to enable a shaping process, e.g., a thermoforming process, to be performed thereupon to form a finished product, such as an automotive component, especially contoured automotive components.

The following extrusion, laminating, and thermoforming examples are merely illustrative in nature and can be modified without departing from the scope of the claimed invention. By way of a non-limiting example, optional rollers, coils, belts, guides, heaters, coolers, cutters, control systems, and the like may be used in conjunction with the extrusion, laminating, and thermoforming examples set forth below.

Referring to FIGS. 37–71, a single pass through lamination system is used to apply a material in a single stage to a particular substrate, e.g., prior to the thermoforming process. It should be noted that either one or more (e.g., two spaced and opposed) support films could be used in conjunction with the following examples.

Figure 37:
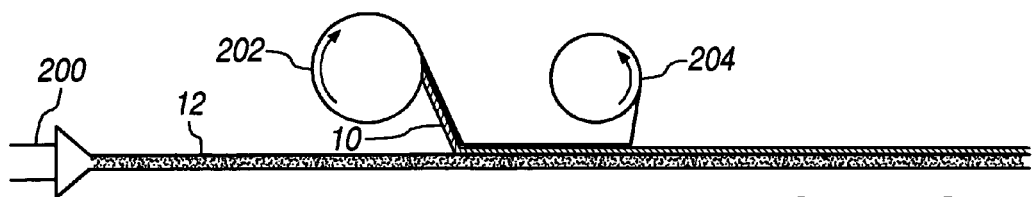
FIG. 37 is a partial schematic view of a lamination process wherein a support film is applied to an extruded substrate, in accordance with a fourteenth alternative embodiment of the present invention.
Figure 37A:
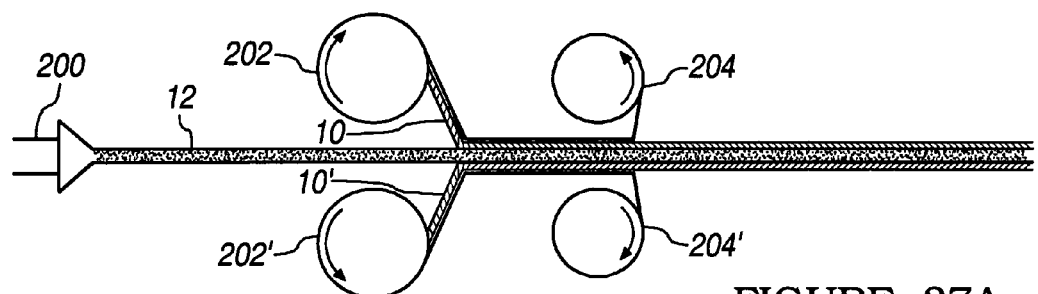
FIG. 37A is a partial schematic view of a lamination process wherein an optional second support film is applied to an extruded substrate, in accordance with a fourteenth alternative embodiment of the present invention.

Referring to FIG. 37, substrate 12 is extruded from extruder 200, in accordance with a fourteenth alternative embodiment of the present invention. It should also be appreciated that substrate 12 can be pre-fabricated, coiled onto a coil system (not shown) and uncoiled from the coil system during the lamination process, or can be in pre-cut sheet form. Support film 10 is then applied to either surface of substrate 12. Support film 10 is preferably supplied from a supply coil system 202. Additionally, an optional selectively removable backing film (e.g., a polyester backing sheet) can be used with support film 10 such that support film 10 can be more easily spooled or coiled onto coil 202. Accordingly, as support film 10 is applied to either surface of substrate 12, the optional backing film can be removed and taken up by take-up coil 204. Furthermore, it should be appreciated that an optional second support film 10' can be applied to the underside of substrate 12, such that the second support film 10' is spaced and opposed from support film 10. For example, as shown in FIG. 37A, optional second support film 10' can be applied from optional supply coil system 202', with any optional backing film being removed and taken up by optional take-up coil 204'.

Figure 38:
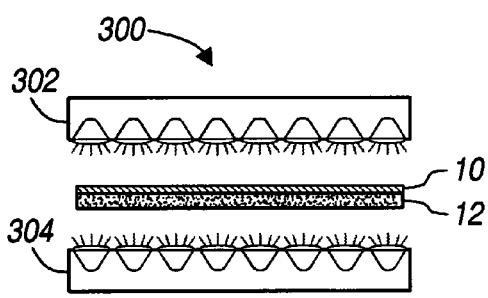
FIG. 38 is a partial schematic view of a thermoforming process wherein the laminated support film/substrate portion shown in FIG. 37 is heated prior to shaping into the form of a component, in accordance with a fourteenth alternative embodiment of the present invention.

The support film 10/substrate 12 system is then preferably placed in a frame (not shown for purposes of illustration) and taken to an oven system 300, preferably including an upper heating element 302 and a lower heating element 304, as generally shown in FIG. 38. The support film 10/substrate 12 system is preferably kept in the oven system 300 for a sufficient time and at a sufficient temperature to achieve the requisite softening of the support film 10/substrate 12 system.

Figure 39:
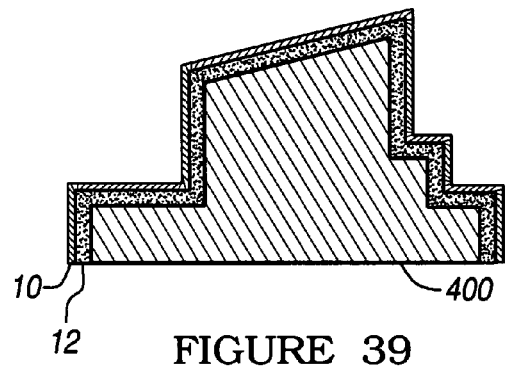
FIG. 39 is a partial sectional view of a mold surface being used to shape the laminated support film/substrate portion shown in FIG. 38 to the form of the component, in accordance with a fourteenth alternative embodiment of the present invention.

Once the support film 10/substrate 12 system is sufficiently softened, it is taken (in its frame) to a thermoforming system 400, preferably having a male and/or female mold surface formed thereon, as shown generally in FIG. 39. The softened support film 10/substrate 12 system is either brought into contact with the mold surface of the thermoforming system 400, or alternatively, the mold surface of the thermoforming system 400 is brought into contact with the softened support film 10/substrate 12 system. Preferably, a vacuum force is applied during contact such that the softened support film 10/substrate 12 system is drawn onto the mold surface of the thermoforming system 400 to form a component C having a desired configuration.

Figure 40:
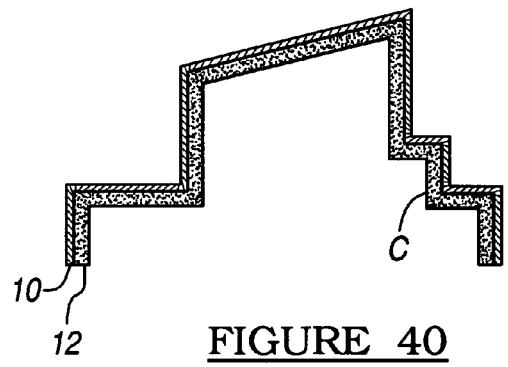
FIG. 40 is a partial sectional view of the formed component comprised of the shaped laminated support film/substrate portion shown in FIGS. 38–39 once it has been removed from the mold surface, in accordance with a fourteenth alternative embodiment of the present invention.

After the thermoforming process is completed, component C, still having support film 10 adhered thereto (specifically the surface of substrate 12) is removed from the mold surface of the thermoforming system 400, as shown generally in FIG. 40.

Figure 41:
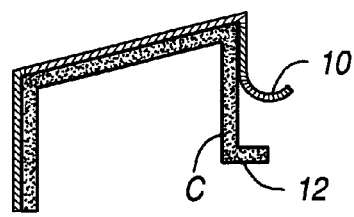
FIG. 41 is a partial sectional view of the support film shown in FIGS. 38–40 being removed from the formed component which has been trimmed to the requisite dimensions, in accordance with a fourteenth alternative embodiment of the present invention.

At this point, or at a later time if so desired, support film 10 can be removed from the surface of component C, specifically the surface of substrate 12, as shown generally in FIG. 41. The component C can then be used immediately, or alternatively, be subjected to further processing, e.g., trimming, painting, coating, and the like.

It should be appreciated that component C can be used in any number of applications, including but not limited to automotive applications. Additionally, it should be appreciated that although component C is shown as being substantially contoured, the present invention is equally useful for forming components that have substantial planar surface portions associated therewith, as well.

As previously noted, alternative support film 110 can be used in the extrusion, lamination, and thermoforming processes of the present invention.

Figure 42:
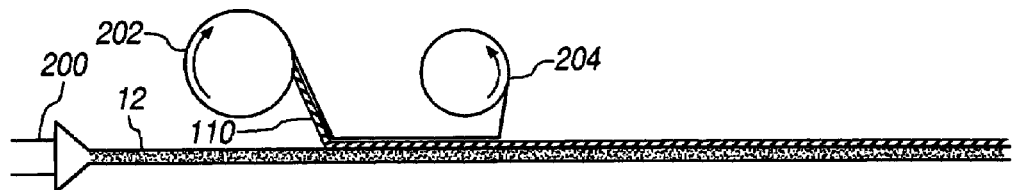
FIG. 42 is a partial schematic view of a lamination process wherein an alternative support film is applied to an extruded substrate, in accordance with a fifteenth alternative embodiment of the present invention.
Figure 42A:
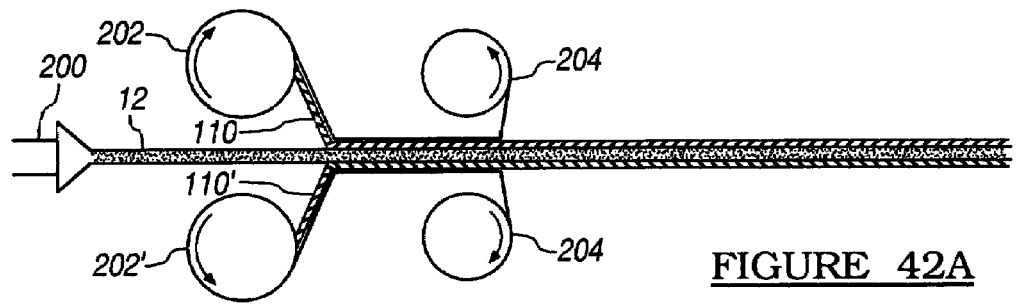
FIG. 42A is a partial schematic view of a lamination process wherein an optional second alternative support film is applied to an extruded substrate, in accordance with a fifteenth alternative embodiment of the present invention.
Figure 43:
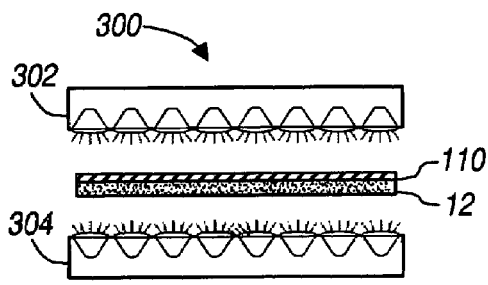
FIG. 43 is a partial schematic view of a thermoforming process wherein the laminated alternative support film/substrate portion shown in FIG. 42 is heated prior to shaping into the form of a component, in accordance with a fifteenth alternative embodiment of the present invention.
Figure 44:
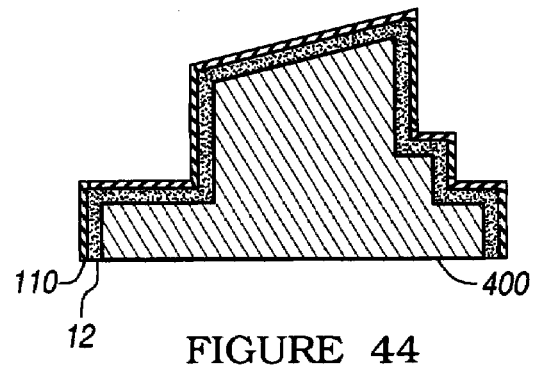
FIG. 44 is a partial sectional view of a mold surface being used to shape the laminated alternative support film/substrate portion shown in FIG. 43 to the form of the component, in accordance with a fifteenth alternative embodiment of the present invention.
Figure 46:
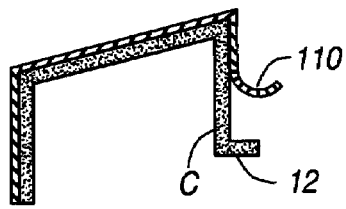
FIG. 46 is a partial sectional view of the alternative support film shown in FIGS. 43–45 being removed from the formed component which has been trimmed to the requisite dimensions, in accordance with a fifteenth alternative embodiment of the present invention.
Figure 45:
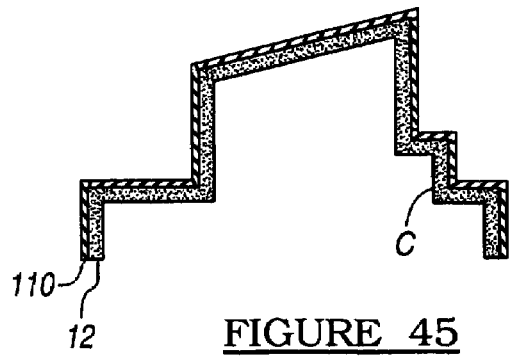
FIG. 45 is a partial sectional view of the formed component comprised of the shaped laminated alternative support film/substrate portion shown in FIGS. 43–44 once it has been removed from the mold surface, in accordance with a fifteenth alternative embodiment of the present invention.

Referring to FIGS. 42–46, the steps in the extrusion, lamination, and thermoforming processes with alternative support film 110 are shown, in accordance with a fifteenth alternative embodiment of the present invention. The steps shown in FIGS. 42–46 are substantially the same as those depicted in FIGS. 37–41, except for the use of alternative support film 110. Furthermore, it should be appreciated that an optional second alternative support film 110' can be applied to the underside of substrate 12, such that the second alternative support film 110' is spaced and opposed from alternative support film 110. For example, as shown in FIG. 42A, optional second alternative support film 110' can be applied from optional supply coil system 202', with any optional backing film being removed and taken up by optional take-up coil 204'.

Figure 47:
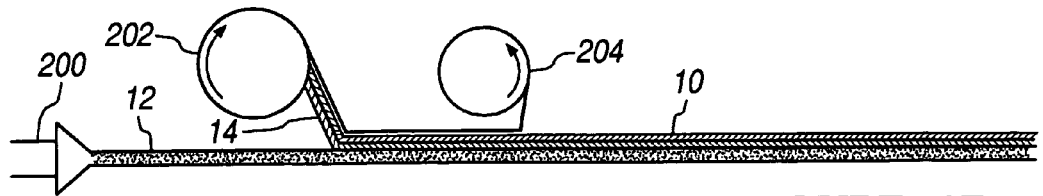
FIG. 47 is a partial schematic view of a lamination process wherein a support film/release film system is applied to an extruded substrate, in accordance with a sixteenth alternative embodiment of the present invention.
Figure 47A:
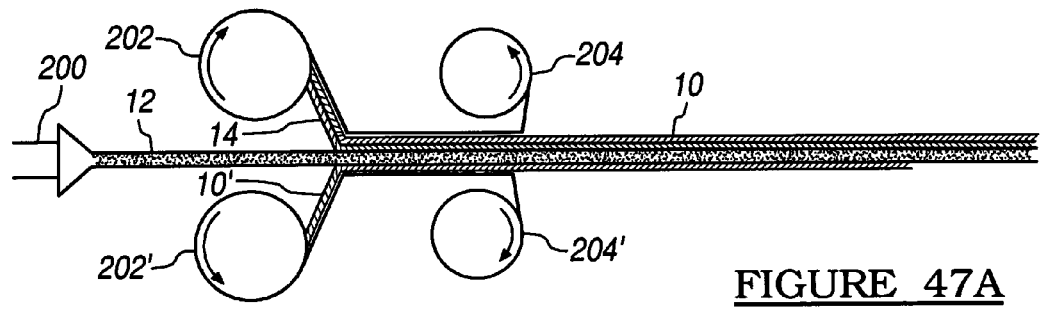
FIG. 47A is a partial schematic view of a lamination process wherein an optional second support film is applied to an extruded substrate, in accordance with a sixteenth alternative embodiment of the present invention.
Figure 48:
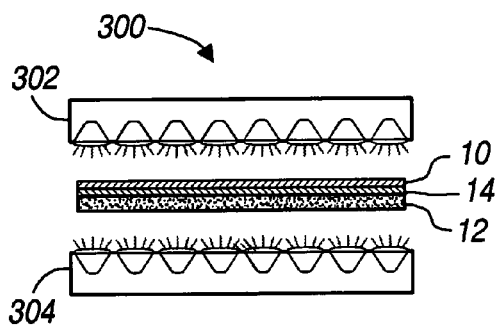
FIG. 48 is a partial schematic view of a thermoforming process wherein the laminated support film/release film/substrate portion shown in FIG. 47 is heated prior to shaping into the form of a component, in accordance with a sixteenth alternative embodiment of the present invention.
Figure 49:
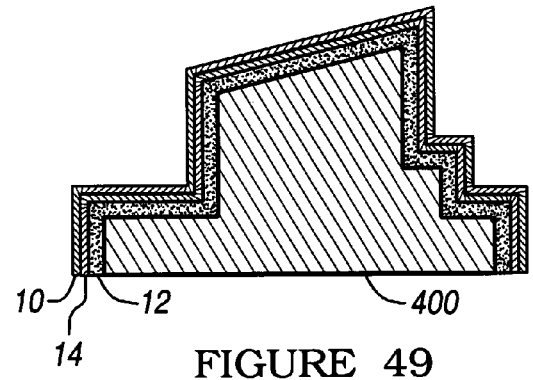
FIG. 49 is a partial sectional view of a mold surface being used to shape the laminated support film/release film system/substrate portion shown in FIG. 48 to the form of the component, in accordance with a sixteenth alternative embodiment of the present invention.
Figure 51:
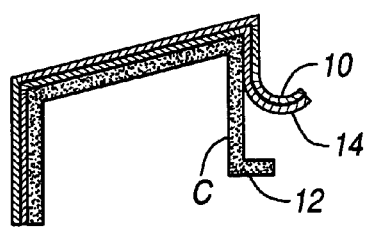
FIG. 51 is a partial sectional view of the support film/release film system shown in FIGS. 48–50 being removed from the formed component which has been trimmed to the requisite dimensions, in accordance with a sixteenth alternative embodiment of the present invention.
Figure 50:
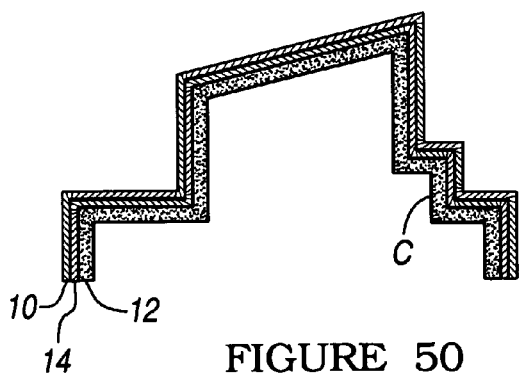
FIG. 50 is a partial sectional view of the formed component comprised of the shaped laminated support film/release film system/substrate portion shown in FIGS. 48–49 once it has been removed from the mold surface, in accordance with a sixteenth alternative embodiment of the present invention.

Referring to FIGS. 47–51, the steps in the extrusion, lamination, and thermoforming processes with support film 10/release film 14 system are shown, in accordance with a sixteenth alternative embodiment of the present invention. The steps shown in FIGS. 47–51 are substantially the same as those depicted in FIGS. 37–46, except for the use of support film 10/release film 14 system. Thus, both release film 14 and support film 10 can be removed simultaneously (as a single system) from the surface of component C, specifically the surface of substrate 12, as shown generally in FIG. 51. Furthermore, it should be appreciated that an optional second support film 10' can be applied to the underside of substrate 12, such that the second support film 10' is spaced and opposed from support film 10. For example, as shown in FIG. 47A, optional second support film 10' can be applied from optional supply coil system 202', with any optional backing film being removed and taken up by optional take-up coil 204'.

As previously noted, alternative release film 114 can be used in the extrusion, lamination, and thermoforming processes of the present invention.

Figure 52:
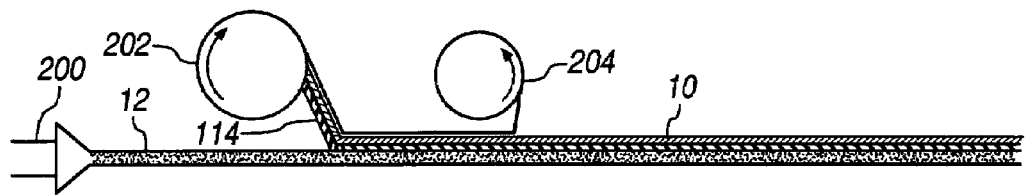
FIG. 52 is a partial schematic view of a lamination process wherein a support film/alternative release film system is applied to an extruded substrate, in accordance with a seventeenth alternative embodiment of the present invention.
Figure 52A:
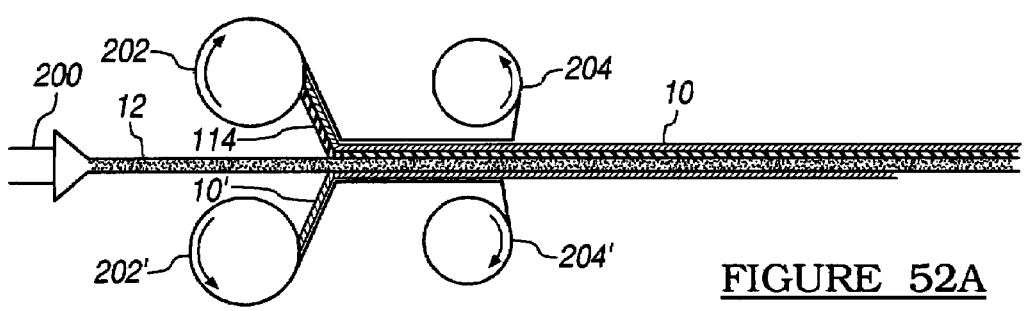
FIG. 52A is a partial schematic view of a lamination process wherein an optional second support film is applied to an extruded substrate, in accordance with a seventeenth alternative embodiment of the present invention.
Figure 53:
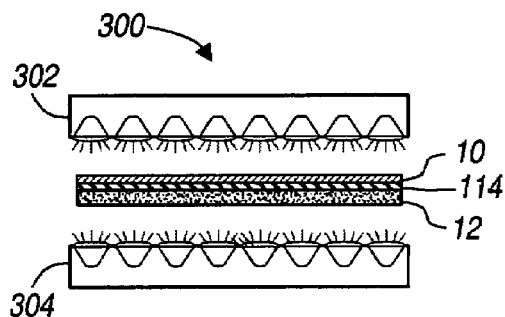
FIG. 53 is a partial schematic view of a thermoforming process wherein the laminated support film/alternative release film system/substrate portion shown in FIG. 52 is heated prior to shaping into the form of a component, in accordance with a seventeenth alternative embodiment of the present invention.
Figure 54:
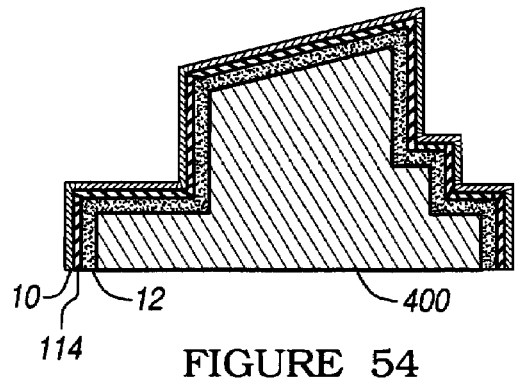
FIG. 54 is a partial sectional view of a mold surface being used to shape the laminated support film/alternative release film system/substrate portion shown in FIG. 53 to the form of the component, in accordance with a seventeenth alternative embodiment of the present invention.
Figure 56:
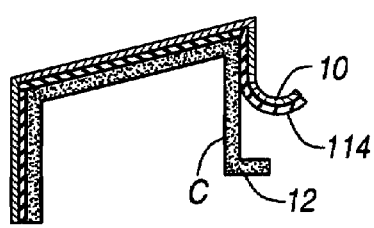
FIG. 56 is a partial sectional view of the support film/alternative release film system shown in FIGS. 53–55 being removed from the formed component which has been trimmed to the requisite dimensions, in accordance with a seventeenth alternative embodiment of the present invention.
Figure 55:
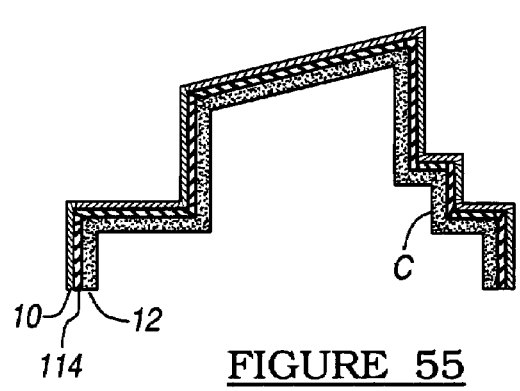
FIG. 55 is a partial sectional view of the formed component comprised of the shaped laminated support film/alternative release film system/substrate portion shown in FIGS. 53–54 once it has been removed from the mold surface, in accordance with a seventeenth alternative embodiment of the present invention.
Figure 67:
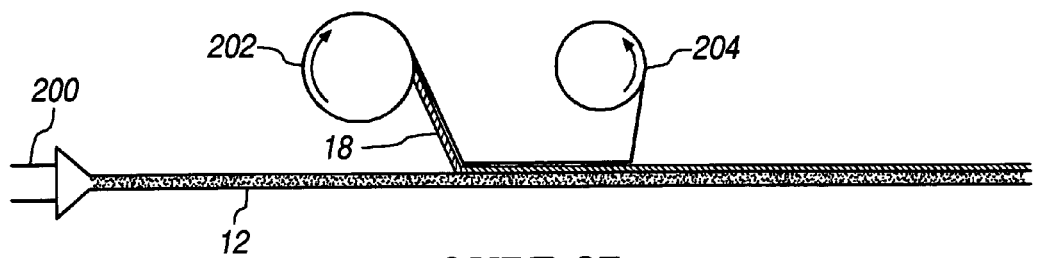
FIG. 67 is a partial schematic view of a lamination process wherein a thermoplastic polyolefin primer film is applied to an extruded substrate, in accordance with the prior art.
Figure 68:
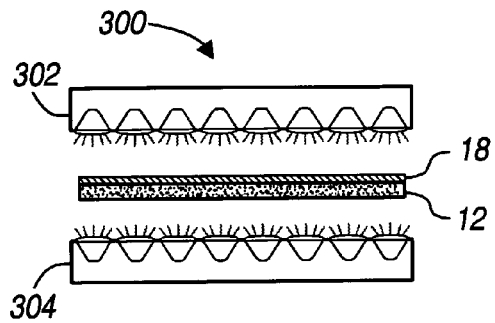
FIG. 68 is a partial schematic view of a thermoforming process wherein the laminated primer film/substrate portion shown in FIG. 67 is heated prior to shaping into the form of a component, in accordance with the prior art.
Figure 69:
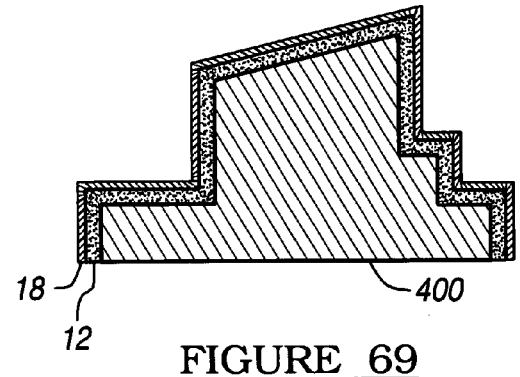
FIG. 69 is a partial sectional view of a mold surface being used to shape the laminated primer film/substrate portion shown in FIG. 68 to the form of the component, in accordance with the prior art.
Figure 71:
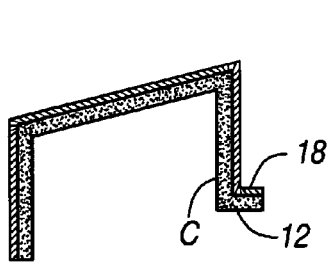
FIG. 71 is a partial sectional view of the component comprised of the primer film/substrate system shown in FIGS. 68–70 after being trimmed to the requisite dimensions, in accordance with the prior art.
Figure 70:
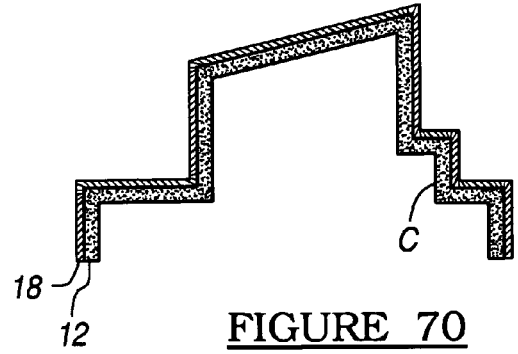
FIG. 70 is a partial sectional view of the formed component comprised of the shaped laminated primer film/substrate portion shown in FIGS. 68–69 once it has been removed from the mold surface, in accordance with the prior art.

Referring to FIGS. 52–56, the steps in the extrusion, lamination, and thermoforming processes with support film 10/alternative release film 114 system are shown, in accordance with a seventeenth alternative embodiment of the present invention. The steps shown in FIGS. 52–56 are substantially the same as those depicted in FIGS. 47–51, except for the use of support film 10/alternative release film 114 system. Thus, both alternative release film 114 and support film 10 can be removed simultaneously (as a single system) from the surface of component C, specifically the surface of substrate 12, as shown generally in FIG. 56. Furthermore, it should be appreciated that an optional second support film 10' can be applied to the underside of substrate 12, such that the second support film 10' is spaced and opposed from support film 10. For example, as shown in FIG. 52A, optional second support film 10' can be applied from optional supply coil system 202', with any optional backing film being removed and taken up by optional take-up coil 204'.

As previously noted, alternative support film 110 can be used in the extrusion, lamination, and thermoforming processes of the present invention.

Referring to FIGS. 57–61, the steps in the extrusion, lamination, and thermoforming processes with alternative support film 110/release film 14 system are shown, in accordance with an eighteenth alternative embodiment of the present invention. The steps shown in FIGS. 57–61 are substantially the same as those depicted in FIGS. 52–56, except for the use of alternative support film 110/release film 14 system. Thus, both release film 14 and alternative support film 110 can be removed simultaneously (as a single system) from the surface of component C, specifically the surface of substrate 12, as shown generally in FIG. 61. Furthermore, it should be appreciated that an optional second alternative support film 110' can be applied to the underside of substrate 12, such that the second alternative support film 110' is spaced and opposed from alternative support film 110. For example, as shown in FIG. 57A, optional second alternative support film 110' can be applied from optional supply coil system 202', with any optional backing film being removed and taken up by optional take-up coil 204'.

As previously noted, both alternative support film 110 and alternative release film 114 can both be used in the extrusion, lamination, and thermoforming processes of the present invention.

Referring to FIGS. 62–66, the steps in the extrusion, lamination, and thermoforming processes with alternative support film 110/alternative release film 14 system are shown, in accordance with a nineteenth alternative embodiment of the present invention. The steps shown in FIGS. 62–66 are substantially the same as those depicted in FIGS. 57–61, except for the use of alternative support film 110/alternative release film 114 system. Thus, both alternative release film 114 and alternative support film 110 can be removed simultaneously (as a single system) from the surface of component C, specifically the surface of substrate 12, as shown generally in FIG. 66. Furthermore, it should be appreciated that an optional second alternative support film 110' can be applied to the underside of substrate 12, such that the second alternative support film 110' is spaced and opposed from alternative support film 110. For example, as shown in FIG. 62A, optional second alternative support film 110' can be applied from optional supply coil system 202', with any optional backing film being removed and taken up by optional take-up coil 204'.

As previously noted, it is sometimes desired to apply primer film 18 to substrate 12, as shown generally in FIGS. 67–71, in accordance with the prior art.

Referring to FIGS. 67–71, the steps in the extrusion, lamination, and thermoforming processes with primer film 18 is shown. The steps shown in FIGS. 67–71 are substantially the same as those depicted in FIGS. 37–41, except for the use of primer film 18. Primer film 18 is permanently adhered to the surface of component C, specifically the surface of substrate 12, as shown generally in FIG. 71.

Figure 72:
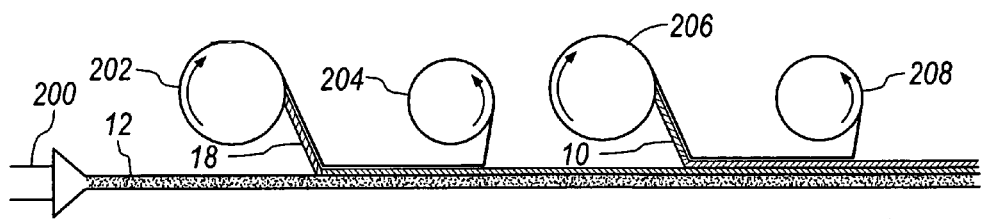
FIG. 72 is a partial schematic view of a lamination process wherein a thermoplastic polyolefin primer film and a support film are applied to an extruded substrate, in accordance with a twentieth alternative embodiment of the present invention.

Referring to FIGS. 72–131, a double pass through lamination system is used to apply materials in two stages to a particular substrate, e.g., prior to the thermoforming process. It should be noted that either one or more (e.g., two spaced and opposed) support films could be used in conjunction with the following examples.

Figure 72A:
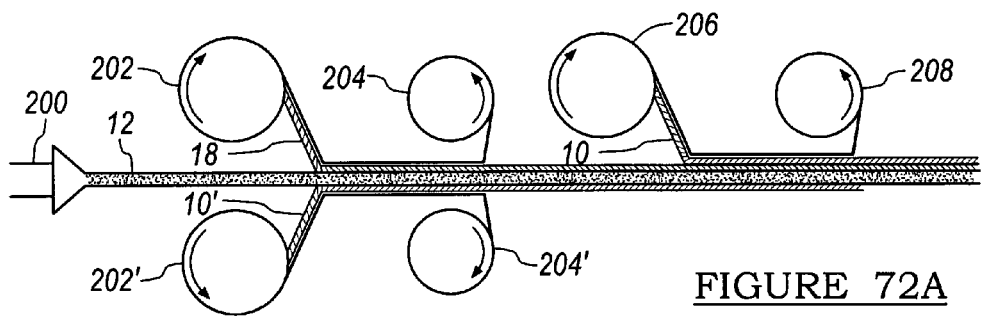
FIG. 72A is a partial schematic view of a lamination process wherein an optional second support film is applied to an extruded substrate, in accordance with a twentieth alternative embodiment of the present invention.

Referring to FIG. 72, substrate 12 is extruded from extruder 200, in accordance with a twentieth alternative embodiment of the present invention. It should also be appreciated that substrate 12 can be pre-fabricated, coiled onto a coil system (not shown) and uncoiled from the coil system during the lamination process, or can be in pre-cut sheet form. Primer film 18 is then applied to either surface of substrate 12. Primer film 18 is preferably supplied from a supply coil system 202, with any optional selectively removable backing film being removed and taken up by take-up coil 204. Support film 10 is then applied to the surface of primer film 18. Support film 10 is preferably supplied from a supply coil system 206, with an optional selectively removable backing film being removed and taken up by take-up coil 208. Furthermore, it should be appreciated that an optional second support film 10' can be applied to the underside of substrate 12, such that the second support film 10' is spaced and opposed from support film 10. For example, as shown in FIG. 72A, optional second support film 10' can be applied from optional supply coil system 202', with any optional backing film being removed and taken up by optional take-up coil 204'.

The support film 10/primer film 18/substrate 12 system is then preferably placed in a frame (not shown for purposes of illustration) and taken to an oven system 300, preferably including an upper heating element 302 and a lower heating element 304, as generally shown in FIG. 73. The support film 10/primer film 18/substrate 12 system is preferably kept in the oven system 300 for a sufficient time and at a sufficient temperature to achieve the requisite softening of the support film 10/primer film 18/substrate 12 system.

Once the support film 10/primer film 18/substrate 12 system is sufficiently softened, it is taken (in its frame) to a thermoforming system 400, preferably having a male and/or female mold surface formed thereon, as shown generally in FIG. 74. The softened support film 10/primer film 18/substrate 12 system is either brought into contact with the mold surface of the thermoforming system 400, or alternatively, the mold surface of the thermoforming system 400 is brought into contact with the softened support film 10/primer film 18/substrate 12 system. Preferably, a vacuum force is applied during contact such that the softened support film 10/primer film 18/substrate 12 system is drawn onto the mold surface of the thermoforming system 400 to form a component C having a desired configuration.

After the thermoforming process is completed, component C, still having support film 10 adhered thereto (specifically primer film 18) is removed from the mold surface of the thermoforming system 400, as shown generally in FIG. 75.

At this point, or at a later time if so desired, support film 10 can be removed from the surface of component C, specifically the surface of primer film 18, as shown generally in FIG. 76. The component C can then be used immediately, or alternatively, be subjected to further processing, e.g., trimming, painting, coating, and the like.

As previously noted, alternative support film 110 can be used in the extrusion, lamination, and thermoforming processes of the present invention.

Referring to FIGS. 77–81, the steps in the extrusion, lamination, and thermoforming processes with alternative support film 110 is shown, in accordance with a twenty-first alternative embodiment of the present invention. The steps shown in FIGS. 77–81 are substantially the same as those depicted in FIGS. 72–76, except for the use of alternative support film 110. Primer film 18 is permanently adhered to the surface of component C, specifically the surface of substrate 12, as shown generally in FIG. 81. Furthermore, it should be appreciated that an optional second alternative support film 110' can be applied to the underside of substrate 12, such that the second alternative support film 110' is spaced and opposed from alternative support film 110. For example, as shown in FIG. 77A, optional second alternative support film 110' can be applied from optional supply coil system 202', with any optional backing film being removed and taken up by optional take-up coil 204'.

Referring to FIG. 82, substrate 12 is extruded from extruder 200, in accordance with a twenty-second alternative embodiment of the present invention. It should also be appreciated that substrate 12 can be pre-fabricated, coiled onto a coil system (not shown) and uncoiled from the coil system during the lamination process, or can be in pre-cut sheet form. Release film 14 is then applied to either surface of substrate 12. Release film 14 is preferably supplied from a supply coil system 202, with any optional selectively removable backing film being removed and taken up by take-up coil 204. Support film 10 is then applied to the surface of release film 14. Support film 10 is preferably supplied from a supply coil system 206, with an optional selectively removable backing film being removed and taken up by take-up coil 208. Furthermore, it should be appreciated that an optional second alternative support film 110' can be applied to the underside of substrate 12, such that the second alternative support film 110' is spaced and opposed from alternative support film 110. For example, as shown in FIG. 82A, optional second support film 10' can be applied from optional supply coil system 202', with any optional backing film being removed and taken up by optional take-up coil 204'.

The support film 10/release film 14/substrate 12 system is then preferably placed in a frame (not shown for purposes of illustration) and taken to an oven system 300, preferably including an upper heating element 302 and a lower heating element 304, as generally shown in FIG. 83. The support film 10/release film 14/substrate 12 system is preferably kept in the oven system 300 for a sufficient time and at a sufficient temperature to achieve the requisite softening of the support film 10/release film 14/substrate 12 system.

Once the support film 10/release film 14/substrate 12 system is sufficiently softened, it is taken (in its frame) to a thermoforming system 400, preferably having a male and/or female mold surface formed thereon, as shown generally in FIG. 84. The softened support film 10/release film 14/substrate 12 system is either brought into contact with the mold surface of the thermoforming system 400, or alternatively, the mold surface of the thermoforming system 400 is brought into contact with the softened support film 10/release film 14/substrate 12 system. Preferably, a vacuum force is applied during contact such that the softened support film 10/release film 14/substrate 12 system is drawn onto the mold surface of the thermoforming system 400 to form a component C having a desired configuration.

After the thermoforming process is completed, component C, still having support film 10 and release film 14 adhered thereto (specifically substrate 12) is removed from the mold surface of the thermoforming system 400, as shown generally in FIG. 85.

At this point, or at a later time if so desired, release film 14 and support film 10 can be removed simultaneously from the surface of component C, specifically the surface of substrate 12, as shown generally in FIG. 78. The component C can then be used immediately, or alternatively, be subjected to further processing, e.g., trimming, painting, coating, and the like.

As previously noted, alternative release film 114 can be used in the extrusion, lamination, and thermoforming processes of the present invention.

Referring to FIGS. 87–91, the steps in the extrusion, lamination, and thermoforming processes with alternative release film 114 is shown, in accordance with a twenty-third alternative embodiment of the present invention. The steps shown in FIGS. 87–91 are substantially the same as those depicted in FIGS. 82–86, except for the use of alternative release film 114. Thus, both alternative release film 114 and support film 10 can be removed simultaneously (as a single system) from the surface of component C, specifically the surface of substrate 12, as shown generally in FIG. 91. Furthermore, it should be appreciated that an optional second support film 10' can be applied to the underside of substrate 12, such that the second support film 10' is spaced and opposed from support film 10. For example, as shown in FIG. 87A, optional second support film 10' can be applied from optional supply coil system 202', with any optional backing film being removed and taken up by optional take-up coil 204'.

As previously noted, alternative support film 110 can be used in the extrusion, lamination, and thermoforming processes of the present invention.

Referring to FIGS. 92–96, the steps in the extrusion, lamination, and thermoforming processes with alternative support film 110 is shown, in accordance with a twenty-fourth alternative embodiment of the present invention. The steps shown in FIGS. 92–96 are substantially the same as those depicted in FIGS. 82–91, except for the use of alternative support film 110. Thus, both release film 14 and alternative support film 110 can be removed simultaneously (as a single system) from the surface of component C, specifically the surface of substrate 12, as shown generally in FIG. 96. Furthermore, it should be appreciated that an optional second alternative support film 110' can be applied to the underside of substrate 12, such that the second alternative support film 110' is spaced and opposed from alternative support film 110. For example, as shown in FIG. 92A, optional second alternative support film 110' can be applied from optional supply coil system 202', with any optional backing film being removed and taken up by optional take-up coil 204'.

As previously noted, both alternative support film 110 and alternative release film 114 can be used in the extrusion, lamination, and thermoforming processes of the present invention.

Referring to FIGS. 97–101, the steps in the extrusion, lamination, and thermoforming processes with alternative support film 110 and alternative release film 114 is shown, in accordance with a twenty-fifth alternative embodiment of the present invention. The steps shown in FIGS. 97–101 are substantially the same as those depicted in FIGS. 82–96, except for the use of alternative support film 110 and alternative release film 114. Thus, both alternative release film 114 and alternative support film 110 can be removed simultaneously (as a single system) from the surface of component C, specifically the surface of substrate 12, as shown generally in FIG. 101. Furthermore, it should be appreciated that an optional second alternative support film 110' can be applied to the underside of substrate 12, such that the second alternative support film 110' is spaced and opposed from alternative support film 110. For example, as shown in FIG. 97A, optional second alternative support film 110' can be applied from optional supply coil system 202', with any optional backing film being removed and taken up by optional take-up coil 204'.

Referring to FIG. 102, substrate 12 is extruded from extruder 200, in accordance with a twenty-sixth alternative embodiment of the present invention. It should also be appreciated that substrate 12 can be pre-fabricated, coiled onto a coil system (not shown) and uncoiled from the coil system during the lamination process, or can be in pre-cut sheet form. Surfacing film 16 (e.g., a paint or color-containing film) is then applied to either surface of substrate 12. Paint or color-containing film 16 is preferably supplied from a supply coil system 202, with any optional selectively removable backing film being removed and taken up by take-up coil 204. Support film 10 is then applied to the surface of surfacing film 16. Support film 10 is preferably supplied from a supply coil system 206, with an optional selectively removable backing film being removed and taken up by take-up coil 208. Furthermore, it should be appreciated that an optional second support film 10' can be applied to the underside of substrate 12, such that the second support film 10' is spaced and opposed from support film 10. For example, as shown in FIG. 102A, optional second support film 10' can be applied from optional supply coil system 202', with any optional backing film being removed and taken up by optional take-up coil 204'.

The support film 10/surfacing film 16/substrate 12 system is then preferably placed in a frame (not shown for purposes of illustration) and taken to an oven system 300, preferably including an upper heating element 302 and a lower heating element 304, as generally shown in FIG. 103. The support film 10/surfacing film 16/substrate 12 system is preferably kept in the oven system 300 for a sufficient time and at a sufficient temperature to achieve the requisite softening of the support film 10/surfacing film 16/substrate 12 system.

Once the support film 10/surfacing film 16/substrate 12 system is sufficiently softened, it is taken (in its frame) to a thermoforming system 400, preferably having a male and/or female mold surface formed thereon, as shown generally in FIG. 104. The softened support film 10/surfacing film 16/substrate 12 system is either brought into contact with the mold surface of the thermoforming system 400, or alternatively, the mold surface of the thermoforming system 400 is brought into contact with the softened support film 10/surfacing film 16/substrate 12 system. Preferably, a vacuum force is applied during contact such that the softened support film 10/surfacing film 16/substrate 12 system is drawn onto the mold surface of the thermoforming system 400 to form a component C having a desired configuration.

After the thermoforming process is completed, component C, still having support film 10 adhered thereto (specifically surfacing film 16) is removed from the mold surface of the thermoforming system 400, as shown generally in FIG. 105.

At this point, or at a later time if so desired, support film 10 can be removed from the surface of component C, specifically the surface of surfacing film 16, as shown generally in FIG. 106. Surfacing film 16 is permanently adhered to the surface of component C, specifically the surface of substrate 12, as shown generally in FIG. 106. The component C can then be used immediately, or alternatively, be subjected to further processing, e.g., trimming, painting, coating, and the like.

As previously noted, alternative support film 110 can be used in the extrusion, lamination, and thermoforming processes of the present invention.

Referring to FIGS. 107–111, the steps in the extrusion, lamination, and thermoforming processes with alternative support film 110 is shown, in accordance with a twenty-seventh alternative embodiment of the present invention. The steps shown in FIGS. 107–111 are substantially the same as those depicted in FIGS. 102–106, except for the use of alternative support film 110. Surfacing film 16 is permanently adhered to the surface of component C, specifically the surface of substrate 12, as shown generally in FIG. 111.

Thus, alternative support film 110 can be removed from the surface of component C, specifically the surface of surfacing film 16, as shown generally in FIG. 111. Furthermore, it should be appreciated that an optional second alternative support film 110' can be applied to the underside of substrate 12, such that the second alternative support film 110' is spaced and opposed from alternative support film 110. For example, as shown in FIG. 107A, optional second alternative support film 110' can be applied from optional supply coil system 202', with any optional backing film being removed and taken up by optional take-up coil 204'.

As previously noted, a combined support film 10 and release film 14 system can be used in the extrusion, lamination, and thermoforming processes of the present invention.

Referring to FIGS. 112–116, the steps in the extrusion, lamination, and thermoforming processes with the combined support film 10 and release film 14 system is shown, in accordance with a twenty-eighth alternative embodiment of the present invention. The steps shown in FIGS. 112–116 are substantially the same as those depicted in FIGS. 102–111, except for the use of the combined support film 10 and release film 14 system. Surfacing film 16 is permanently adhered to the surface of component C, specifically the surface of substrate 12, as shown generally in FIG. 116. Thus, both release film 14 and support film 10 can be removed simultaneously (as a single system) from the surface of component C, specifically the surface of surfacing film 16, as shown generally in FIG. 116. Furthermore, it should be appreciated that an optional second support film 10' can be applied to the underside of substrate 12, such that the second support film 10' is spaced and opposed from support film 10. For example, as shown in FIG. 112A, optional second support film 10' can be applied from optional supply coil system 202', with any optional backing film being removed and taken up by optional take-up coil 204'.

As previously noted, a combined support film 10 and alternative release film 114 system can be used in the extrusion, lamination, and thermoforming processes of the present invention.

Referring to FIGS. 117–121, the steps in the extrusion, lamination, and thermoforming processes with the combined support film 10 and alternative release film 114 system is shown, in accordance with a twenty-ninth alternative embodiment of the present invention. The steps shown in FIGS. 117–121 are substantially the same as those depicted in FIGS. 102–116, except for the use of the combined support film 10 and alternative release film 114 system. Surfacing film 16 is permanently adhered to the surface of component C, specifically the surface of substrate 12, as shown generally in FIG. 121. Thus, both alternative release film 114 and support film 10 can be removed simultaneously (as a single system) from the surface of component C, specifically the surface of surfacing film 16, as shown generally in FIG. 121. Furthermore, it should be appreciated that an optional second support film 10' can be applied to the underside of substrate 12, such that the second support film 10' is spaced and opposed from support film 10. For example, as shown in FIG. 117A, optional second support film 10' can be applied from optional supply coil system 202', with any optional backing film being removed and taken up by optional take-up coil 204'.

As previously noted, a combined alternative support film 110 and release film 14 system can be used in the extrusion, lamination, and thermoforming processes of the present invention.

Referring to FIGS. 122–126, the steps in the extrusion, lamination, and thermoforming processes with the combined alternative support film 110 and release film 14 system is shown, in accordance with a thirtieth alternative embodiment of the present invention. The steps shown in FIGS. 122–126 are substantially the same as those depicted in FIGS. 102–121, except for the use of the combined alternative support film 110 and release film 14 system. Surfacing film 16 is permanently adhered to the surface of component C, specifically the surface of substrate 12, as shown generally in FIG. 126. Thus, both release film 14 and alternative support film 110 can be removed simultaneously (as a single system) from the surface of component C, specifically the surface of surfacing film 16, as shown generally in FIG. 126. Furthermore, it should be appreciated that an optional second alternative support film 110' can be applied to the underside of substrate 12, such that the second alternative support film 110' is spaced and opposed from alternative support film 110. For example, as shown in FIG. 122A, optional second alternative support film 110' can be applied from optional supply coil system 202', with any optional backing film being removed and taken up by optional take-up coil 204'.

As previously noted, a combined alternative support film 110 and alternative release film 114 system can be used in the extrusion, lamination, and thermoforming processes of the present invention.

Referring to FIGS. 127–131, the steps in the extrusion, lamination, and thermoforming processes with the combined alternative support film 110 and alternative release film 114 system is shown, in accordance with a thirty-first alternative embodiment of the present invention. The steps shown in FIGS. 127–131 are substantially the same as those depicted in FIGS. 102–126, except for the use of the combined alternative support film 110 and alternative release film 114 system. Surfacing film 16 is permanently adhered to the surface of component C, specifically the surface of substrate 12, as shown generally in FIG. 131. Thus, both alternative release film 114 and alternative support film 110 can be removed simultaneously (as a single system) from the surface of component C, specifically the surface of surfacing film 16, as shown generally in FIG. 131. Furthermore, it should be appreciated that an optional second alternative support film 110' can be applied to the underside of substrate 12, such that the second alternative support film 110' is spaced and opposed from alternative support film 110. For example, as shown in FIG. 127A, optional second alternative support film 110' can be applied from optional supply coil system 202', with any optional backing film being removed and taken up by optional take-up coil 204'.

Referring to FIGS. 132–156, a triple pass through lamination system is used to apply materials in three stages to a particular substrate, e.g., prior to the thermoforming process. It should be noted that either one or more (e.g., two spaced and opposed) support films could be used in conjunction with the following examples.

Referring to FIG. 132, substrate 12 is extruded from extruder 200, in accordance with a thirty-second alternative embodiment of the present invention. It should also be appreciated that substrate 12 can be pre-fabricated, coiled onto a coil system (not shown) and uncoiled from the coil system during the lamination process, or can be in pre-cut sheet form. Surfacing film 16 is then applied to either surface of substrate 12. Surfacing film 16 is preferably supplied from a supply coil system 202, with any optional selectively removable backing film being removed and taken up by take-up coil 204. Release film 14 is then applied to the surface of surfacing film 16. Release film 14 is preferably supplied from a supply coil system 206, with an optional selectively removable backing film being removed and taken up by take-up coil 208. Support film 10 is then applied to the surface of release film 14. Support film 10 is preferably supplied from a supply coil system 210, with an optional selectively removable backing film being removed and taken up by take-up coil 212. Furthermore, it should be appreciated that an optional second support film 10' can be applied to the underside of substrate 12, such that the second support film 10' is spaced and opposed from support film 10. For example, as shown in FIG. 132A, optional second support film 10' can be applied from optional supply coil system 202', with any optional backing film being removed and taken up by optional take-up coil 204'.

The support film 10/release film 14/surfacing film 16/substrate 12 system is then preferably placed in a frame (not shown for purposes of illustration) and taken to an oven system 300, preferably including an upper heating element 302 and a lower heating element 304, as generally shown in FIG. 133. The support film 10/release film 14/surfacing film 16/substrate 12 system is preferably kept in the oven system 300 for a sufficient time and at a sufficient temperature to achieve the requisite softening of the support film 10/release film 14/surfacing film 16/substrate 12 system.

Once the support film 10/release film 14/surfacing film 16/substrate 12 system is sufficiently softened, it is taken (in its frame) to a thermoforming system 400, preferably having a male and/or female mold surface formed thereon, as shown generally in FIG. 134. The softened support film 10/release film 14/surfacing film 16/substrate 12 system is either brought into contact with the mold surface of the thermoforming system 400, or alternatively, the mold surface of the thermoforming system 400 is brought into contact with the softened support film 10/release film 14/surfacing film 16/substrate 12 system. Preferably, a vacuum force is applied during contact such that the softened support film 10/release film 14/surfacing film 16/substrate 12 system is drawn onto the mold surface of the thermoforming system 400 to form a component C having a desired configuration.

After the thermoforming process is completed, component C, still having support film 10 and release film 14 adhered thereto (specifically surfacing film 16) is removed from the mold surface of the thermoforming system 400, as shown generally in FIG. 135.

At this point, or at a later time if so desired, release film 14 and support film 10 can be removed from the surface of component C, specifically the surface of surfacing film 16, as shown generally in FIG. 136. Surfacing film 16 is permanently adhered to the surface of component C, specifically the surface of substrate 12, as shown generally in FIG. 136. Thus, both release film 14 and support film 10 can be removed simultaneously (as a single system) from the surface of component C, specifically the surface of surfacing film 16, as shown generally in FIG. 136. The component C can then be used immediately, or alternatively, be subjected to further processing, e.g., trimming, painting, coating, and the like.

As previously noted, alternative release film 114 can be used in the extrusion, lamination, and thermoforming processes of the present invention.

Referring to FIGS. 137–141, the steps in the extrusion, lamination, and thermoforming processes with alternative release film 114 is shown, in accordance with a thirty-third alternative embodiment of the present invention. The steps shown in FIGS. 137–141 are substantially the same as those depicted in FIGS. 132–136, except for the use of alternative release film 114. Surfacing film 16 is permanently adhered to the surface of component C, specifically the surface of substrate 12, as shown generally in FIG. 141. Thus, both alternative release film 114 and support film 10 can be removed simultaneously (as a single system) from the surface of component C, specifically the surface of surfacing film 16, as shown generally in FIG. 141. Furthermore, it should be appreciated that an optional second support film 10' can be applied to the underside of substrate 12, such that the second support film 10' is spaced and opposed from support film 10. For example, as shown in FIG. 137A, optional second support film 10' can be applied from optional supply coil system 202', with any optional backing film being removed and taken up by optional take-up coil 204'.

As previously noted, alternative support film 110 can be used in the extrusion, lamination, and thermoforming processes of the present invention.

Referring to FIGS. 142–146, the steps in the extrusion, lamination, and thermoforming processes with alternative support film 110 is shown, in accordance with a thirty-fourth alternative embodiment of the present invention. The steps shown in FIGS. 142–146 are substantially the same as those depicted in FIGS. 132–141, except for the use of alternative support film 110. Surfacing film 16 is permanently adhered to the surface of component C, specifically the surface of substrate 12, as shown generally in FIG. 146. Thus, both release film 14 and alternative support film 110 can be removed simultaneously (as a single system) from the surface of component C, specifically the surface of surfacing film 16, as shown generally in FIG. 146. Furthermore, it should be appreciated that an optional second alternative support film 110' can be applied to the underside of substrate 12, such that the second alternative support film 110' is spaced and opposed from alternative support film 110. For example, as shown in FIG. 142A, optional second alternative support film 110' can be applied from optional supply coil system 202', with any optional backing film being removed and taken up by optional take-up coil 204'.

As previously noted, both alternative support film 110 and alternative release layer 114 can be used in the extrusion, lamination, and thermoforming processes of the present invention.

Referring to FIGS. 147–151, the steps in the extrusion, lamination, and thermoforming processes with alternative support film 110 and alternative release film 114 is shown, in accordance with a thirty-fifth alternative embodiment of the present invention. The steps shown in FIGS. 147–151 are substantially the same as those depicted in FIGS. 132–146, except for the use of alternative support film 110 and alternative release film 114. Surfacing film 16 is permanently adhered to the surface of component C, specifically the surface of substrate 12, as shown generally in FIG. 151. Thus, both alternative release film 114 and alternative support film 110 can be removed simultaneously (as a single system) from the surface of component C, specifically the surface of surfacing film 16, as shown generally in FIG. 151. Furthermore, it should be appreciated that an optional second alternative support film 110' can be applied to the underside of substrate 12, such that the second alternative support film 110' is spaced and opposed from alternative support film 110. For example, as shown in FIG. 147A, optional second alternative support film 110' can be applied from optional supply coil system 202', with any optional backing film being removed and taken up by optional take-up coil 204'.

Referring to FIG. 152, substrate 12 is extruded from extruder 200, in accordance with a thirty-sixth alternative embodiment of the present invention. It should also be appreciated that substrate 12 can be pre-fabricated, coiled onto a coil system (not shown) and uncoiled from the coil system during the lamination process, or can be in pre-cut sheet form. Adhesive film 20 is then applied to either surface of substrate 12. Adhesive film 20 is preferably supplied from a supply coil system 202, with any optional selectively removable backing film being removed and taken up by take-up coil 204. Clear coat/base coat system 22 is then applied to the surface of adhesive film 20. Clear coat/base coat system 22 is preferably supplied from a supply coil system 206, with an optional selectively removable backing film being removed and taken up by take-up coil 208. Support film 10/release film 14 system is then applied to the surface of clear coat/base coat system 22. Support film 10/release film 14 system is preferably supplied from a supply coil system 210, with an optional selectively removable backing film being removed and taken up by take-up coil 212. Furthermore, it should be appreciated that an optional second support film 10' can be applied to the underside of substrate 12, such that the second support film 10' is spaced and opposed from support film 10. For example, as shown in FIG. 152A, optional second support film 10' can be applied from optional supply coil system 202', with any optional backing film being removed and taken up by optional take-up coil 204'.

The support film 10/release film 14 system/clear coat/base coat system 22/adhesive layer 20/substrate 12 system is then preferably placed in a frame (not shown for purposes of illustration) and taken to an oven system 300, preferably including an upper heating element 302 and a lower heating element 304, as generally shown in FIG. 153. The support film 10/release film 14 system/clear coat/base coat system 22/adhesive layer 20/substrate 12 system is preferably kept in the oven system 300 for a sufficient time and at a sufficient temperature to achieve the requisite softening of the support film 10/release film 14 system/clear coat/base coat system 22/adhesive layer 20/substrate 12 system.

Once the support film 10/release film 14 system/clear coat/base coat system 22/adhesive layer 20/substrate 12 system is sufficiently softened, it is taken (in its frame) to a thermoforming system 400, preferably having a male and/or female mold surface formed thereon, as shown generally in FIG. 154. The softened support film 10/release film 14 system/clear coat/base coat system 22/adhesive layer 20/substrate 12 system is either brought into contact with the mold surface of the thermoforming system 400, or alternatively, the mold surface of the thermoforming system 400 is brought into contact with the softened support film 10/release film 14 system/clear coat/base coat system 22/adhesive layer 20/substrate 12 system. Preferably, a vacuum force is applied during contact such that the softened support film 10/release film 14 system/clear coat/base coat system 22/adhesive layer 20/substrate 12 system is drawn onto the mold surface of the thermoforming system 400 to form a component C having a desired configuration.

After the thermoforming process is completed, component C, still having support film 10/release layer 14 system adhered thereto (specifically clear coat/base coat system 22) is removed from the mold surface of the thermoforming system 400, as shown generally in FIG. 155.

At this point, or at a later time if so desired, release film 14/support film 10 system can be removed from the surface of component C, specifically the surface of surfacing film 16, as shown generally in FIG. 156. Adhesive film 20 is permanently adhered to the surface of component C, specifically the surface of substrate 12, as shown generally in FIG. 156. Clear coat/base coat system 22 is permanently adhered to the surface of component C, specifically the surface of adhesive film 20, as shown generally in FIG. 156. Thus, both release film 14 and support film 10 can be removed simultaneously (as a single system) from the surface of component C, specifically the surface of clear coat/base coat system 22, as shown generally in FIG. 156. The component C can then be used immediately, or alternatively, be subjected to further processing, e.g., trimming, painting, coating, and the like.

It should be appreciated that the foregoing example depicted in FIGS. 152–156 can also be used in conjunction with alternative support film 110 and/or alternative release film 114.

Referring to FIGS. 157–161, a quadruple pass through lamination system is used to apply materials in four stages to a particular substrate, e.g., prior to the thermoforming process. It should be noted that either one or more (e.g., two spaced and opposed) support films could be used in conjunction with the following examples.

Referring to FIG. 157, substrate 12 is extruded from extruder 200, in accordance with a thirty-sixth alternative embodiment of the present invention. It should also be appreciated that substrate 12 can be pre-fabricated, coiled onto a coil system (not shown) and uncoiled from the coil system during the lamination process, or can be in pre-cut sheet form. Adhesive film 20 is then applied to either surface of substrate 12. Adhesive film 20 is preferably supplied from a supply coil system 202, with any optional selectively removable backing film being removed and taken up by take-up coil 204. Clear coat/base coat system 22 is then applied to the surface of adhesive film 20. Clear coat/base coat system 22 is preferably supplied from a supply coil system 206, with an optional selectively removable backing film being removed and taken up by take-up coil 208. Release film 14 is then applied to the surface of clear coat/base coat system 22. Release film 14 is preferably supplied from a supply coil system 210, with an optional selectively removable backing film being removed and taken up by take-up coil 212. Support film 10 is then applied to the surface of release film 14. Support film 10 is preferably supplied from a supply coil system 214, with an optional selectively removable backing film being removed and taken up by take-up coil 216. Furthermore, it should be appreciated that an optional second support film 10' can be applied to the underside of substrate 12, such that the second support film 10' is spaced and opposed from support film 10. For example, as shown in FIG. 157A, optional second support film 10' can be applied from optional supply coil system 202', with any optional backing film being removed and taken up by optional take-up coil 204'.

The support film 10/release film 14/clear coat/base coat system 22/adhesive layer 20/substrate 12 system is then preferably placed in a frame (not shown for purposes of illustration) and taken to an oven system 300, preferably including an upper heating element 302 and a lower heating element 304, as generally shown in FIG. 153. The support film 10/release film 14/clear coat/base coat system 22/adhesive layer 20/substrate 12 system is preferably kept in the oven system 300 for a sufficient time and at a sufficient temperature to achieve the requisite softening of the support film 10/release film 14/clear coat/base coat system 22/adhesive layer 20/substrate 12 system.

Once the support film 10/release film 14/clear coat/base coat system 22/adhesive layer 20/substrate 12 system is sufficiently softened, it is taken (in its frame) to a thermoforming system 400, preferably having a male and/or female mold surface formed thereon, as shown generally in FIG. 154. The softened support film 10/release film 14/clear coat/base coat system 22/adhesive layer 20/substrate 12 system is either brought into contact with the mold surface of the thermoforming system 400, or alternatively, the mold surface of the thermoforming system 400 is brought into contact with the softened support film 10/release film 14/clear coat/base coat system 22/adhesive layer 20/substrate 12 system. Preferably, a vacuum force is applied during contact such that the softened support film 10/release film 14/clear coat/base coat system 22/adhesive layer 20/substrate 12 system is drawn onto the mold surface of the thermoforming system 400 to form a component C having a desired configuration.

After the thermoforming process is completed, component C, still having support film 10/release layer 14 system adhered thereto (specifically clear coat/base coat system 22) is removed from the mold surface of the thermoforming system 400, as shown generally in FIG. 160.

At this point, or at a later time if so desired, release film 14/support film 10 system can be removed from the surface of component C, specifically the surface of clear coat/base coat system 22, as shown generally in FIG. 161. Clear coat/base coat system 22 is permanently adhered to the surface of component C, specifically the surface of adhesive film 20, as shown generally in FIG. 161. Adhesive film 20 is permanently adhered to the surface of component C, specifically the surface of substrate 12, as shown generally in FIG. 161. Thus, both release film 14 and support film 10 can be removed simultaneously (as a single system) from the surface of component C, specifically the surface of clear coat/base coat system 22, as shown generally in FIG. 161. The component C can then be used immediately, or alternatively, be subjected to further processing, e.g., trimming, painting, coating, and the like.

It should be appreciated that the foregoing example depicted in FIGS. 157–161 can also be used in conjunction with alternative support film 110 and/or alternative release film 114.

To determine the tensile (i.e., yield) strength of the various materials of the present invention, as compared to conventional materials typically used in thermoforming operations, INSTRON testing was conducted on several samples, as set forth in Table V, below. The samples were cut into 1-inch×6-inch strips that were cut in the flow direction. The test temperature was 300° F. The crosshead speed was 20 inches per minute. The grip distance was 2 inches. All of the following measurements were obtained in the machine direction.

TABLE V

| Sample | Yield Strength PSI (PLI) | Elongation @ Yield % | Break Strength PSI (PLI) | Elongation @ Break % | Break Result |
| --- | --- | --- | --- | --- | --- |
| Soliant 1 mil sample release film #1 | 245 (0.245) | 25 | >591 (>0.591) | >411 | No Break |
| Soliant 1 mil sample release film #2 | 285 (0.285) | 35.8 | >693 (>0.693) | >419 | No Break |
| Kurz 1 mil sample release film #1 | 371 (0.371) | 34 | >1678 (>1.678) | >418 | No Break |
| DuPont (TEDLAR) 1 mil support film sample #1 | 819 (0.819) | 41 | >2097 (>2.097) | >402 | No Break |
| DuPont (TEDLAR) 1 mil support film sample #2 | 788 (0.788) | 45.3 | >1573 (>1.573) | >412 | 1 of 3 Broke |
| Combined Soliant sample release film #1 and DuPont (TEDLAR) support film sample #1 (1.5 mil total) | 625 (0.94) | 47 | >1630 (>1.630) | >418 | 1 of 3 Broke |
| Combined Soliant sample release film #2 and DuPont (TEDLAR) support film sample #2 (1.5 mil total) | 613 (0.92) | 51 | >1534 (>2.301) | >419 | 1 of 3 Broke |
| DuPont (TEFZEL) 0.5 mil support film sample #1 | 2198 (1.10) | 43.6 | 1701 (0.851) | 217 | Break |
| DuPont (TEFZEL) 0.5 mil support film sample #2 | 2602 (1.3) | 52.5 | 2252 (1.126) | 191 | Break |

To determine the bag/sag/drape characteristics of the various materials of the present invention, as compared to conventional materials typically used in thermoforming operations, testing was conducted on several samples, as set forth in Table VI, below.

The intended purpose of this testing was to compare the support that is offered to the substrate sheets by the support films of the present invention, as compared to conventional release films and/or surfacing films. As previously noted, this support is important because over-bagging of the TPO sheets during the heating cycle causes the sheet material to become very difficult, if not impossible, to properly thermoform (e.g., vacuform). Over-bagging of the TPO sheet creates excessive amounts of material and an individual will have difficulty pulling or properly placing all of the sheet material on the mold face without getting wrinkles or webbing of the excess material.

The sheets were heated to two topside heats (surfacing film side) 340° F. and 360° F. because they generally represent the ultimate lower and upper heat ranges for obtaining the best results from the tested materials during the thermoforming process.

The sheets used were 24 inches by 24 inches by 0.150 inches and were loaded one at a time into a vacuformer rack (e.g., frame) which measures 24¼ inches by 24¼ inches outside and 21 inches by 21 inches inside.

The loaded rack was placed in the preheated oven and allowed to stay until the proper temperature was recorded on each sheet and film combination.

The sheets, after reaching the proper temperature, were removed from the oven and allowed to cool in the rack without thermoforming (e.g., vacuforming). After the sheets were allowed to cool, they were placed, one at a time, on a flat metal table with the bag or drape side of the sheet facing away from the table surface. A height gauge, equipped with a 15-inch arm, was used to establish the depth or height of the drape or sag for each individual sheet.

Using this procedure, the following data shown in Table VI was obtained:

Stack number two, designated sample group 2, contained sheets that were laminated with surfacing film and then had the clear polyester film (casting base) removed and once again passed thru the hot nip rollers. At this time, a release film (0.001 inches thick) only was introduced to the upper most surface of the surfacing film.

Stack number three, designated sample group 3, contained sheets that were processed identically to sample group 2. In addition to this combination, the clear polyester (casting base) was removed from the release film and the sheets were once again passed thru the hot nip rollers. At this time, a layer (0.001 inches thick) of a support film comprised of clear TEDLAR film #TTR10AH8 manufactured by DuPont was laminated to the uppermost surface of the release layer.

Stack number four, designated sample group 4, contained sheets that were processed identically to sample group 1. In addition to this combination, the clear polyester (casting base) was removed from the surfacing film and the sheets were once again passed through the hot nip rollers. At this time, a layer of a combined release film (Soliant)/support

TABLE VI

| Sheet Temp. Surfacing Film Side | Sample Group #1 Drape (inches of sag) | Sample Group #2 Drape (inches of sag) | Sample Group #3 Drape (inches of sag) | Sample Group #4 Drape (inches of sag) |
|---|---|---|---|---|
| | Soliant (Fluorex paint or color-containing film #B04K2 Pewter/PRMCPO28) surfacing film only | Soliant release film and Soliant (Fluorex paint or color-containing film #B04K2 Pewter/PRMCPO28) surfacing film | Two-step DuPont (TEDLAR) support film/ Soliant release film/ Soliant (Fluorex paint or color-containing film #B04K2 Pewter/ PRMCPO28) surfacing film | One-step DuPont (TEDLAR) support film/ Soliant (Fluorex paint or color-containing film #B04K2 Pewter/ PRMCPO28) surfacing film |
| 340° F. | 5.46 (see FIG. 164) | 4.45 (see FIG. 165) | 1.20 (see FIG. 169) | 1.6 (see FIG. 168) |
| 360° F. | 7.60 (see FIG. 162) | 7.25 (see FIG. 163) | 1.65 (see FIG. 167) | 2.55 (see FIG. 166) |

As the results in Table VI indicate, use of the support films of the present invention enhances bag/sag/drape characteristics of thermoformed articles, as compared to use of surfacing films (e.g., paint or color-containing films) alone or surfacing films (e.g., paint or color-containing films) in conjunction with release films.

In order to determine the gloss characteristics of the products produced in accordance with the present invention, testing was conducted after the samples were exposed to the heat during the thermoforming process.

Soliant manufactured the surfacing film used. The surfacing film was designated Fluorex paint or color-containing film #B04K2 Pewter/PRMCPO28 and was laminated to the TPO sheets via hot nip rollers. The sheets, which measured 0.150 inches by 24 inches by 24 inches, were produced using an EQUISTAR Resin #PD951. The laminated sheets were split into four equal stacks.

Stack number one, designated sample group 1, contained sheets that were laminated with surfacing film only.

film (DuPont TEDLAR) system was laminated to the upper most surface of the surfacing film.

The samples were thermoformed using a PLASTI-VAC PVI XTX Series vacuum former Model #P406XTX. The sample vacuum mold that was used for this test measured 18 inches by 18 inches by 6 inches deep. On the face of this male mold there were three plaques measuring 4 inches by 12 inches by ½ inches high. These plaques were spaced one inch apart and centered on the mold face. The plaques and mold were constructed of solid aluminum plates. The plaques were slightly textured (using medium grit sand—400 grit) to help eliminate air entrapment.

Prior to the sheets being loaded into the clamp frame of the vacuum former, the casting base (clear polyester) was removed and discarded. On each sheet, a device was located to record the heat applied to either side of the sheets that were vacuum formed one at a time. The heat recording device was an adhesive-backed eight temperature THERMOLABEL temperature sensitive tape #TL-8-290 produced by Paper Thermometer Inc. These tapes record heats between 290° F. and 360° F. in 10° increments. For higher temperature readings, #TL-8-330 labels were used which record heats between 330° F. and 400° F. also in 10° increments. These heat tapes were placed in the same location (top and bottom) on each sheet to record heats applied to the surfaces.

Vacuum forming of the sheets from each sample group was carried out at 330° F., 340° F., 350° F., 360° F., 370° F., and 380° F. Both top and bottom side heat tapes were recorded; however, the heats recorded on the top or surfacing film side are most important when relating to gloss. With this in mind, all the heat ranges recorded below are from topside heat tapes. Gloss levels were taken from the center of each 4-inch by 12-inch plaque. This resulted in three readings per vacuformed sample (i.e., three 4 inch by 12 inch plaques per sheet) that were averaged to give one reading per vacuformed sample for each heat range.

Gloss levels were taken using a Micro TRI gloss hand held glossmeter, in 60° mode, which was manufactured by BYK-Gardner Inc. (Germany). Sixty degrees gloss measurements are generally regarded as the standard used by the automotive industry for exterior painted parts. Masking films were removed from sample groups 2, 3 and 4 prior to having gloss levels measured. The results are set forth in Table VII, below:

TABLE VII

| Surfacing film side (topside) heat | Sample Group 1, Gloss Level at 60° | Sample Group 2, Gloss Level at 60° | Sample Group 3, Gloss Level at 60° | Sample Group 4, Gloss Level at 60° |
|---|---|---|---|---|
| 330° F. | 70.3 | 71.6 | 77.3 | 80.5 |
| 340° F. | 51.0 | 67.9 | 77.8 | 77.7 |
| 350° F. | 34.1 | 67.3 | 79.1 | 77.1 |
| 360° F. | 32.1 | 66.7 | 78.5 | 76.7 |
| 370° F. | 27.8 | 61.9 | 67.1 | 72.0 |
| 380° F. | 27.8 | 56.3 | 62.9 | 71.5 |

As the results in Table VII indicate, use of the support films of the present invention enhances gloss level characteristics of thermoformed articles, as compared to use of surfacing films (e.g., paint or color-containing films) alone or surfacing films (e.g., paint or color-containing films) in conjunction with release films.

An additional testing procedure was performed in the same manner as described above, however the only difference in this procedure involved the use of a different paint film. The particular paint film was manufactured by Avery and given the designation Torch Red (AL 10366G3.57).

Stack number five, designated sample group 5, contained sheets that were laminated with surfacing film only.

Stack number six, designated sample group 6, contained sheets that were laminated with surfacing film and then had the clear polyester film (casting base) removed and once again passed thru the hot nip rollers. At this time, a release film (0.001 inches thick) only was introduced to the upper most surface of the surfacing film.

Stack number seven, designated sample group 7, contained sheets that were processed identically to sample group 6. In addition to this combination, the clear polyester (casting base) was removed from the release film and the sheets were once again passed thru the hot nip rollers. At this time, a layer (0.001 inches thick) of a support film comprised of clear TEDLAR film #TTR10AH8 manufactured by DuPont was laminated to the uppermost surface of the release layer.

Stack number eight, designated sample group 8, contained sheets that were processed identically to sample group 5. In addition to this combination, the clear polyester (casting base) was removed from the surfacing film and the sheets were once again passed through the hot nip rollers. At this time, a layer of a combined release film (Soliant)/support film (DuPont TEDLAR) system was laminated to the upper most surface of the surfacing film.

Gloss levels were taken using a Micro TRI gloss hand held glossmeter, in both 20° and 60° modes. Masking films were removed from sample groups 6, 7 and 8 prior to having gloss levels measured. The results are set forth in Table VIII, below:

TABLE VIII

| Sample Group and Gloss Mode | Gloss Level at 330° F. | Gloss Level at 340° F. | Gloss Level at 350° F. | Gloss Level at 360° F. | Gloss Level at 370° F. | Gloss Level at 380° F. |
|---|---|---|---|---|---|---|
| 5 @ 20° | 41.5 | 45.43 | 50.6 | 47.1 | 46.83 | NA |
| 5 @ 60° | 73.8 | 71.37 | 72 | 72.8 | 72.8 | NA |
| 6 @ 20° | 56.86 | 62.2 | 62.67 | 62.9 | 60.23 | NA |
| 6 @ 60° | 73.47 | 69.1 | 74.27 | 71.5 | 74.56 | NA |
| 7 @ 20° | 64.7 | 62.7 | 63.4 | 62 | 58.74 | 60.63 |
| 7 @ 60° | 75.7 | 74.5 | 74.7 | 74.9 | 74.27 | 73.27 |
| 8 @ 20° | 62.46 | 63.33 | 63.73 | 63.7 | 61.93 | 60.8 |
| 8 @ 60° | 73.77 | 75.1 | 75.17 | 76.1 | 73.27 | 75.43 |

Although the results in Table VIII may indicate that the various samples had similar gloss levels readings, especially in the 60° mode, there were significant qualitative and quantitative differences that indicated that the samples prepared in accordance with the support films of the present invention yielded superior results, especially with respect to surface roughness characteristics. Microscopic analysis of various portions of the surfaces of the samples revealed differences in mean roughness (of the surface) as well as surface area difference. Mean roughness is generally defined as the average roughness calculated by the average deviation of elevation values from the mean line or center plane (corrected for tilt). A higher mean roughness measure typically means a rougher (i.e., less smooth) surface. Surface area difference is generally defined by the equation: $\{[(\text{actual area of the surface})/(\text{measurement area in xy plane})]-1\} \times 100\%$. A lower surface area difference percentage typically means a less rough (i.e., smoother) surface. This data is set forth in Table IX, below:

TABLE IX

| Sample Group | Mean Roughness (nm) | Surface Area Difference (%) |
|---|---|---|
| 5 | 15–30 | 0.50–0.56 |
| 6 | 6.3–18.8 | 0.16–0.18 |
| 7 | 11.1–13.6 | 0.19–0.21 |
| 8 | 6.4–17.2 | 0.09–0.14 |

Thus, the samples prepared in accordance with the support films of the present invention, e.g., Sample Groups 7 and/or 8, generally had superior mean roughness and/or surface area difference values than Sample Groups 5 and/or 6.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A laminate system, comprising:
   a thermoformable polymeric support film comprised of a material having a tensile strength greater than 0.5 pli at 300° F.;
   a release layer; and
   a polymeric substrate, wherein the polymeric substrate is translucent or opaque, wherein the release layer is disposed between the support film and the polymeric substrate;
   wherein the support film, polymeric substrate, and release layer are subjected to a thermoforming process;
   wherein the release layer is releasably adhered to the polymeric substrate during the thermoforming process, wherein the release layer is operable to be peeled away from the polymeric substrate;
   wherein the support film supports the polymeric substrate during the thermoforming process and wherein the polymeric substrate is comprised of a material selected from the group consisting of a thermoplastic polyolefin, ABS, and combinations thereof.

2. The invention according to claim 1, further comprising a second thermoformable support film having a tensile strength greater than 0.5 pli at 300° F., wherein the second support film is operable to releasably adhere to and support a polymeric substrate during a thermoforming process, wherein the second support film is spaced and opposed from the support film.

3. The invention according to claim 1, further comprising an adhesive film in abutting relationship with the support film.

4. The invention according to claim 1, further comprising a paint or color-containing film system in abutting relationship with the release layer.

5. The invention according to claim 4, further comprising an adhesive film system in abutting relationship with the paint or color-containing film system.

6. The invention according to claim 4, wherein the release layer is operable to releasably adhere to the paint or color-containing film system, wherein the release layer is operable to be peeled away from the paint or color-containing film system.

7. The invention according to claim 1, further comprising a paint or color-containing film system in abutting relationship with the support film.

8. The invention according to claim 7, further comprising an adhesive film system in abutting relationship with the paint or color-containing film system.

9. The invention according to claim 7, wherein the support film is operable to releasably adhere to the paint or color-containing film system.

10. The invention according to claim 1, wherein the polymeric substrate is formed into an automotive component.

11. The invention according to claim 1, wherein the polymeric substrate is formed into a component having at least one curved surface.

12. A method for forming a laminate system, comprising:
    providing a thermoformable polymeric support film comprised of a material having a tensile strength greater than 0.5 pli at 300° F.;
    providing a polymeric substrate, wherein the polymeric substrate is translucent or opaque;
    providing a release layer, wherein the release layer is disposed between the support film and the polymeric substrate; and
    subjecting the support film, polymeric substrate, and release layer to a thermoforming process;
    wherein the support film supports the polymeric substrate during the thermoforming process;
    wherein the release layer is operable to releasably adhere to the polymeric substrate, wherein the release layer is operable to be peeled away from the polymeric substrate and wherein the polymeric substrate is comprised of a material selected from the group consisting of a thermoplastic polyolefin, ABS, and combinations thereof.

13. The invention according to claim 12, further comprising providing a second thermoformable support film having a tensile strength greater than 0.5 pli at 300° F., wherein the second support film is operable to releasably adhere to and support a polymeric substrate during a thermoforming process, wherein the second support film is spaced and opposed from the support film.

14. The invention according to claim 12, further comprising providing an adhesive film in abutting relationship with the support film.

15. The invention according to claim 14, further comprising a paint or color-containing film system in abutting relationship with either the release layer or the polymeric substrate.

16. The invention according to claim 15, further comprising an adhesive film system in abutting relationship with the paint or color-containing film system.

17. The Invention according to claim 15, wherein the release layer is operable to releasably adhere to the paint or color-containing film system, wherein the release layer is operable to be peeled away from the paint or color-containing film system.

18. The invention according to claim 12, further comprising a paint or color-containing film system in abutting relationship with the support film.

19. The invention according to claim 18, further comprising an adhesive film system in abutting relationship with the paint or color-containing film system.

20. The invention according to claim 18, wherein the support film is operable to releasably adhere to the paint or color-containing film system.

21. The invention according to claim 12, wherein the polymeric substrate is formed into an automotive component.

22. The invention according to claim 12, wherein the polymeric substrate is formed into a component having at least one curved surface.

23. A method for forming a laminate system, comprising:
providing a thermoformable polymeric support film comprised of a material having a tensile strength greater than 0.5 pli at 300° F.;
providing a release layer;
providing a surfacing film system;
providing a polymeric substrate, wherein the polymeric substrate is translucent or opaque, wherein the surfacing film system is disposed between the release layer and the polymeric substrate, wherein the release layer is disposed between the support film and the surfacing film system; and
subjecting the support film, release layer, surfacing film system, and polymeric substrate to a thermoforming process;
wherein the release layer is releasably adhered to the surfacing film system during the thermoforming process, wherein the release layer is operable to be peeled away from the surfacing film system;
wherein the support film supports the polymeric substrate during the thermoforming process and wherein the polymeric substrate is comprised of a material selected from the group consisting of a thermoplastic polyolefin, ABS, and combinations thereof.

24. The invention according to claim 23, further comprising providing a second thermoformable support film having a tensile strength greater than 0.5 pli at 300° F., wherein the second support film is operable to releasably adhere to and support a polymeric substrate during a thermoforming process, wherein the second support film is spaced and opposed from the support film.

25. The invention according to claim 23, further comprising providing an adhesive film in abutting relationship with the support film.

26. The invention according to claim 23, further comprising providing an adhesive film system in abutting relationship with the surfacing film system.

27. The invention according to claim 23, wherein the surfacing film system comprises a paint or color-containing film system.

28. The invention according to claim 23, wherein the polymeric substrate is formed into an automotive component.

29. The invention according to claim 23, wherein the polymeric substrate is formed into a component having at least one curved surface.

30. A method for forming a laminate system, comprising:
providing a thermoformable polymeric support film comprised of a material having a tensile strength greater than 0.5 pli at 300° F.;
providing a release layer;
providing a polymeric substrate, wherein the polymeric substrate is translucent or opaque, wherein the release layer is dispose between the support film and the polymeric substrate; and
subjecting the support film, polymeric substrate, and release layer to a thermoforming process;
wherein the release layer is releasably adhered to the polymeric substrate during the thermoforming process;
wherein the support film supports the polymeric substrate during the thermoforming process and wherein the polymeric substrate is comprised of a material selected from the group consisting of a thermoplastic polyolefin, ABS, and combinations thereof.

31. The invention according to claim 30, further comprising providing a second thermoformable film having a tensile strength greater than 0.5 pli at 300° F., wherein the second support film is releasably adhered to and support a polymeric substrate during a thermoforming process, wherein the second support film is spaced and opposed from the support film.

32. The invention according to claim 30, further comprising providing an adhesive film in abutting relationship with the support film.

33. The invention according to claim 30, further comprising providing a paint or color-containing film system in abutting relationship with either the support film or the release layer.

34. The invention according to claim 33, further comprising providing an adhesive film system in abutting relationship with the paint or color-containing film system.

35. The invention according to claim 33, wherein the release layer is operable to releasably adhere to the paint or color-containing film system.

36. The invention according to claim 33, wherein the support film is operable to releasably adhere to the paint or color-containing film system.

37. The invention according to claim 30, further comprising a paint or color-containing film system in abutting relationship with the support film.

38. The invention according to claim 37, further comprising an adhesive film system in abutting relationship with the paint or color-containing film system.

39. The invention according to claim 37, wherein the support film is operable to releasably adhere to the paint or color-containing film system.

40. The invention according to claim 30, wherein the polymeric substrate is formed into an automotive component.

41. The invention according to claim 30, wherein the polymeric substrate is formed into a component having at least one curved surface.

* * * * *

UNITED STATES PATENT AND TRADEMARK OFFICE
CERTIFICATE OF CORRECTION

PATENT NO. : 7,144,612 B2
APPLICATION NO. : 10/765427
DATED : December 5, 2006
INVENTOR(S) : LaFave et al.

Page 1 of 1

It is certified that error appears in the above-identified patent and that said Letters Patent is hereby corrected as shown below:

Column 52, line 4, Claim 30, after "layer is" please delete "dispose" and insert --disposed--.

Column 52, Line 16, Claim 31, after "thermoformable" please insert --support--.

Column 52, Line 18, Claim 31, after "and" please delete "support" and insert --supports--.

Signed and Sealed this

Thirteenth Day of March, 2007

JON W. DUDAS
*Director of the United States Patent and Trademark Office*